(12) United States Patent
Patterson et al.

(10) Patent No.: US 7,099,649 B2
(45) Date of Patent: Aug. 29, 2006

(54) SYSTEM AND METHOD FOR WIRELESS DATA EXCHANGE BETWEEN AN APPLIANCE AND A HANDHELD DEVICE

(75) Inventors: Wade C. Patterson, Huntsville, AL (US); Thomas J. Watson, Madison, AL (US)

(73) Assignee: Geberit Technik AG, Jona (CH)

( * ) Notice: Subject to any disclaimer, the term of this patent is extended or adjusted under 35 U.S.C. 154(b) by 680 days.

(21) Appl. No.: 10/035,370

(22) Filed: Oct. 23, 2001

(65) Prior Publication Data

US 2002/0160729 A1 Oct. 31, 2002

Related U.S. Application Data

(60) Provisional application No. 60/267,441, filed on Feb. 8, 2001, provisional application No. 60/242,898, filed on Oct. 24, 2000.

(51) Int. Cl.
    *H04B 1/06* (2006.01)
(52) U.S. Cl. ........................................ 455/353; 455/92
(58) Field of Classification Search ................ 340/500, 340/505, 539.1; 455/92, 352–353, 88, 227; 137/624.11; 4/623
See application file for complete search history.

(56) References Cited

U.S. PATENT DOCUMENTS

| | | |
|---|---|---|
| 390,960 A | 10/1888 | Gustin |
| 1,940,090 A | 12/1933 | Hetherington |
| 2,539,598 A | 1/1951 | Suska |
| 4,145,769 A | 3/1979 | MacFarlane et al. |
| 4,420,811 A | 12/1983 | Tarnay et al. ................ 364/510 |
| 4,563,780 A | 1/1986 | Pollack |
| 4,682,728 A | 7/1987 | Oudenhoven et al. |
| 4,700,884 A | 10/1987 | Barrett et al. |
| 4,854,499 A | 8/1989 | Neuman |
| 4,923,116 A | 5/1990 | Homan |
| 4,965,448 A | 10/1990 | Morse et al. ............ 250/252.1 |
| 4,974,636 A | 12/1990 | Cogger |
| 5,062,453 A | 11/1991 | Saadi et al. |
| 5,170,514 A | 12/1992 | Weigert |
| 5,217,035 A | 6/1993 | Van Marcke |
| 5,243,717 A | 9/1993 | Yasuo |
| 5,328,597 A | 7/1994 | Boldt, Jr. et al. |
| RE35,018 E | 8/1995 | Homan |
| 5,566,702 A | 10/1996 | Philipp |

(Continued)

FOREIGN PATENT DOCUMENTS

EP 0 332 045 A2 9/1989 ...................... 17/7

(Continued)

*Primary Examiner*—Curtis Kuntz
*Assistant Examiner*—Alexander Jamal
(74) *Attorney, Agent, or Firm*—Reinhart Boerner Van Deuren s.c.

(57) ABSTRACT

A wireless data exchange system is disclosed. The system includes an electronically operated appliance including a transmitter, a receiver, and a control module configured to communicate with the transmitter and receiver. The control module provides a primary mode of operation and a secondary mode of operation and includes control logic configured to selectively change the mode of operation of the electronically operated appliance. A communication device adapted to be held in the hand of a user is configured to cooperate with the transmitter and the receiver to impart instructions wirelessly to the control logic in order to change the mode of operation of the electronically operated appliance upon receipt of a command from a user. A method of exchanging data wirelessly between an apparatus and a communication device is also disclosed.

15 Claims, 53 Drawing Sheets

U.S. PATENT DOCUMENTS

| | | |
|---|---|---|
| 5,570,869 A | 11/1996 | Diaz et al. ............. 251/129.04 |
| 5,577,706 A | 11/1996 | King |
| 5,655,561 A | 8/1997 | Wendel et al. |
| 5,745,049 A | 4/1998 | Akiyama et al. ...... 340/870.17 |
| 5,769,120 A * | 6/1998 | Laverty et al. ........ 137/624.11 |
| 5,819,336 A | 10/1998 | Gilliam et al. .................. 4/623 |
| 5,910,776 A | 6/1999 | Black |
| 5,915,417 A | 6/1999 | Diaz et al. |
| 6,000,429 A | 12/1999 | Van Marcke |
| 6,006,784 A | 12/1999 | Tsutsui et al. |
| 6,038,519 A | 3/2000 | Gauthier et al. |
| 6,059,192 A | 5/2000 | Zosimadis |
| 6,123,093 A | 9/2000 | D'Antonio et al. |
| 6,124,806 A | 9/2000 | Cunningham et al. |
| 6,439,459 B1 * | 8/2002 | Dougherty et al. .... 235/462.01 |
| 2002/0088823 A1 | 7/2002 | Tabacchi et al. .............. 222/52 |

FOREIGN PATENT DOCUMENTS

| | | |
|---|---|---|
| EP | 1 164 450 A1 | 12/2001 |
| JP | 62-256112 | 11/1987 |
| JP | 62-269212 | 11/1987 |

* cited by examiner

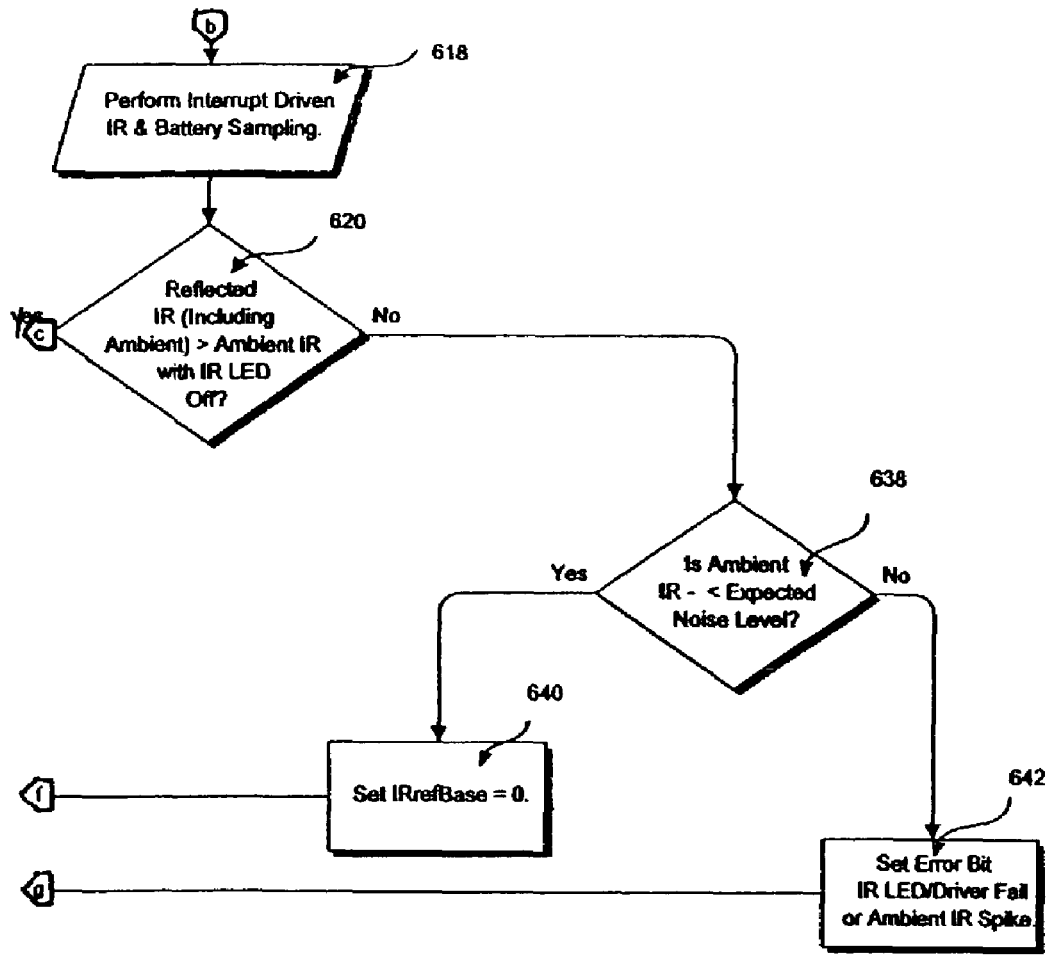
FIG. 9D
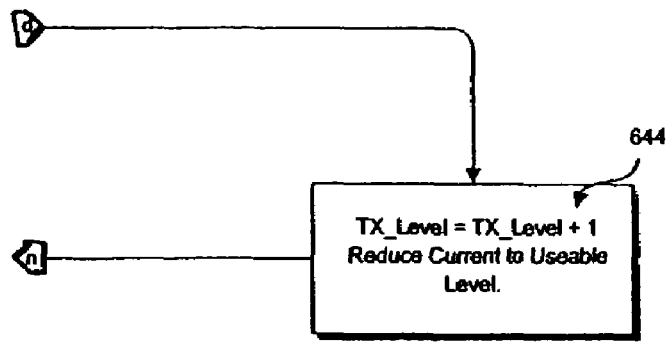

FIG. 26a
986

Synapse Commander

- Get Faucet Data
- Adjust Faucet
- Scan For Problems
- Information
- Troubleshoot
- Help

FIG. 26b
988

Information

- Review & Modify Your Data
- Reference Guide
- Field Replacement Parts
- Accessories
- Contact Synapse
- Contact Chicago Faucets

[Help]  [OK]

FIG. 26c
989

Adjust

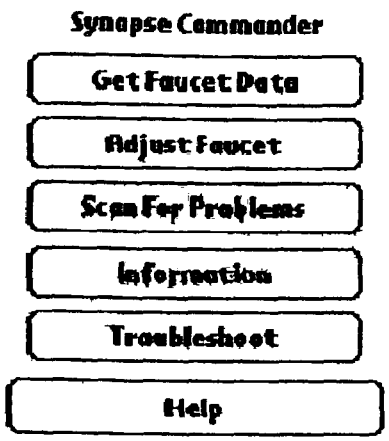

Range: ☐ Short ☐ Far ☑ Normal ☐ Maximum

-2"  0  +2"

Mode: ☑ Normal ☐ Metered ☐ Scrub ☐ Water Saver 0 min — 3 min

[Help] [Set] [Other] [OK]

FIG. 26d

GetStatus — Aim Palm at Faucet

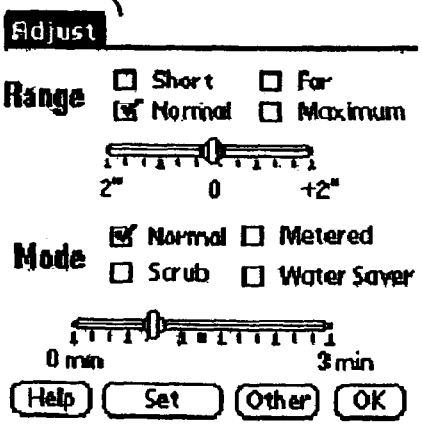

| Serial # | 00000000 |
|---|---|
| Overall Status | Low Battery |
| Power Status | Dead |

| Power | Settings | Usage | Location | Misc |
|---|---|---|---|---|
| Unloaded Volts | | 0. volts | | |
| Loaded Volts | | 0. volts | | |
| Time In Use | | 0 hours | | |
| Replace Battery Date | | 1/20/03 | | |

[Help] [Note] [Next] [OK]

FIG. 26e

Field Replacement Parts Galileo

Mechanical Parts

| Lav Spout | 570-001KJKCP |
|---|---|
| Gooseneck Spout | GN2AH8JKCP |
| Gooseneck Flange | 170-202KJKCP |
| 4" Coverplate | 570-003KJKCP |
| 8" Coverplate | 570-008KJKCP |
| 4" Cvrplate/Side-mix | 550-018KJKCP |
| 8" Cvrplate/Side-mix | 570-135KJKCP |

[Electronics] [Miscellaneous]
[Mechanical] [Accessories] [OK]

FIG. 26f

Reference Guide

MODE DEFINITIONS

NORMAL—Unit turns off 1.5 seconds after hands are removed.
METERED—Unit stays on for 10 seconds and then turns off.
SCRUB—Unit stays on for 60 seconds after removing hands.
WATER SAVER—Unit stays on 5 seconds and then turns off.

[Back]  [Next]
[Common Field Problems] [OK]

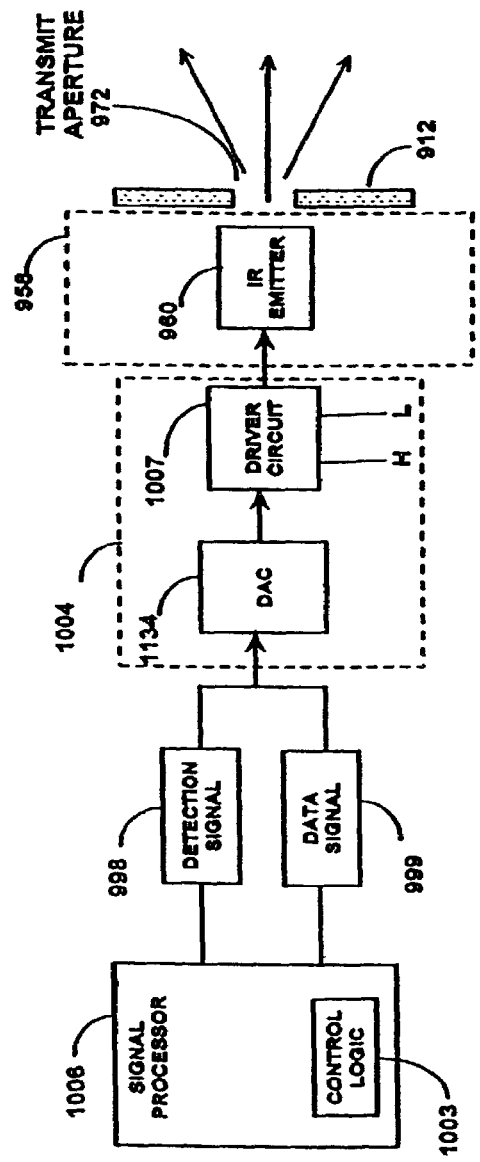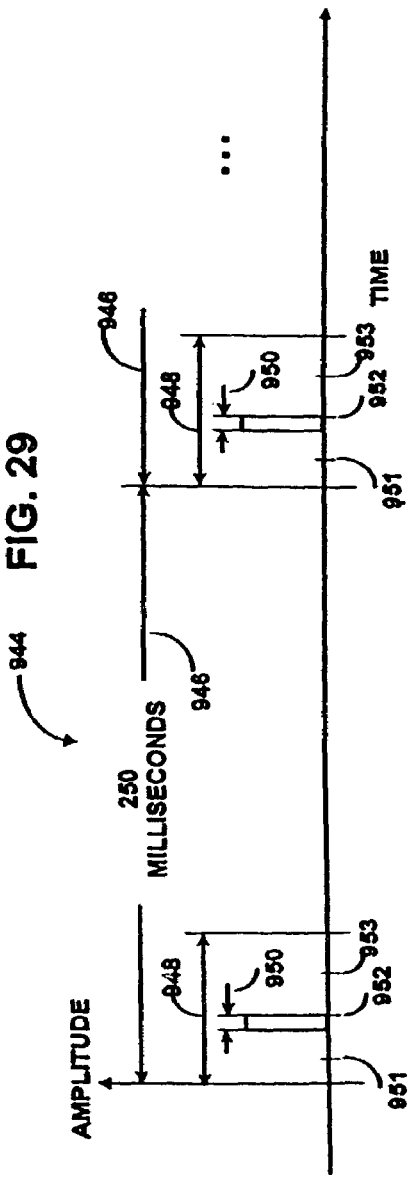

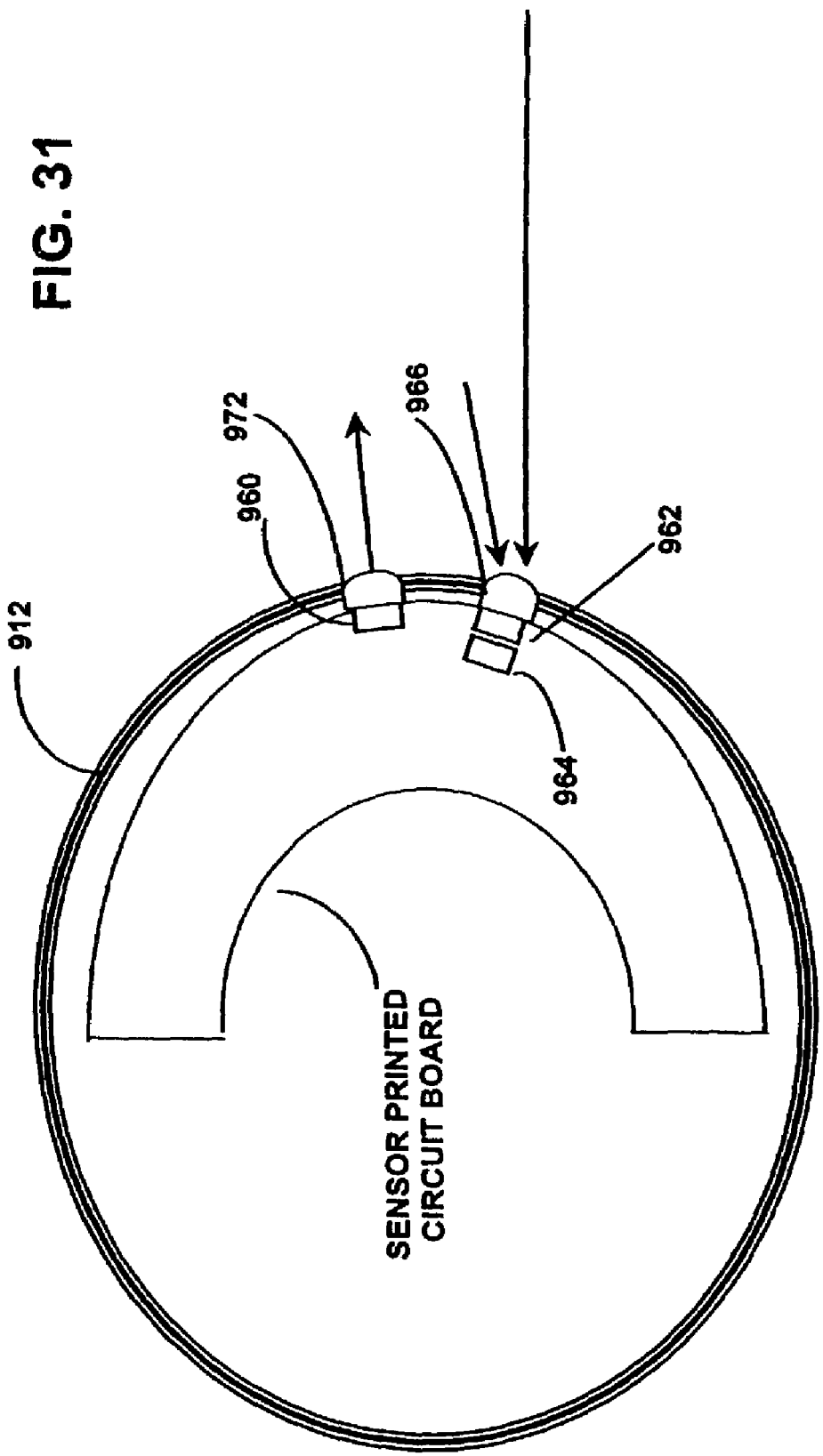

SYSTEM AND METHOD FOR WIRELESS DATA EXCHANGE BETWEEN AN APPLIANCE AND A HANDHELD DEVICE

CROSS-REFERENCE TO RELATED APPLICATIONS

This application claims the benefit of priority under 35 U.S.C. § 119(a) of U.S. Provisional Patent Application Ser. No. 60/267,441 entitled, "Remotely Managed Automatic Dispensing Apparatus and Method", filed on Feb. 8, 2001, and U.S. Provisional Patent Application Ser. No. 60/242,898 entitled, "Remotely Managed Automatic Dispensing Apparatus and Method", filed on Oct. 24, 2000, both of which are incorporated herein by reference in their entireties.

BACKGROUND OF INVENTION

1. Field of the Invention

The present invention relates generally to the field wireless data communications, and more particularly, to data communication between a handheld device having an optical interface port that transmits and receives signals with an optical interface port of an electronically operated appliance.

2. Technical Background

Standard infrared (IR) devices communicate in accordance with the Infrared Data Association Serial Infrared Physical Layer Specification (hereinafter referred to as the Serial Infrared Specification) promulgated by the Infrared Data Association (IrDA). The IrDA is a standard body that publishes specifications containing the criteria by which IR device manufacturers must comply in order to claim IrDA compliance. The Infrared Data Association Serial Infrared Specification is incorporated herein by reference.

The physical layer specification governs point-to-point communication between electronic devices, such as computers and peripherals, using directed half-duplex, serial infrared communication links through free space. The physical elements, including the optical links and active input and output interfaces, are described in the physical layer specification. In order for a device to be IrDA compliant, the device must be designed to meet the specifications as indicated in the physical layer specification.

In particular, the IrDA Physical Layer Specification places constraints on the communication procedure when a device attempts to establish an optical link with a second device. The IrDA Physical Layer Specification sets forth requirements that govern the behavior of a device having a transmitter/detector pair when establishing an optical link. Compliance with the IrDA Physical Layer Specification requires that the device sample its detection range. An IrDA compliant device will not transmit a pulse to another device to request a link until it detects 500 msecs of "media quiet." "Media quiet" means that there is no IR activity detected during the 500 msec duration.

Once an optical link is established between two devices, IrDA compliance requires that a serial interaction pulse (SIP) be emitted every 500 msecs to quiet other potentially interfering systems. In other words, the 500 msec "media quiet" requirement will ensure that the potentially interfering device detects an SIP every 500 msecs thereby precluding the device from attempting to establish a connection.

The SIP is required by the Physical Layer Specification to quiet slower systems that might interfere with the optical link established between the transmitter and the receiver. An SIP is a 1.6 microsecond pulse followed by a 7.1 microsecond off time of the transmitter. The SIP simulates a start pulse that requires a potentially interfering system to listen for at least 500 milliseconds prior to establishing an optical link.

In accordance with the Physical Layer Specification, optical sensors are commonly employed with IR transmitters which, together with processing electronics, are used to detect an object in the range of the IR transmitter. An IR pulse is emitted, and if it strikes an object in its range, the pulse is reflected. An IR sensor is placed strategically in order to detect the reflected pulse.

The dichotomous emitter/sensor technology is employed in various applications including electronically activated fluid dispensing devices. Such dispensing systems, such as hand activated water faucets, generally include an infrared emitter that emits a timed pulse. When an object, such as a user's hands, is within the emitter's range, it reflects the pulsed IR beam, and the optical sensor detects the reflected light from the user's hands. In such a system, an IrDA compliant device emits a pulse every 250 milliseconds.

Various methods have been employed to electronically control water flow through a water control device such as a faucet or spigot. Among the accepted methods is the use of an optical sensor typically employed in combination with an infrared ("IR") source or IR emitter that together with processing electronics, are used to control a solenoid valve. Generally speaking, a pulsed IR beam is reflected from an object (such as a user's hands or other body parts, for example) and sensed by a photo detector to determine whether to activate or deactivate the solenoid valve. Pulsed IR sensing remains at the forefront of sensing techniques used with these types of devices, due in part to its reasonable performance and low cost.

Automatically activated fluid dispensing devices commonly known in the art do have a myriad of operating shortcomings. For example, devices such as IR controlled faucets require extensive manual servicing and maintenance. Inherently, in an environment such as an office building having numerous floors and numerous faucets in each of the restrooms on each of the floors, servicing and maintenance of the IR controlled devices is often a burdensome and time consuming task. Many simple tasks associated with the maintenance of the faucets, including battery replacement, IR range monitoring, and solenoid malfunction detection, are typically manually performed per faucet per restroom per floor in an office building. This type of monitoring of malfunctioning units dictates manual interaction with each unit for diagnostics, maintenance, calibration, and servicing.

In addition, a common denominator for many of the problems associated with automatically activated flow control devices, such as faucets, is the environment in which such devices are installed and operate. For instance, existing IR sensor designs generally suffer from an inability to adapt to changes in the background signal level associated with a gradual discoloration of the sink in which the faucet is mounted, a gradual degradation of the sensor lens due to the use of abrasive cleaning compounds, a gradual degradation of the IR emitter performance, among other things. Generally, existing sensors employ a fixed sensitivity threshold that is set either at the factory or by the installer (or both). When the IR sensor sensitivity is fixed, the sensors performance will inevitably degrade with environmental changes, and when the degradation causes faulty operation, a service call may be required. In some instances, the gradual degradation will go unnoticed resulting in poor performance.

In addition, calibration of today's automatically activated flow control devices is often labor intensive and inefficient with respect to devices presently on the market. The low cost IR sensing devices employed in automatically activated flow control devices vary with respect to power requirements, performance, and other criteria. As a result, readings taken by these IR sensing units (such as whether a user's hands are present beneath the aerator of a faucet) are generally non-uniform from device to device and, therefore, often result in improper activation and deactivation of some devices. Similarly, as battery power for these devices decreases over time, so does the power output of the IR sensing devices. As a result, manual calibration of conventional automatically activated flow control devices is generally required during initial installation, and thereafter on a frequent basis following extended periods of use.

Unfortunately, vandalism and water damage also adversely affect the use and proper operation of automatically activated flow control devices presently available in the art. Water often travels along the wiring harness extending from the flow control device to the device's electronics causing corrosion to the parts. In addition, vandals may attempt to break into the electronics box associated with the device or pull the wires from either the electronics box or the faucet.

What is needed therefore, but presently unavailable in the art is a system and method of wireless two-way data exchange between an appliance such as, an electronically activated flow control device, and a handheld device that overcomes many of the shortcomings associated with electronically activated appliances presently available in the art. Such a system and method should be easily maintained by maintenance personnel, substantially impervious to vandalism, self-calibrating, and remotely controlled. In addition, the system of the present invention should be capable of being remotely managed and controlled by any number of portable communication devices presently available in the art. The system should consume low power, be easy to install, and low cost. Moreover, the system should be capable of receiving instruction from a remote IRDA emitting device despite the appliances rapid rate of emitted IR sensing pulses. Large numbers of appliances within the system should also be capable of being used in a distributed network environment, and should be adapted to be managed and controlled from as few as one centralized control point. It is to the provision of such a system and method that the present invention is primarily directed.

SUMMARY OF THE INVENTION

One aspect of the present invention relates to a wireless data exchange system. The wireless data exchange system of the present invention includes an electronically operated appliance having a transmitter, a receiver, and a control module configured to communicate with the transmitter and the receiver. The control module is configured to provide a primary mode of operation and a secondary mode of operation and includes control logic configured to selectively change the mode of operation of the electronically operated appliance. The system further includes a communication device adapted to be held in the hand of a user. The communication device is configured to cooperate with the transmitter and receiver to impart instructions wirelessly to the control logic to change the mode of operation of the electronically operated appliance upon receipt of a command from the user.

In another aspect the present invention relates to a method of exchanging data wirelessly between an apparatus and a communication device. The method includes the steps of sending a wireless signal from a handheld communication device to an electronically operated appliance operating in a primary mode of operation, and changing the mode of operation of the electronically operated appliance from a primary mode of operation to a secondary mode of operation in response to the sending step. The method further includes the step of establishing a two-way wireless communication link for the exchange of data between the handheld device and the electronically operated appliance while the electronically operated appliance is in the secondary mode of operation.

The remotely managed system and method of the present invention results in a number of advantages over conventional electronically activated appliances commonly known in the art. For example, the remotely managed system and method of the present invention provides for the efficient servicing and maintenance of multiple remotely managed electronic dispensing apparatuses positioned in a single room, such as a public restroom. In accordance with the invention, maintenance personnel may simply enter the room with a portable communication device and determine which if any of the remotely managed electronic dispensing apparatuses are defective, or otherwise require servicing.

An additional advantage of the present invention is provided by the cooperation of the anti-vandalism bracket and strain relief sheath of the present invention. The anti-vandalism bracket and strain relief sheath protect the electronics and the associated cables or leads providing a communication path between the dispensing apparatus and the electronics. In the past, separation of the leads from the electronics often resulted from individuals intentionally or otherwise pulling on the leads or associated connectors. In accordance with the present invention, these leads are now covered with a protective sheath that cooperates with the anti-vandalism bracket to withstand the pulling forces that would otherwise separate the leads from the electronics. The strain relief sheath may also provide a drip loop for capturing water that could otherwise damage the electronics, cable or connectors.

A further advantage to the present invention relates to the system's ability to control and manage any number of dispensing apparatuses from a central controller or computer. The preferred hubs used in the distributed network environment enable a plurality of dispensing apparatuses to be connected to a network via the standard RS232 serial ports provided with traditional electronically activated dispensing apparatuses presently available in the art. Moreover, the filtering and calibrating technology incorporated in the system of the present invention significantly limits the number of false detections and false activations, and therefore reduces the number of instances of dispensing apparatus malfunctions, wear and tear on the dispensing apparatuses, and the waste of fluids dispensed by such dispensing apparatuses.

Additional features and advantages of the invention will be set forth in the detailed description which follows and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

BRIEF DESCRIPTION OF THE DRAWINGS

FIG. 7A–7J is a flowchart illustrating the IR and Battery Detection Thread of the firmware of the fluid dispensing device that forms a part of the preferred embodiment of the system and method of the present invention.

FIG. 9A–9D is a flowchart illustrating the Motion Detection Thread of the firmware of the fluid dispensing device that forms a part of the first preferred embodiment of the system and method of the present invention.

FIGS. 26a–26f depict of exemplary control and information screens displayed by the portable communication device (PCD) depicted in FIG. 25.

FIG. 28 is a block diagram illustrating the preferred elements of the transmitting portion of the control module depicted in FIG. 27.

FIG. 29 is a diagram of timing relations for pulses transmitted by the dispensing apparatus of FIG. 24.

FIG. 31 is a diagram illustrating the location of emitter and receiver elements on the sensor module of the dispensing apparatus depicted in FIG. 24.

DETAILED DESCRIPTION OF THE PREFERRED EMBODIMENTS

Figure 1:
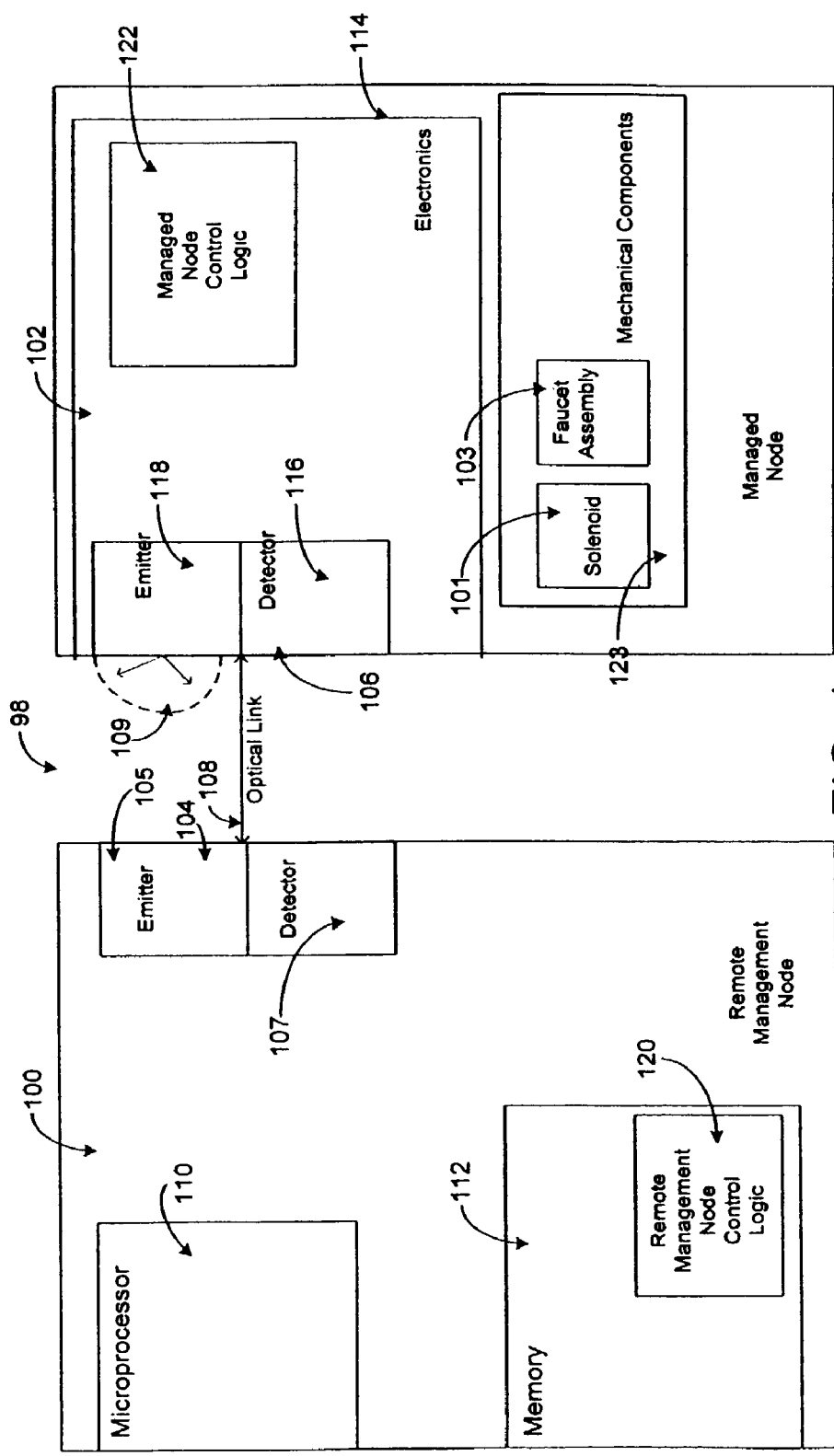
FIG. 1 is a block diagram illustrating a data communication system in accordance with a first preferred embodiment of the present invention.

Reference is now made in detail to a present preferred embodiments of the present invention, examples of which are illustrated in the accompanying drawings. Wherever possible, the same reference numerals will be used throughout the drawing figures to refer to the same or like parts. An exemplary embodiment of the data communication system and method of the present invention is illustrated in the block diagram of FIG. 1 and is designated generally throughout by reference numeral 98.

In accordance with the invention, the hardware elements of one preferred embodiment of the data communication system of the present invention include Remote Management Node 100 and Managed Node 102. Remote Management Node 100 includes generally an optical interface port 104, a processing element 110, and a memory element 112. Managed Node 102 includes generally an optical interface port 106, an electronics module 114, and a Mechanical Element 123. The optical interface port 106 of Managed Node 102 includes an emitter 118 and a detector 116. The emitter 118 has a pulse range 119 wherein an object within the arc showing pulse range 119 will reflect a pulse transmitted from emitter 118. Communication between Remote Management Node 100 and Managed Node 102 is accomplished by an optical link 108 in free space between the optical interface port 104 and 106.

The Memory Element 112 of Remote Management Node 100 houses the remote management control logic 120. Processing element 110 manipulates the optical interface port 104.

Managed Node 102 further includes Mechanical Elements 123, known to those skilled in the art, necessary for controlling an electronically operated appliance such as, but not limited to, a fluid-dispensing device 102. The electronics 114 include further a Managed Node Control Logic 122 that controls functionality of the optical port 106 and the manipulation of Mechanical Elements 123.

The emitter 118 of Managed Node 102 periodically emits a pulse, such as every 250 milliseconds, for example. The pulse emission creates an optical signal in free space. In order for the optical interface port 104 of Remote Management Node 100 to establish an optical link with the optical interface port 106 of Managed Node 102 Remote Management Node Control Logic 120 resides in a memory component 112 of Remote Management Node 100. The Remote Management Node Control Logic 120 can be implemented in software, hardware, or a combination thereof.

The Remote Management Node Control Logic 120 causes the emitter 105 to emit an Attention signal from the optical interface port 104. The Remote Management Node Control Logic 120 is managed and manipulated by the microprocessor 110. The attention signal that is emitted from the optical interface port 104 is transmitted regardless of its detection of a "media quiet" environment. In other words, the Attention Signal is emitted despite the 250-millisecond infrared pulse of the emitter 118 of Managed Node 102.

As previously described, the electronics 114 in cooperation with the Managed Node Control Logic 122 cause the periodic emission of an infrared pulse from the emitter 118. In this regard, the emitter 118 causes such an emission every 250 milliseconds. Prior to emission of the infrared pulse, the detector 116 attempts to detect an attention signal that is emitted from the optical interface port 104 of Remote Management Node 100. If an attention signal is not detected, the emitter 118 is allowed to operate normally, emitting an infrared pulse every 250 milliseconds. If, on the other hand, an attention signal is detected, normal operation of the emitter is discontinued and an optical link 108 is established between the optical interface port 104 and the optical interface port 106. If the attention signal is not detected, then normal operation of the emitter 118 continues.

In the first preferred embodiment of the invention Remote Management Node 100 is a handheld or portable device or computer, and Managed Node 102 is an electronically activated fluid dispensing device. During normal operations, the fluid dispensing device emits an infrared pulse from emitter 118 every 250 milliseconds. If an object is within pulse range of the emitted signal, the signal is reflected and the detector 116 detects the reflected signal. If the detector 116 detects the reflected signal, then the electronics 114 will activate a solenoid 101 causing fluid to be dispensed from the faucet assembly.

A handheld computer 100 allows a remote user to interrupt the normal operation of the Managed Node 102. In order for the handheld computer to communicate with the Managed Node 102, an optical link 108 is established between the optical interface port 104 of the handheld computer 100 and the optical interface port 106 of the fluid dispensing device 102. The optical link allows a maintenance user to perform various maintenance function remotely, including retrieving device-specific data stored by the electronics 114 of the fluid dispensing device 102, adjusting electronics parameters, or reprogramming the software that controls the fluid dispensing device.

Handheld Computer Software

The Remote Management Node Control Logic 120 (FIG. 1) on the handheld computer 100 (FIG. 1) initiates an optical link 108 (FIG. 1) between the optical interface ports 104 and 106 in accordance with a user's instruction. A description of the Remote Management Node Control Logic on the handheld computer 100 is now described in more detail with reference to FIG. 2, FIG. 3, and FIG. 4. The flow charts are merely exemplary and other methodologies may be employed to implement the present invention.

Figure 2:
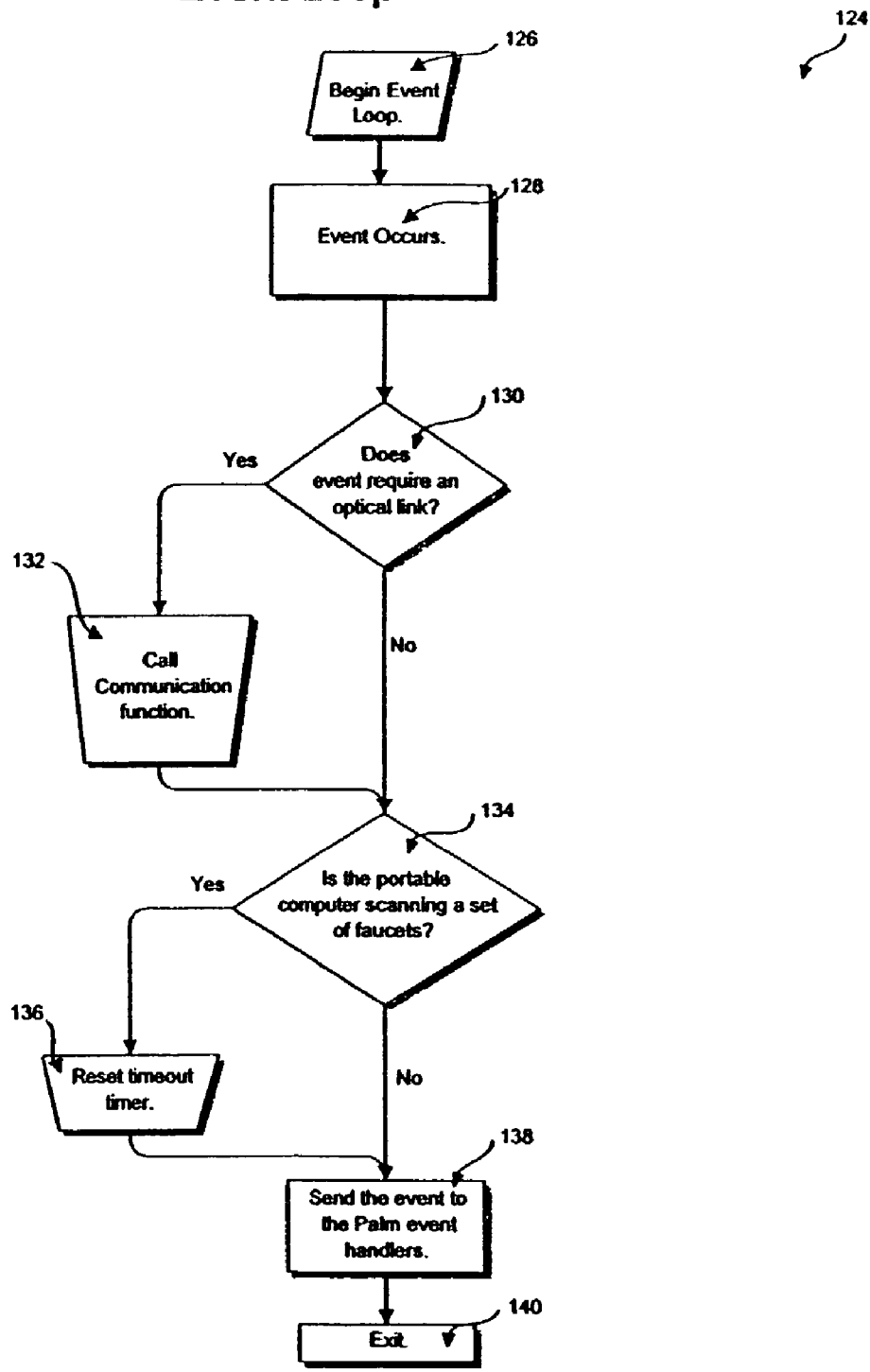
FIG. 2 is a flowchart illustrating the event loop of the control logic 120 in FIG. 1 of Remote management node of the present invention.

The Remote Management Node Control Logic 120 (FIG. 1) generally controls a user interface, input and output to the user interface, and input and output through optical interface port 104 (communication between optical interface ports). FIG. 2 is a high level illustration of the Remote Management Node Control Logic 120 (FIG. 1). Event loop 124 of the Remote Management Node Control Logic 120 (FIG. 1) executes on the handheld computer 100. In essence, the event loop monitors input and output activity. This monitoring step of the remote management control logic is represented in the event loop 124 by the processing symbol 128. When an event occurs, the event loop 124 then determines whether the event is one that requires the establishment of an optical link between the handheld computer and the fluid dispensing device in decision symbol 130. Events that require an optical link include retrieving data from the fluid dispensing device 102 providing a user data accessibility, reprogramming the Managed Node Control Logic 122 on the fluid dispensing device 102 (FIG. 1), or reconfiguring electronics parameters on the fluid dispensing device 102 (FIG. 1). The decision symbol 130 represents that part in the control logic where the input retrieved from step 128 is analyzed to determine whether the event requires the establishment of an optical link.

If an optical link is not required to perform the function requested in step 128 by the user, then the event loop 124 of the remote management control logic 120 determines whether the user has requested that a group of fluid dispensing devices be scanned as indicated by decision symbol 134. The scanning of various fluid dispensing devices is discussed further herein. If the event does not require the scanning of a set of fluid dispensing devices, then the event requested by the user is processed in step 138 by the palm event handlers that do not require the establishment of an optical link between the handheld computer 100 (FIG. 1) and the fluid dispensing device 102 (FIG. 1).

Figure 3:
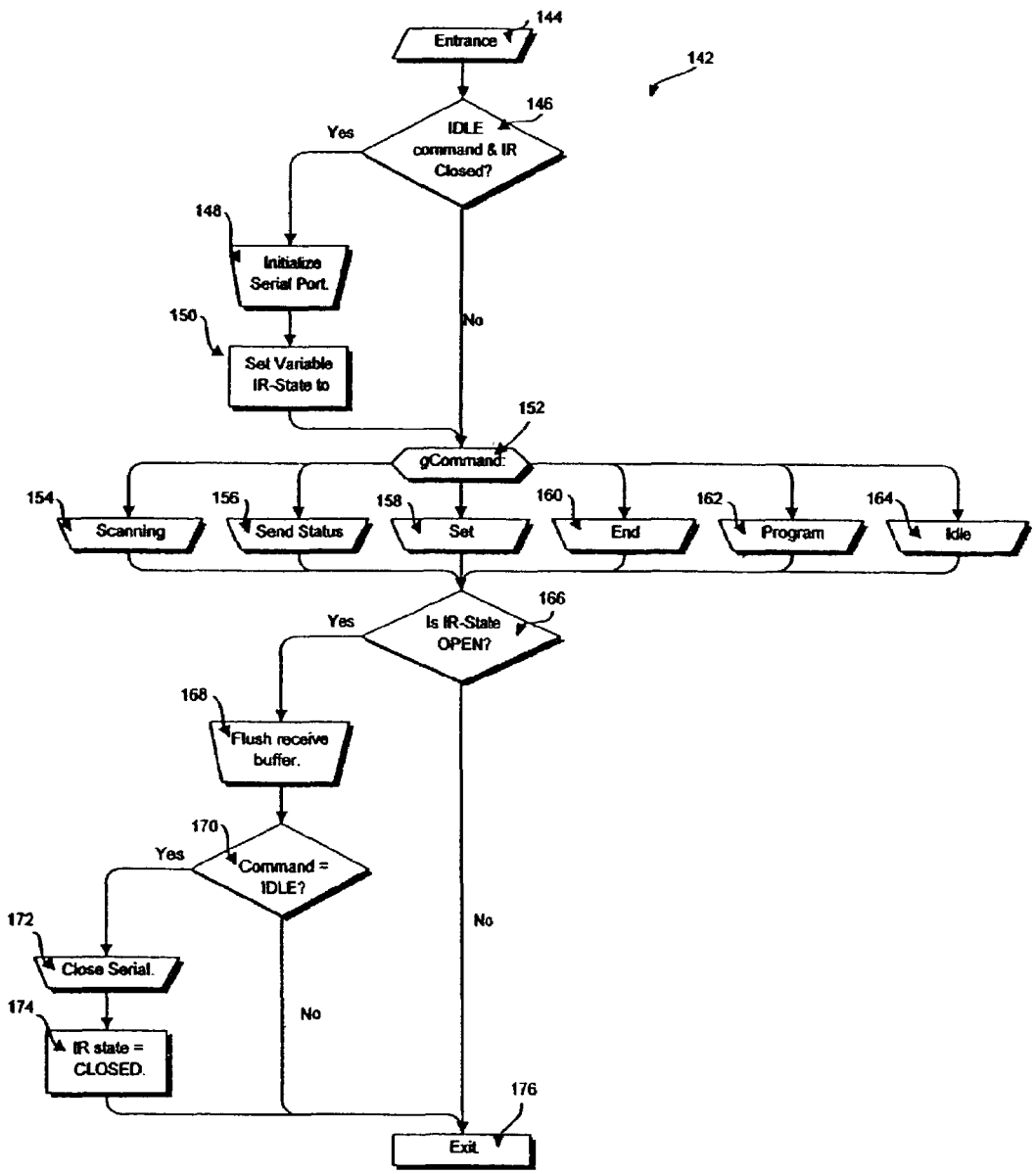
FIG. 3 is a flowchart illustrating the communication function called by the event loop 114 from the communication function call 122 illustrated in FIG. 2.

If at the decision symbol 130 it is determined that the requested event requires an optical link, then the communication function is called in processing symbol 132. The communication function is illustrated in FIG. 3 and is designated generally throughout as reference numeral 142. The communication function is entered from step 132 in FIG. 2 at the input/output symbol 144 in FIG. 3.

The communication function 142 first ascertains the status of the optical interface port 104 (FIG. 1) represented by the decision symbol 146 in the communication function 142. If the port is in a closed state, then the serial port is initialized indicated by the 10 processing step 148. Once the port is initialized, the IR-State variable is set to OPEN in the processing symbol 150. Once the port is initialized and the IR-State is set to OPEN, the handheld computer is now configured for communication with the optical interface port 106 (FIG. 1) of fluid dispensing device 102 (FIG. 1).

The communication function 142 provides six functional capabilities. Each separate function is indicated as a different indicator in the gCommand variable. The next step 152 is represented by a switch symbol serving as a director to the appropriate function as indicated by the gCommand variable. This variable represents the event requested by the user. The six functions available are represented by the processing symbols and include Scanning 154, Send Status 156, Set 158, End 160, Program 162, and Idle 164.

Figure 4:
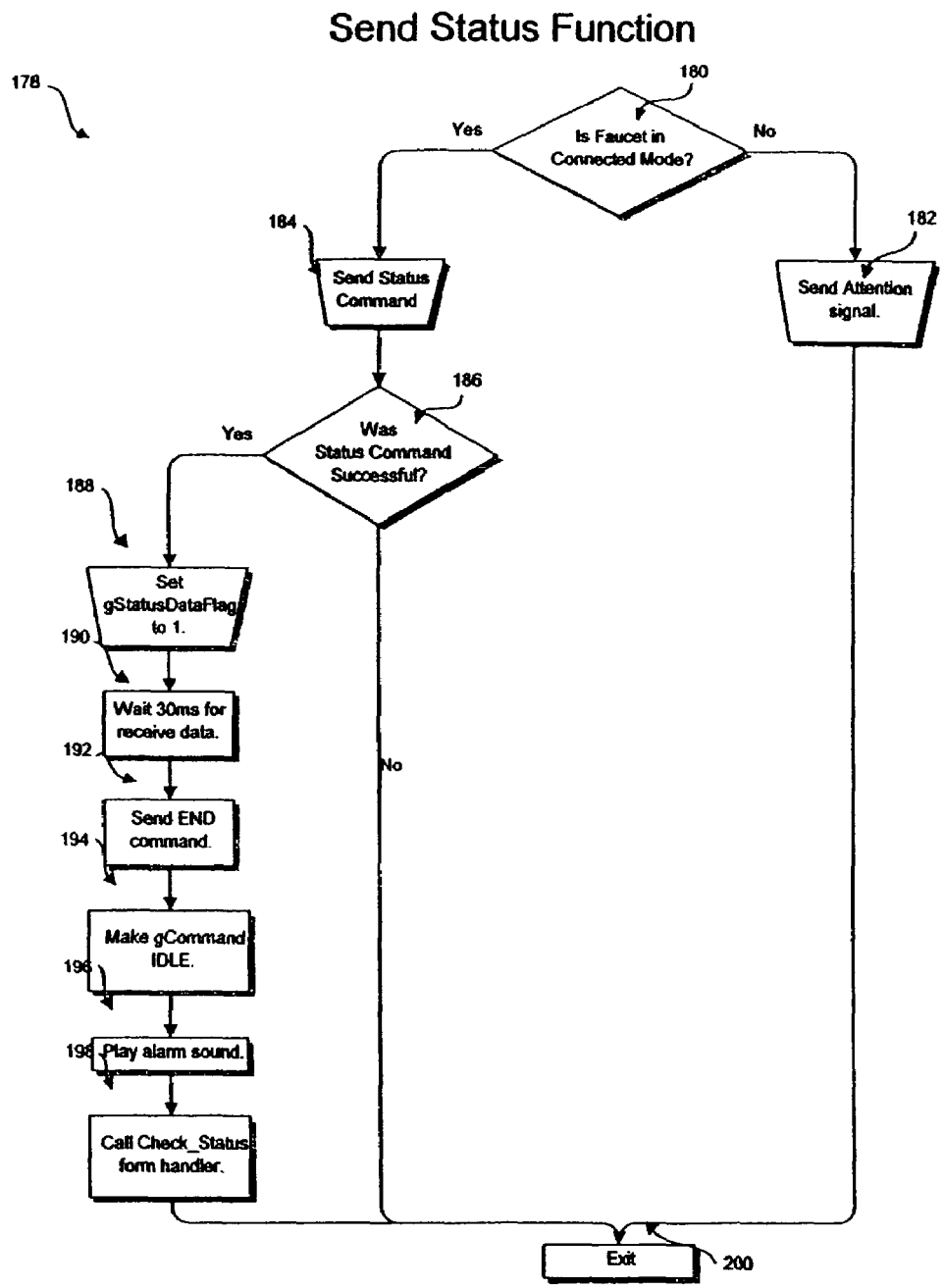
FIG. 4 is a detailed flowchart of the send status command called by the communication module 132 from the send status 146 in FIG. 3.

If the user chooses to retrieve from the faucet information about the fluid dispensing device, then at processing symbol 156 the Send Status function 178 in FIG. 4 is called. FIG. 4 illustrates in detail the control logic of the Send Status command function 178. The Send Status function 178 initially determines if the fluid dispensing device is in a connected mode. This step is represented by the decision symbol 180. The connected mode is present when an optical link 108 (FIG. 1) is established. If the connected mode has not been established, then the remote management control logic initiates an optical signal that is emitted from the optical interface port 104 (FIG. 1). This step is represented by the processing symbol 182. The signal is an Attention Signal and is referred to throughout as such. FIG. 21 illustrates the logic flow initiated on the fluid-dispensing device when the handheld device attempts to initiate connected mode. FIG. 21 is described further herein.

If the fluid dispensing device is in connected mode, the Send Status command is sent as represented by the processing symbol 184. The Send Status command requests from the fluid dispensing device a set of data describing various parameters of the device. The set of data includes parameters about the fluid dispensing device including information relating to power, settings, and usage. Power information relating to the fluid dispensing device includes unloaded volts, loaded volts, time in use, and replace battery date. The settings information includes the current operating mode, the range setting, the range offset, delayed settings, and virtual settings. The usage information consists of the number of uses, uses per day, and hours of operation. Other miscellaneous information can include current errors, past errors, software version, PCB number, and engineering change level.

Once the request for the status is sent in processing step 184, the Send Status function 178 determines whether the command was received. This step is indicated in the software function 178 by the decision symbol 186. If the request for status information was successful, a flag is set in the processing step 188 and the data is received by the handheld computer as indicated by the processing symbol 190. The optical link is then terminated when the handheld computer send the End command in step 192. The gCommand variable is set to idle in the processing step 194, an alarm is sounded in processing step 196 to indicate to the user successful receipt, and the Send Status function exits in processing step 200.

If the Status command is not received by the fluid dispensing device, the Send Status function 178 exits in processing symbol 200.

When the Send Status command module 178 exits, control is returned to the Communications function 142. In FIG. 3, the Communications function 142 then queries the status of the IR serial port in decision step 166. If the IR-State is OPEN, the receive buffer is flushed in processing step 168, and the gCommand variable is queried. If the command variable is Idle, then the serial port is closed in processing step 172 and the IR-State variable is set CLOSED. The Communications function exits in processing step 176 returning control of the processing to the event loop 124 (FIG. 2).

With reference to FIG. 2, the Event Loop 124 then queries the gCommand variable to determine if scanning is taking place in decision step 134. If scanning is taking place then the "time out" timer is reset in processing step 136. If the handheld computer is not scanning a group of fluid dispensing devices, then the event request is handled by functions that do not require the optical communication link 108 in processing step 138. The event loop then exits in processing step 140.

Fluid Dispensing Device Firmware

Figure 21A:
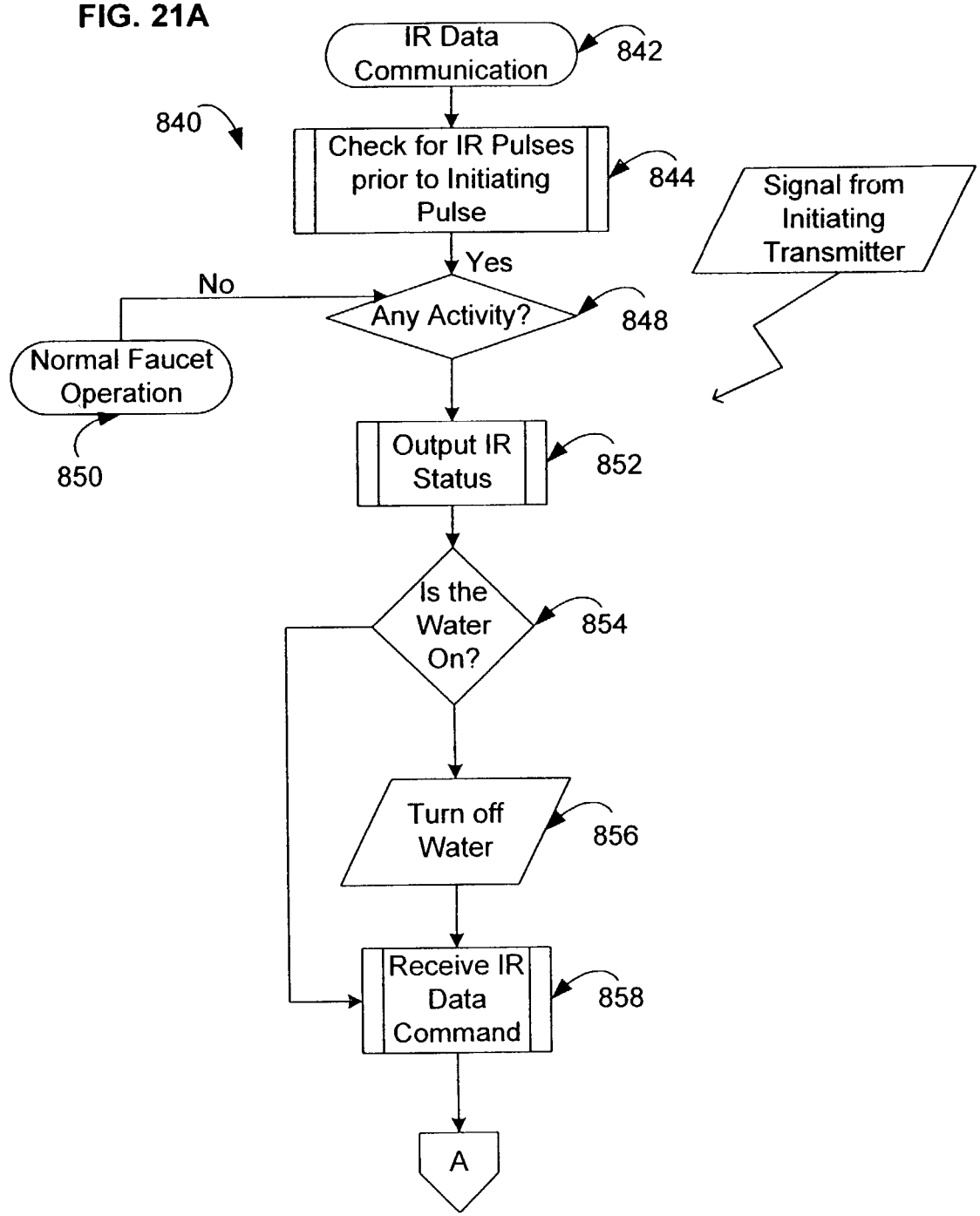
FIG. 21A–B is a flowchart illustrating the overall software flow of the firmware structure of the fluid dispensing device as shown in FIG. 5A–5D.
Figure 21B:
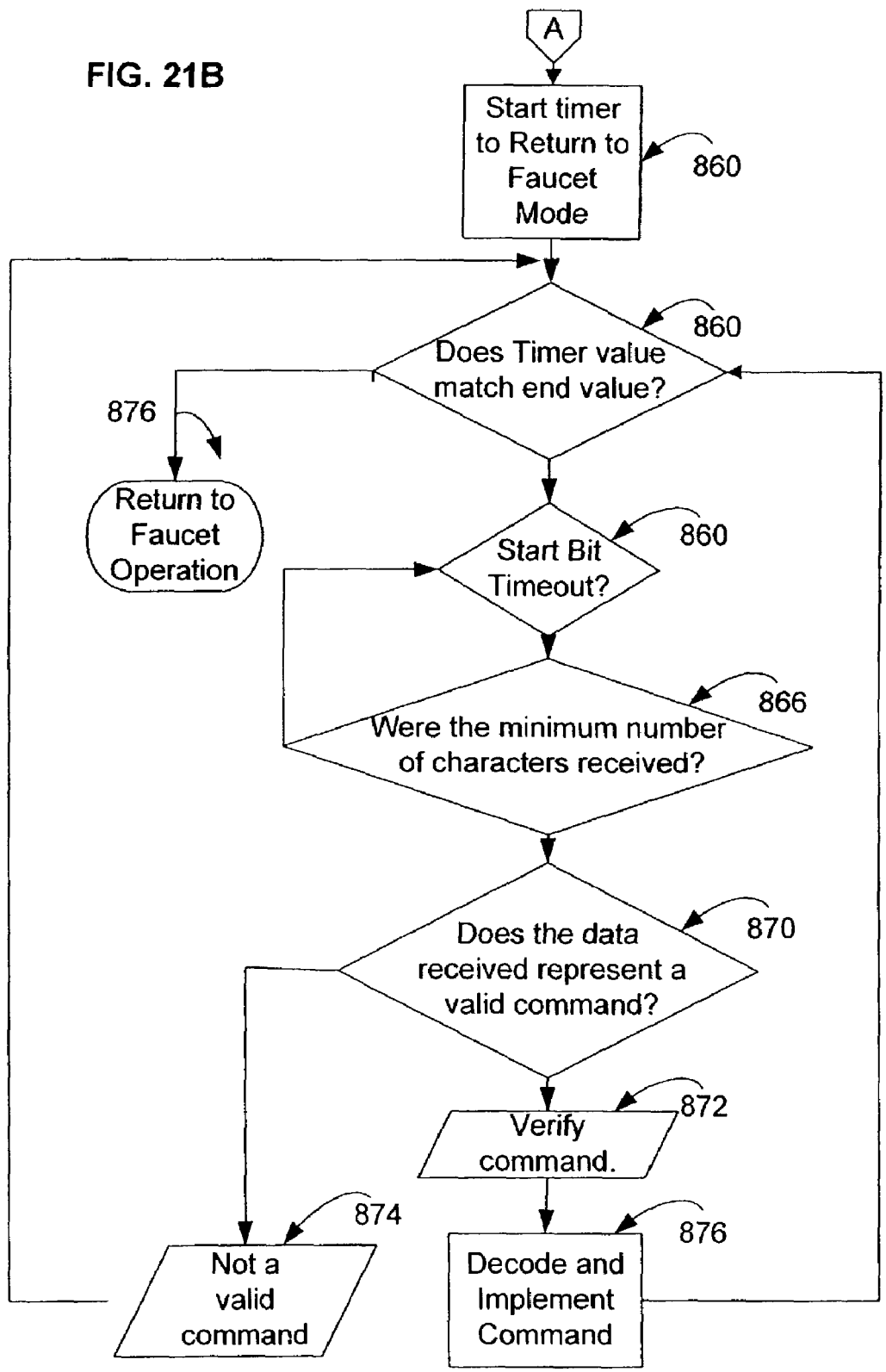

With reference to FIG. 1, the Managed Node Control Logic 122 of the fluid dispensing device 102 is now discussed with reference to FIGS. 21A–B, 5A–5D, 6A–6B, and 7A–7J. FIG. 21 illustrates the basic functional blocks of the fluid-dispensing device showing the fundamental communication components.

With reference to FIG. 21, the logic flow of the fluid dispensing device response to a request for Connected Mode from a handheld device is shown and is generally referred to throughout as reference numeral 840. The fluid-dispensing device response to a request for connected mode is initiated by an IR signal from the handheld device as shown by the signal transmission block 842. This initiating signal is the Attention Signal as discussed infra. During a pulse cycle, which is discussed further herein and is described in FIG. 5, the detector 116 (FIG. 1) samples its detection range to determine whether an initiating transmission was sent from the emitter 105 (FIG. 1) in a process illustrated by independent process symbol 844. This process samples its detection range for the Attention Signal prior to initiating a detection pulse for object reflection.

The format in which the signal is sent indicates that the signal detected is an Attention Signal, and those skilled in the art will recognize various ways that the Attention Signal can be formatted to accomplish this indication. In a preferred embodiment the Attention signal includes a stream of 'FF' characters followed by a linefeed. Also, the duration of the signal is greater than the length of the pulse cycle.

Decision symbol 848 illustrates the query that determines whether the sample received by the detector was an Attention signal (i.e. contained 'FF' characters followed by a linefeed. If the signal detected is not the Attention signal, then the fluid-dispensing device continues its normal operation as represented by terminating symbol 850.

If, on the other hand, the Attention Signal is received, the fluid dispensing device responds as indicated in independent process symbol 852. In decision symbol 854 the current state of the water flow is queried. If the water is currently on, the water is turned off as indicated by processing symbol 856, prior to responding to the request for connected mode.

In independent processing symbol 858, the command sent by the handheld computer is received. The various commands that can be sent by the handheld computer are described infra and include Scanning 154, Send Status 156, Set 158, End 160, and Program 152 (FIG. 3).

A timer starts in processing symbol 860 to return to normal operation after a fixed amount of time. Decision symbol 860 determines whether the End command 160 (as shown in FIG. 3 and described supra) has been sent. If the End signal is sent, then the fluid-dispensing device returns to normal operation in terminating symbol 876. If the End command has not been detected, then the process 840 determines in decision symbol 862 whether the entire signal has been sent. If the entire signal has been sent, according to the bit count expected, then the process determines in decision symbol 866 whether the entire signal was sent. If the command is a valid one, as determined by decision symbol 870, then the command is decoded and implemented in processing symbol 876. Connected Mode is then terminated through decision symbol 860 at termination symbol 876.

FIGS. 5A–5D illustrate the control logic 122 that controls the electronics 114 (FIG. 1) of the fluid dispensing device 102, thereby controlling the communication on the fluid dispensing device node side of the optical link 108.

Figure 5A:
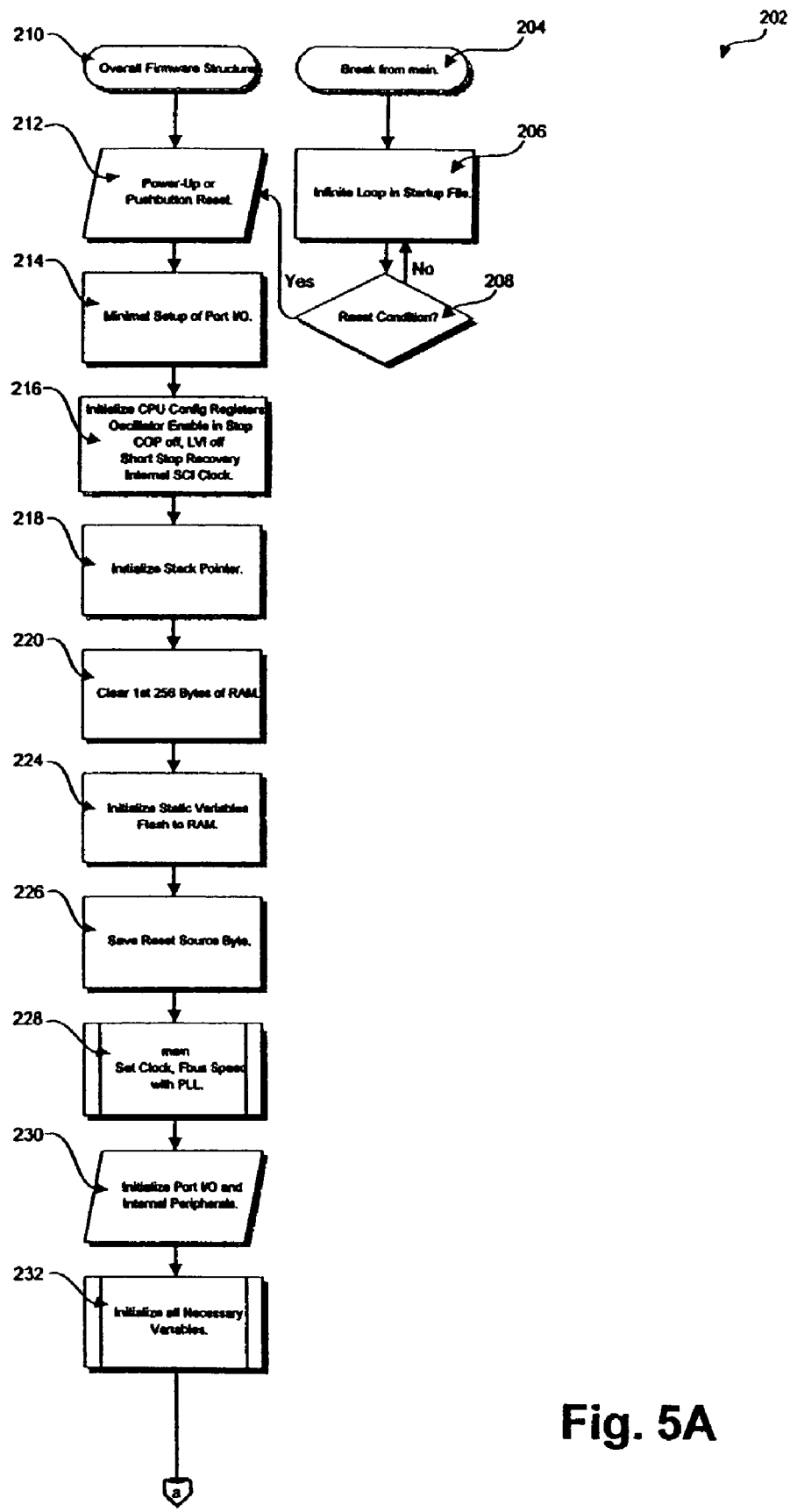
FIG. 5A–5D is a flowchart illustrating the general functionality of the overall firmware structure of the fluid dispensing device that forms a part of the first preferred embodiment of the system and method of the present invention.
Figure 5B:
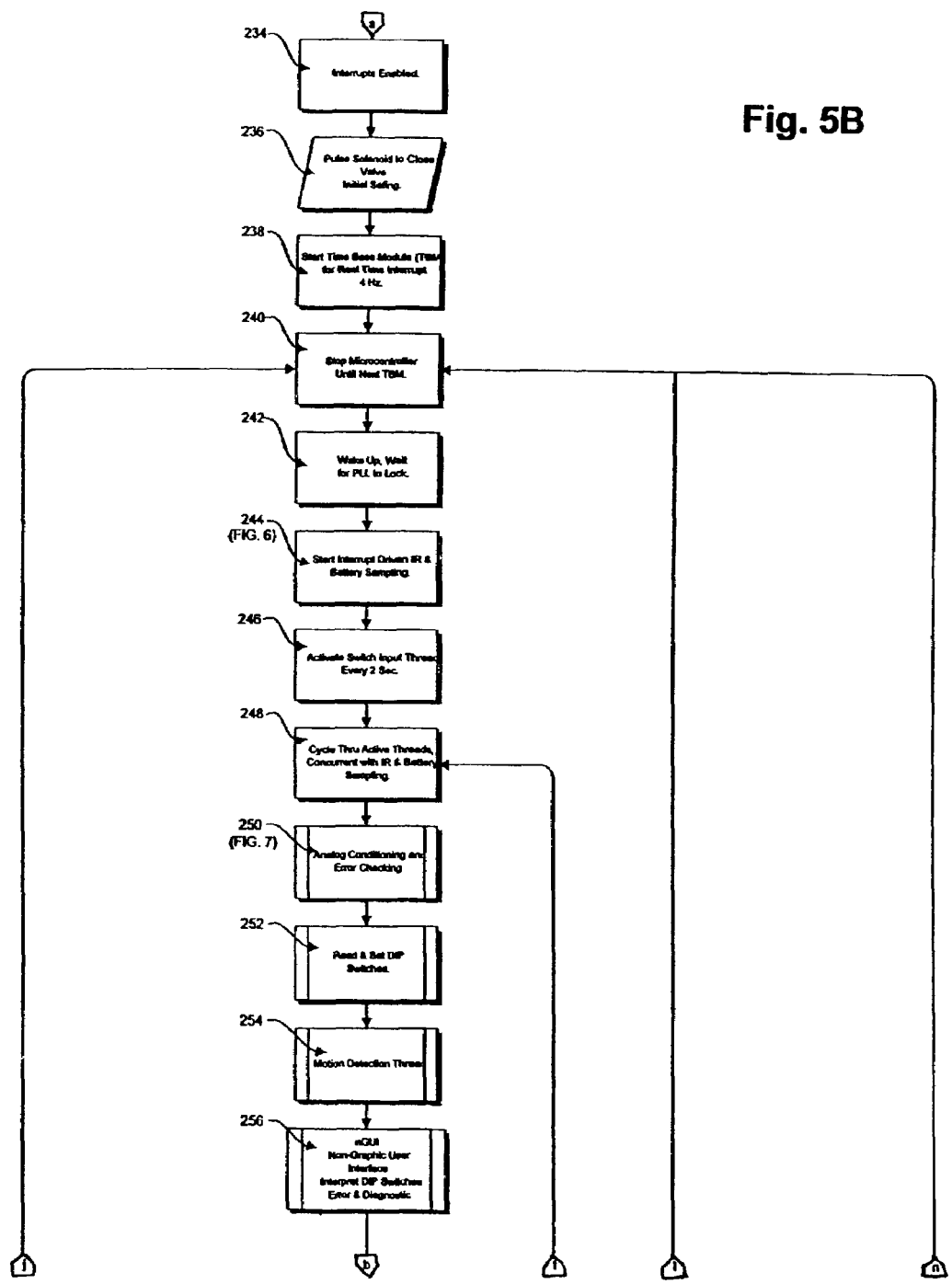
Figure 5C:
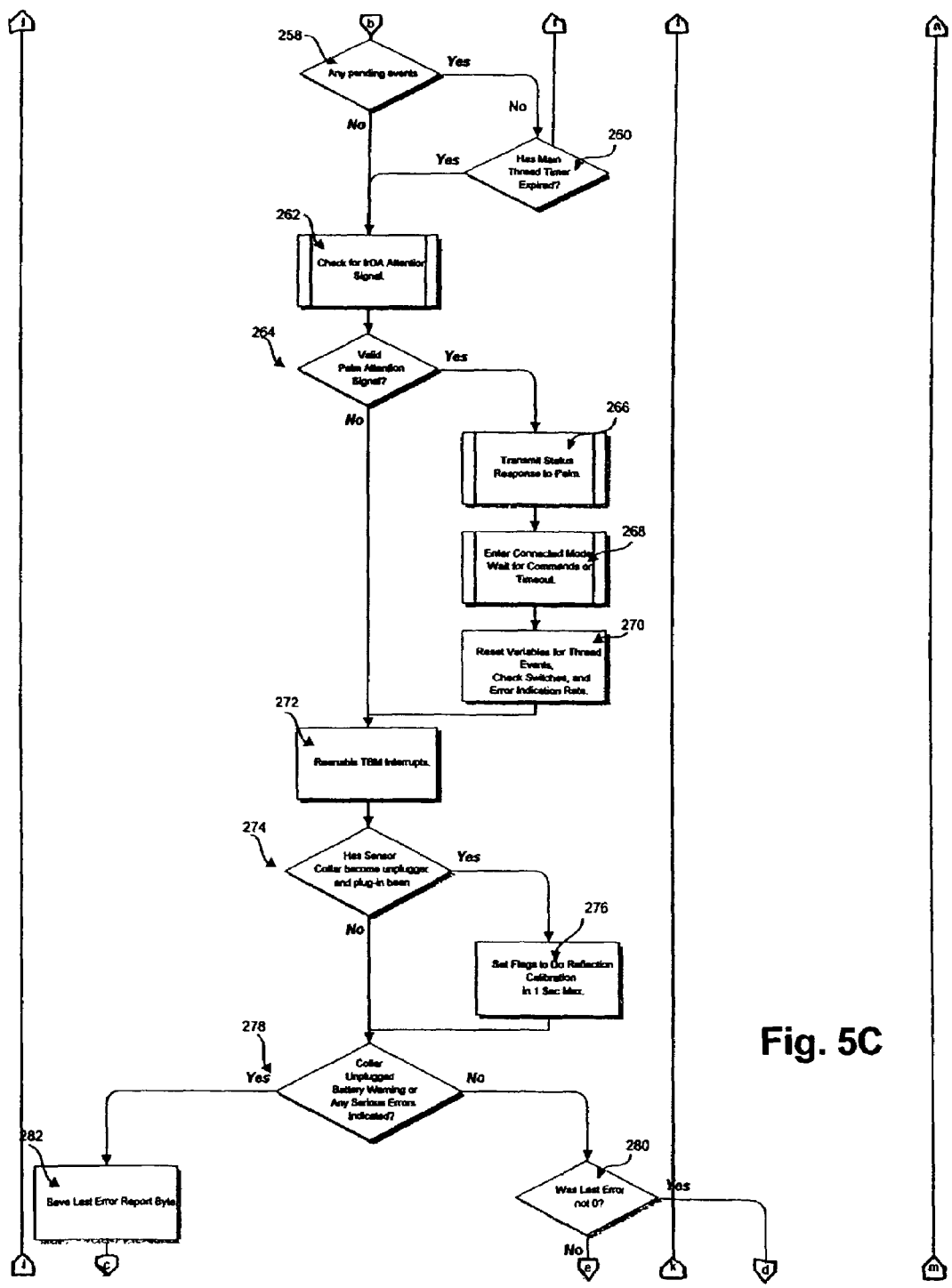

With reference to FIG. 5A, as indicated by the processing symbol 202, the fluid dispensing device is powered on or reset. Numerous setup functions are performed in processing steps 214–234 (FIG. 5A) and 236–238 (FIG. 5B). Specific functions related to data communication operations are indicated by processing symbol 230 including initializing the input/output ports, CPU peripheral initialization, and time base module (TBM) process 236 (FIG. 5B) initialization. The TBM is responsible for the timing of the IR pulse every 250 milliseconds. It performs the real time interrupt that occurs every 250 milliseconds for cycle timing, and it monitors seconds and hours.

With reference to FIG. 5B, a pulse cycle includes generally powering up the microprocessor, attempting the detection of the Attention signal emitted by the handheld computer, emitting a pulse from the fluid dispensing device emitter, and powering down the microprocessor. The processing symbol 240 is the first processing symbol in this process. It indicates that the process element included in the electronics component 114 (FIG. 1) is powered off as a first step in a pulse cycle. The TBM determines that 250 milliseconds have elapsed, and the microprocessor is awakened as indicated by processing symbol 242. In this processing step, the overall firmware process 202 also waits for the phase-locked loop to lock in order to maintain a constant 4.0 MHz for normal operation.

The processing symbol 244 represents the initiation of the interrupt driven IR and Battery Sampling Routine. The interrupt driven IR and Battery Sampling Routine is now discussed with reference to FIG. 6A and 6B. The Interrupt Driven IR and Battery Sampling Routine begins at input symbol 328 in FIG. 6A and is designated general throughout as reference numeral 326.

Figure 6A:
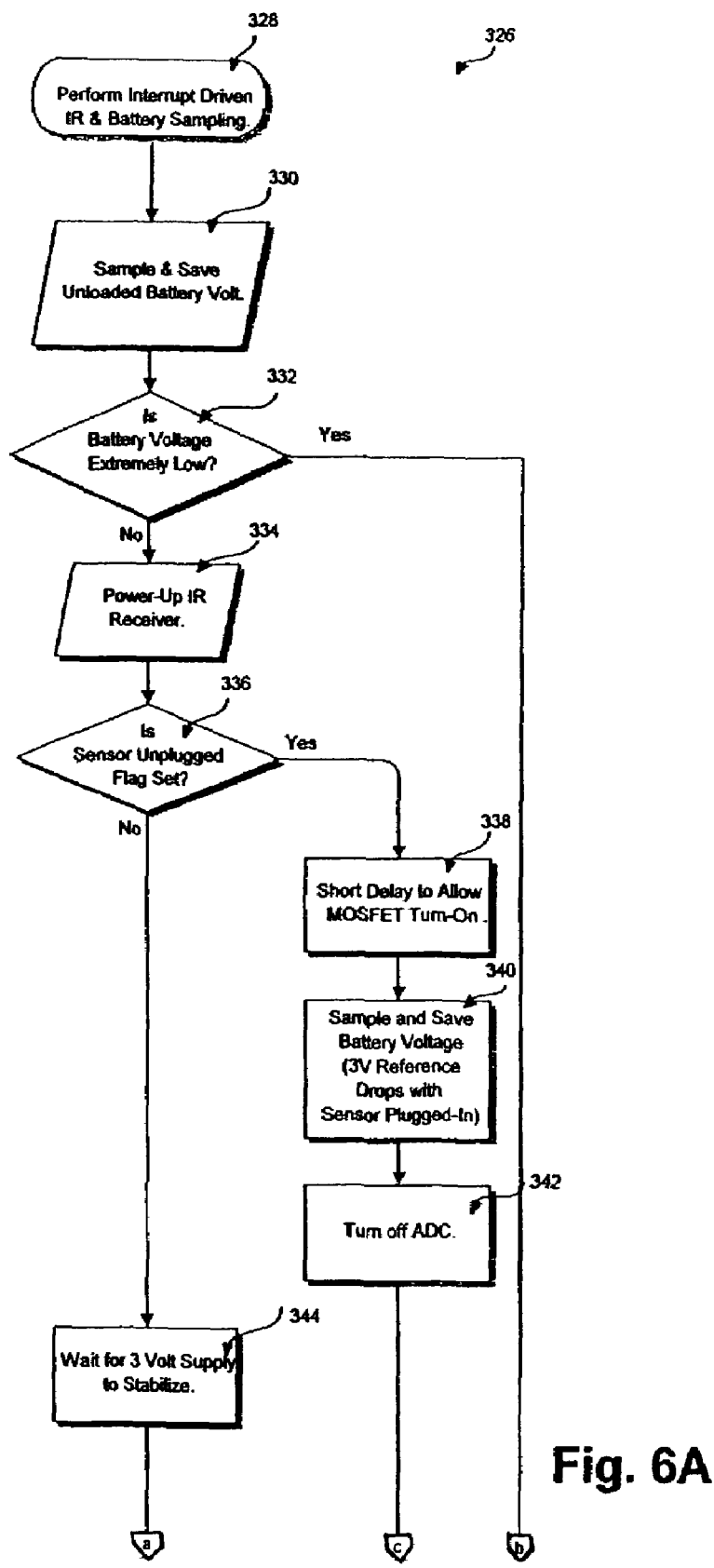
FIG. 6A–6B is a flowchart illustrating the Interrupt Driven IR and Battery Thread of the firmware of the fluid dispensing device that forms a part of the first preferred embodiment of the system and method of the present invention.
Figure 6B:
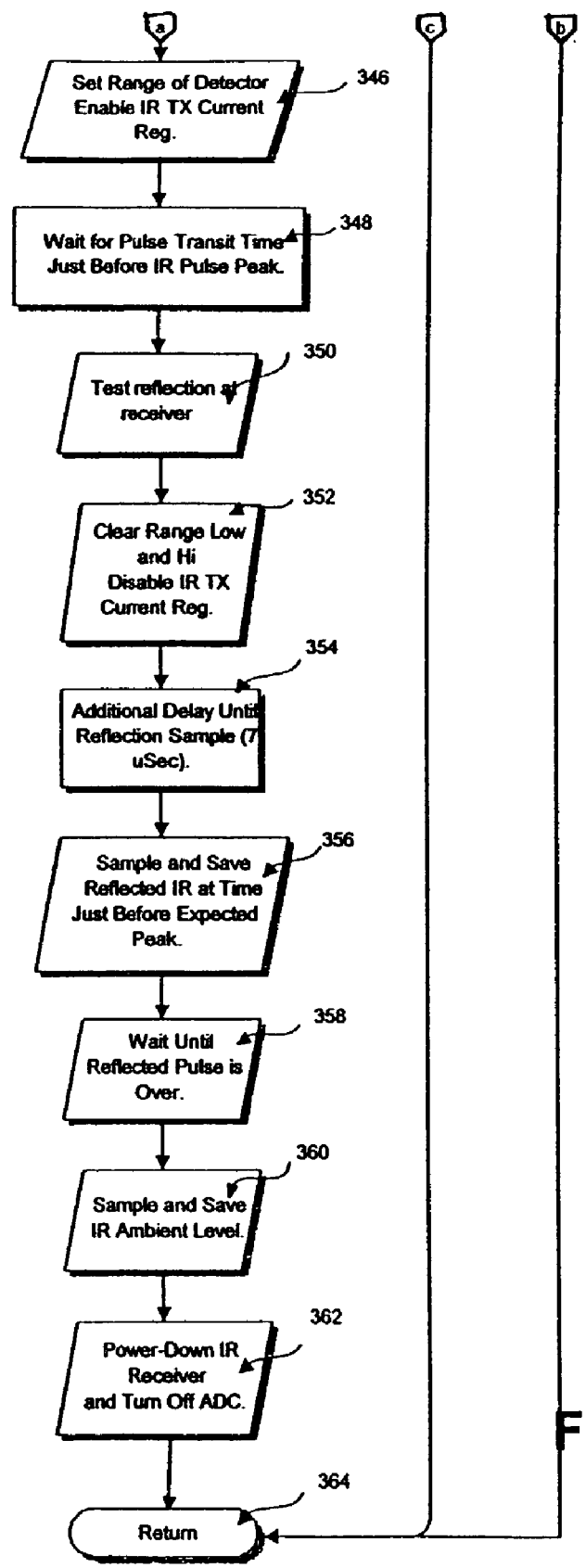

The IR and Battery Sampling Routine is interrupt driven and is generally responsible for sampling the battery voltage and obtaining a reflected sample of an IR pulse from the emitter 118 (FIG. 1). The processing step 330 represents the sampling and saving of a battery voltage reading. The decision step in 332 determines whether the battery voltage is extremely low. If the battery voltage is low, then the IR and Battery Sampling Routine 326 returns to the overall firmware program 202 represented by the output symbol 364 in FIG. 6B. If the battery voltage is not low, then the IR receiver is powered on, which is represented by processing symbol 334. In decision symbol 336, the optical sensor flag is examined to determine if the detector 116 (FIG. 1) is connected. If the optical sensor flag indicates that the detector 116 (FIG. 1) is unplugged, only the loaded battery voltage is sampled. In processing step 338 the MOSFET is turned on, the loaded battery voltage is sampled and saved, as represented by processing step 340. The Analog to Digital Converter (ADC) is then turned off, as represented by processing step 342. Routine 326 then exits in terminator symbol detector 364 (FIG. 6B)

If the detector is not unplugged, as indicated in decision step 336, then the Routine 326 waits for the 3 volt power supply to stabilize, as indicated by processing step 344.

In processing symbol 346 the range on the optical sensor is set to low or high, and the IR transmit regulator is enabled to initiate a pulse. With reference to FIG. 6B, once the infrared transmit pulse is enabled, the Routine 326 waits for the pulse time then tests the detector 116 to determine a reflection in processing symbols 348 and 350, respectively. The IR transmit is then disabled in processing step 352. Processing step 354 indicates that an additional delay of approximately 7 microseconds is allowed so that an entire reflection sample can be detected. The reflected IR is sampled and saved just before the pulse peak in processing step 356. Once the reflected pulse is completed, the IR ambient level is sampled and saved in processing step 360. The IR receiver and the ADC are then turned off. The IR and Battery Sampling Routine 326 then returns to the thread handler in FIG. 5.

Processing step 246 represents enabling the switch input thread that is executed every 2 seconds. This thread queries the necessary input mode and makes changes accordingly.

Processing step 248 represents a "kernel" loop that cycles through and calls each of the other active threads. Each thread has separate phases, which are typically run once each thread call, and control movement to the next phase. Thread diagrams show one phase of the same thread run directly after the last. Any other active threads and their current phases would run before the same thread is accessed again.

The next processing symbol 250 represents a thread that is responsible for performing analog conditioning and error checking on values obtained from the battery and the infrared receiver. FIG. 7 is a flow chart of the Analog Conditioning and Error Checking Thread represented by the processing step 250. The program starts at input symbol 368 in FIG. 7A.

The thread represented by FIG. 7 has four phases including phase 0, phase 1, phase 2, and phase 3. Phase 0 performs an analysis on the battery voltage level of the system and makes adjustments in the system to compensate for voltage changes. Phase 0 begins in processing step 370 in FIG. 7A with a battery sample from the IR and Battery Sampling Routine 326 illustrated in FIG. 6. The voltage of the battery is initially sampled at calibration time. The calibration voltage is stored and is used in determining the operating voltage of the system. The calibration voltage is compared to a standard value that is a constant value stored in the system. Standard voltage is a constant expected value of the voltage of the system under normal conditions. The calibration voltage and the standard voltage are compared as indicated by the decision symbol 372. The current real-time battery voltage is then calculated. If calibration voltage is greater than the standard voltage, then the battery voltage is determined as represented by processing symbol 374, subtracting from the sample obtained from the IR and Battery Sampling Routine 326 the difference between the calibration voltage and the standard voltage. If the standard voltage is greater than the calibration voltage, then the current real-time battery voltage is determined as represented by processing symbol 376, adding to the sample voltage the difference between the standard voltage and the calibration voltage. Next, the battery voltage is analyzed as indicated by the decision symbol 380 to determine if the voltage is below an operational level. If the voltage is below operational level and the previous voltage level obtained from a prior sample is less than or equal to a warning level, then the system is entered into emergency shut down mode as indicated by the predefined processing symbol 388.

Figure 7A:
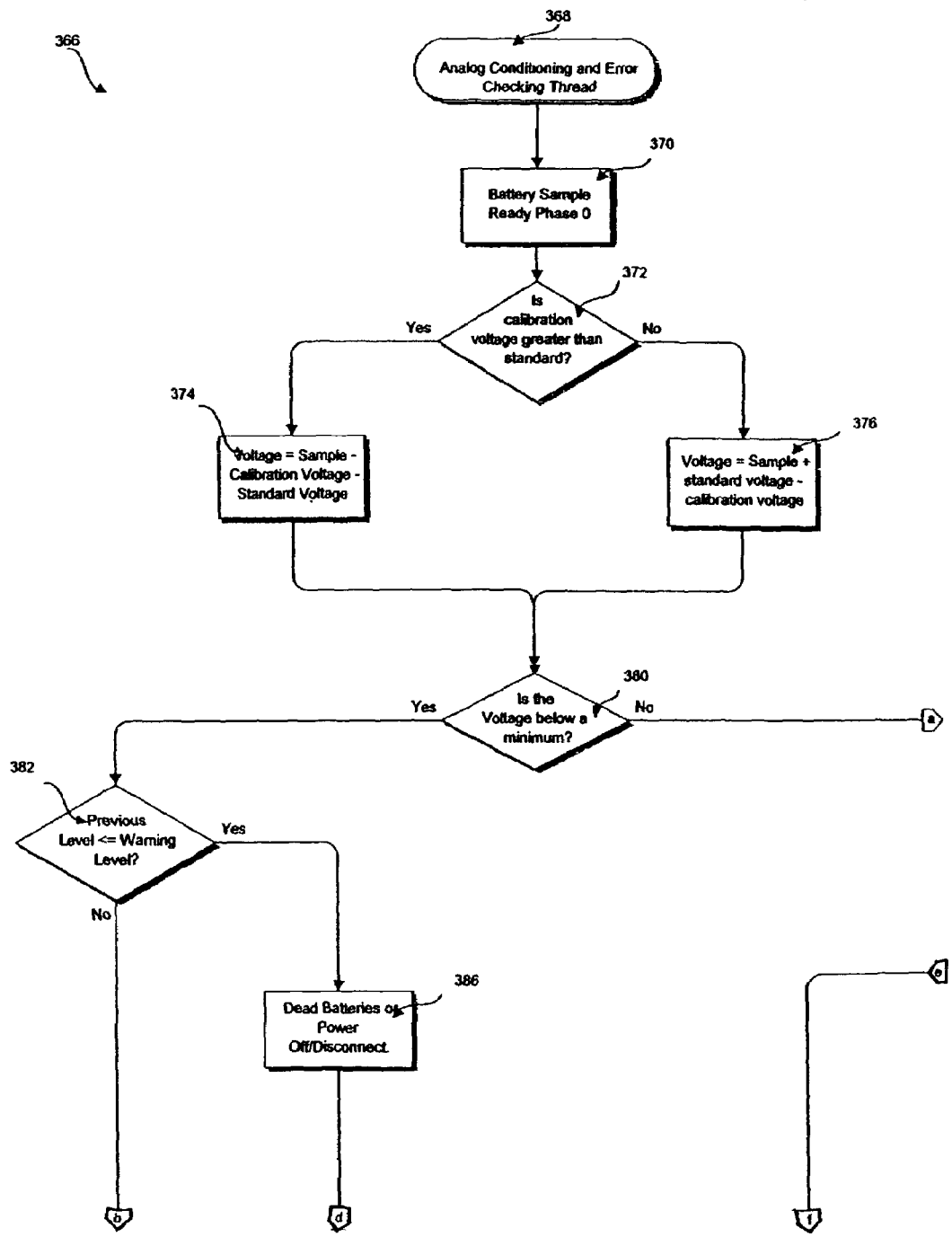
Figure 7B:
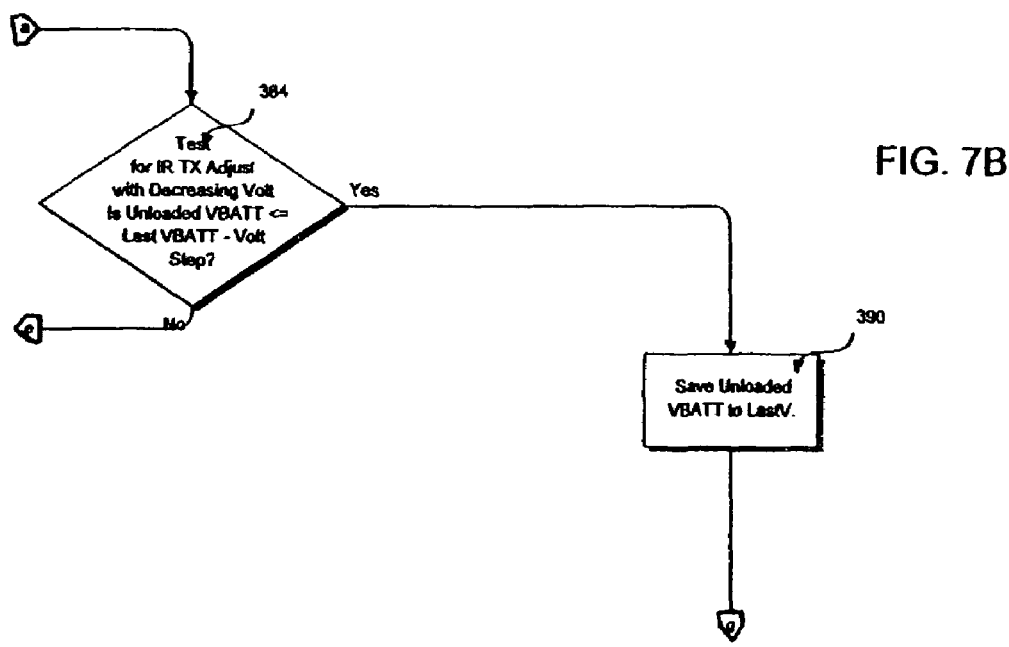
Figure 7C:
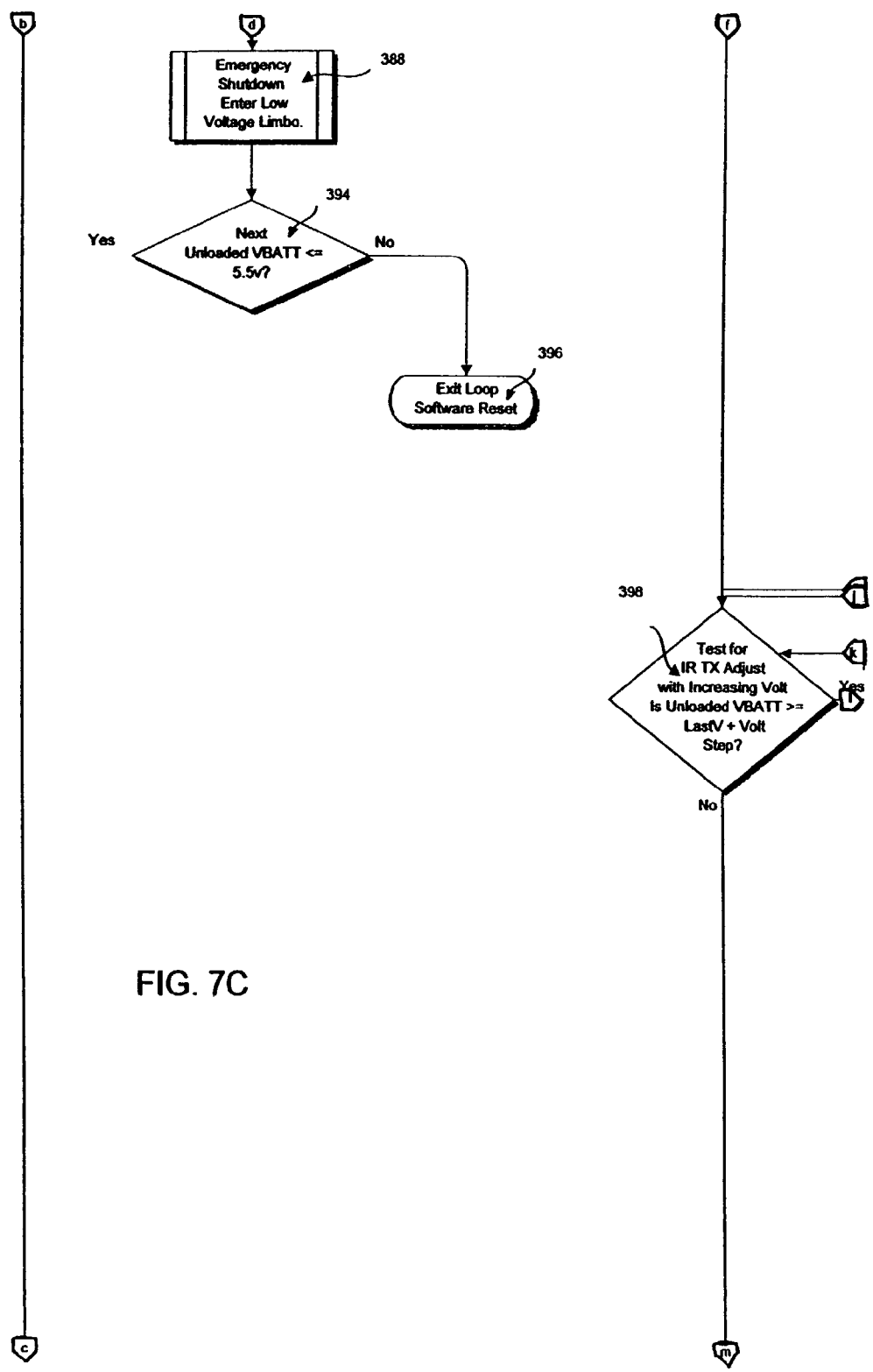

With reference to FIG. 7C, as indicated by the decision symbol 394, the current real-time voltage is compared to 5.5 volts. If it is greater than 5.5 volts, then the thread exits and the software is reset, as indicated in symbol 396. If the previous voltage level is greater than the voltage warning level, then the thread enters Phase 1 in FIG. 7E.

If, however, as indicated in the decision symbol 380, the voltage is not below an operational level, processing symbol 384 (FIG. 7B) and processing symbol 398 (FIG. 7C) indicate that the IR and Battery Detection Thread adjusts the IR emitter power corresponding to changes in the operating voltage of the system. With reference to FIG. 7B, if the voltage has decreased since the last battery voltage sample, then the current real time battery voltage is saved to a variable, LastV, representing the previous sample voltage value, as indicated by processing symbol 390.

Figure 7D:
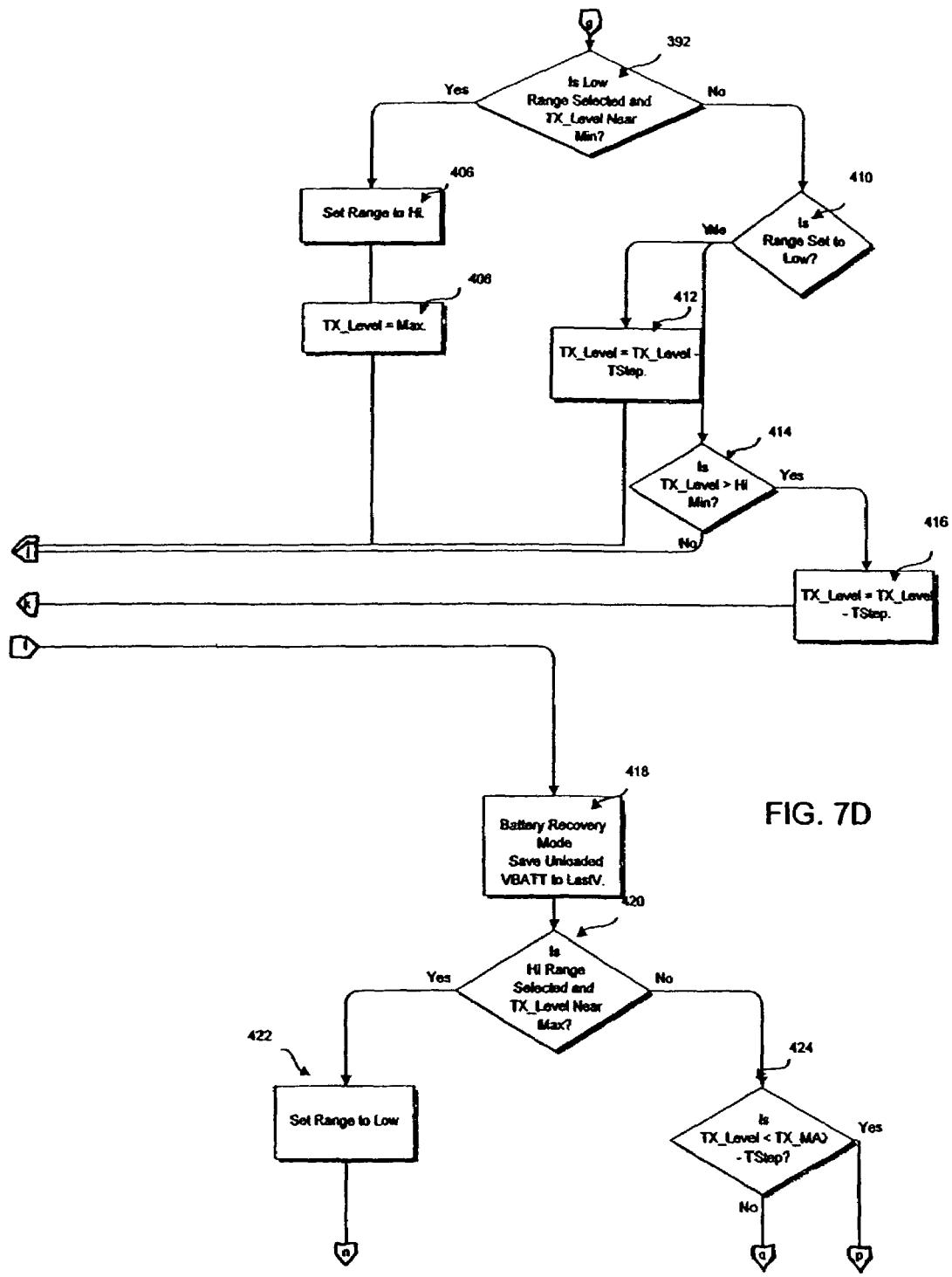

With reference to FIG. 7D the emission power level of the IR emitter is then adjusted to compensate for the decrease in the overall system power changes. The decision symbol 392 indicates that the range of the optical emitter is examined. If the range of the optical emitter is selected low and the transmit level is at a minimum, then the range of the emitter is set to high and then transmit level is set to a maximum as indicated by processing symbols 406 and 408, respectively.

When the loaded voltage of the system decreases, more power is provided to the emitter to compensate for the decrease. This allows the emitter to have a more constant range. If the range is not selected as low, as a result of the query indicated by decision symbol 392, then the decision symbol 410 indicates that the range is analyzed to determine if it is low. If the range is low, but the transmit level is not at a minimum, then the transmit level is altered in processing symbol 412 subtracting from the transmit level a variable integer, Tstep.

This allows decreasing adjustment of the transmit level where the range of the device is already toggled low, yet the power of the system has decreased. Decreasing the transmit level decreases the required power of the emitter. If the query in decision step 410 indicates that the range is not set low, then decision symbol 414 determines if the transmit level is at a minimum high. If it is, then the transmit level is altered in processing symbol 416 by subtracting from the transmit level a variable integer, Tstep.

If the overall system voltage has increased since the last battery voltage sample, then decision symbol 398 (FIG. 7C)indicates an adjustment for an increase in overall system operating voltage. With reference to FIG. 7D, processing symbol 418 examines the current real time operating voltage to determine if the voltage is greater than the last voltage reading. If the current voltage is greater than the last voltage reading, then decision symbol 420 queries the range and the transmit level of the IR emitter. If the range is selected as high and the transmit level is at a maximum, then the range is set to low in processing symbol 422 and the transmit level is set to low. If the transmit level is not at a maximum, then the transmit level is examined to see if it is less than the maximum transmit level subtracting an integer variable, TStep. If the transmit level is capable of being adjusted from the query in decision step 424, then the processing step 428 (FIG. 7F) indicates that the IR transmit level is adjusted, providing the sensor more current. This is accomplished by increasing the transmit level by a variable integer, Tstep.

Figure 7E:
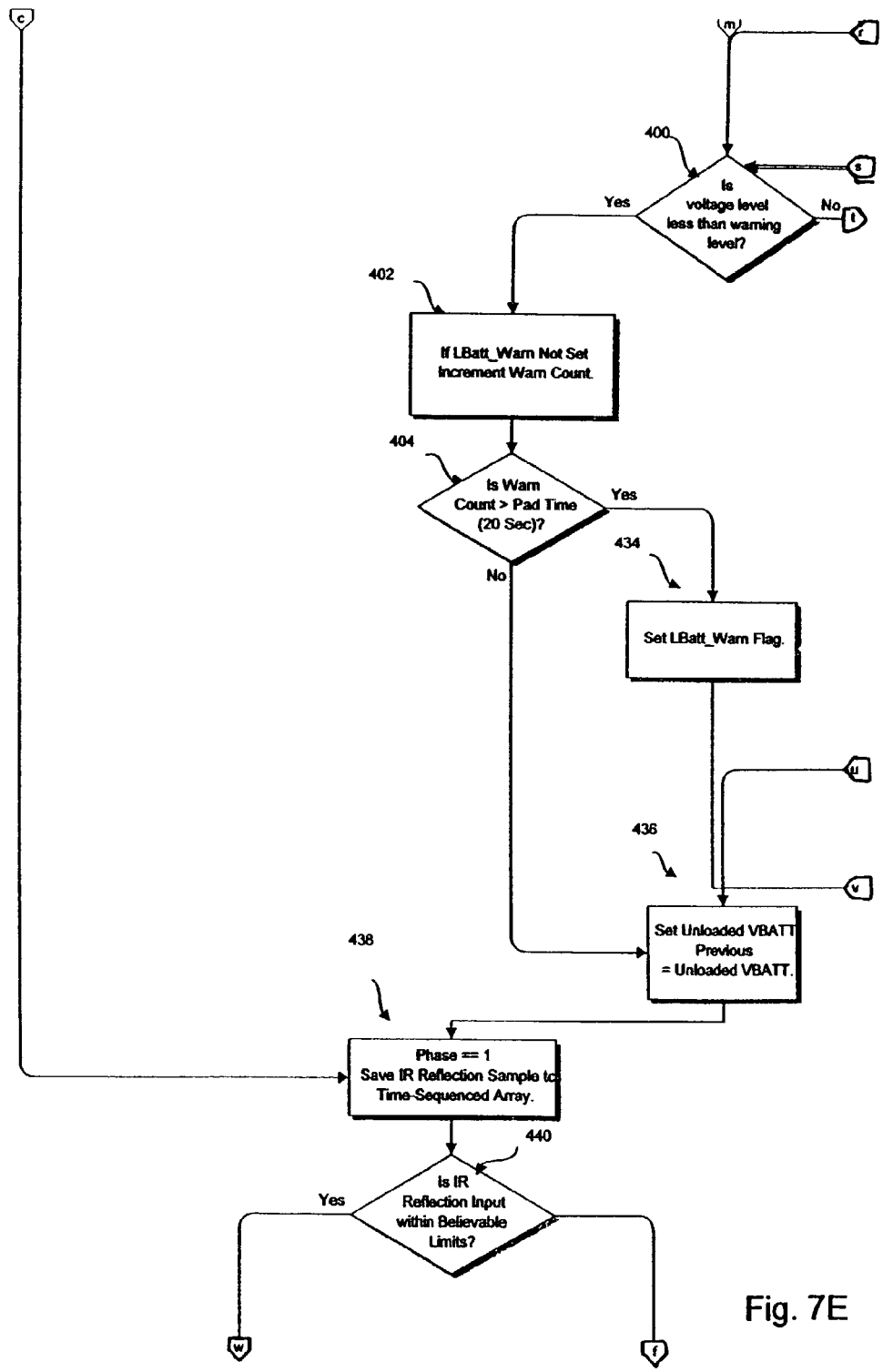

Once the IR emitter transmit level is adjusted for either an increase or a decrease in overall system power, the IR and Battery Detection Thread 366, as indicated in FIG. 7E, examines the overall system voltage reading in decision symbol 400.

Figure 7F:
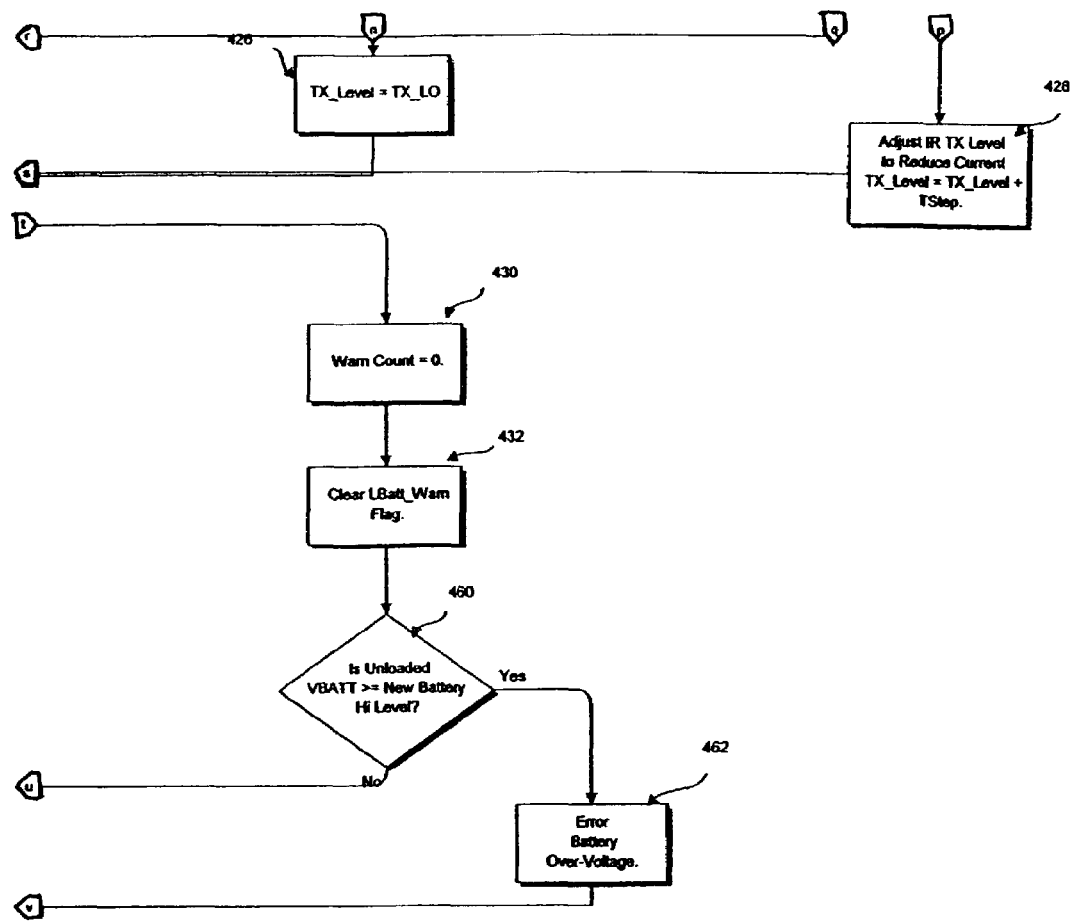

If the voltage level is below the warning level, then a flag is set in processing symbol 402 that indicates that the voltage level is below the warning level. With reference to FIG. 7F, if the voltage level is greater than the warning level, then the warning count is set to zero in processing symbol 430, and the voltage low warning flag is cleared in processing symbol 432. The unloaded battery voltage is compared to the battery high level in decision symbol 460. If the voltage is high an error is indicated in processing symbol 462. Then the previous voltage variable is set to the current voltage value in processing symbol 438.

With reference to FIG. 7E, at processing symbol 404, if the warning count indicates a 20-second low voltage, then the low battery warning flag is set. In processing symbol 432, the current real time voltage reading of the overall system is saved to the variable indicating the previous voltage reading to be used by the next iteration of the IR and Battery Detection Thread 366. Phase one begins at processing symbol 438.

The starting point for phase one is indicated by processing symbol 438 in FIG. 7E. Phase one (1) of the Analog Conditioning and Error Checking Thread 366 is responsible for determining if the IR sample received from the IR and Battery Sampling Routine is within believable limits. In addition, phase one examines the IR electronics to determine if the electronics are in working order.

Figure 7G:
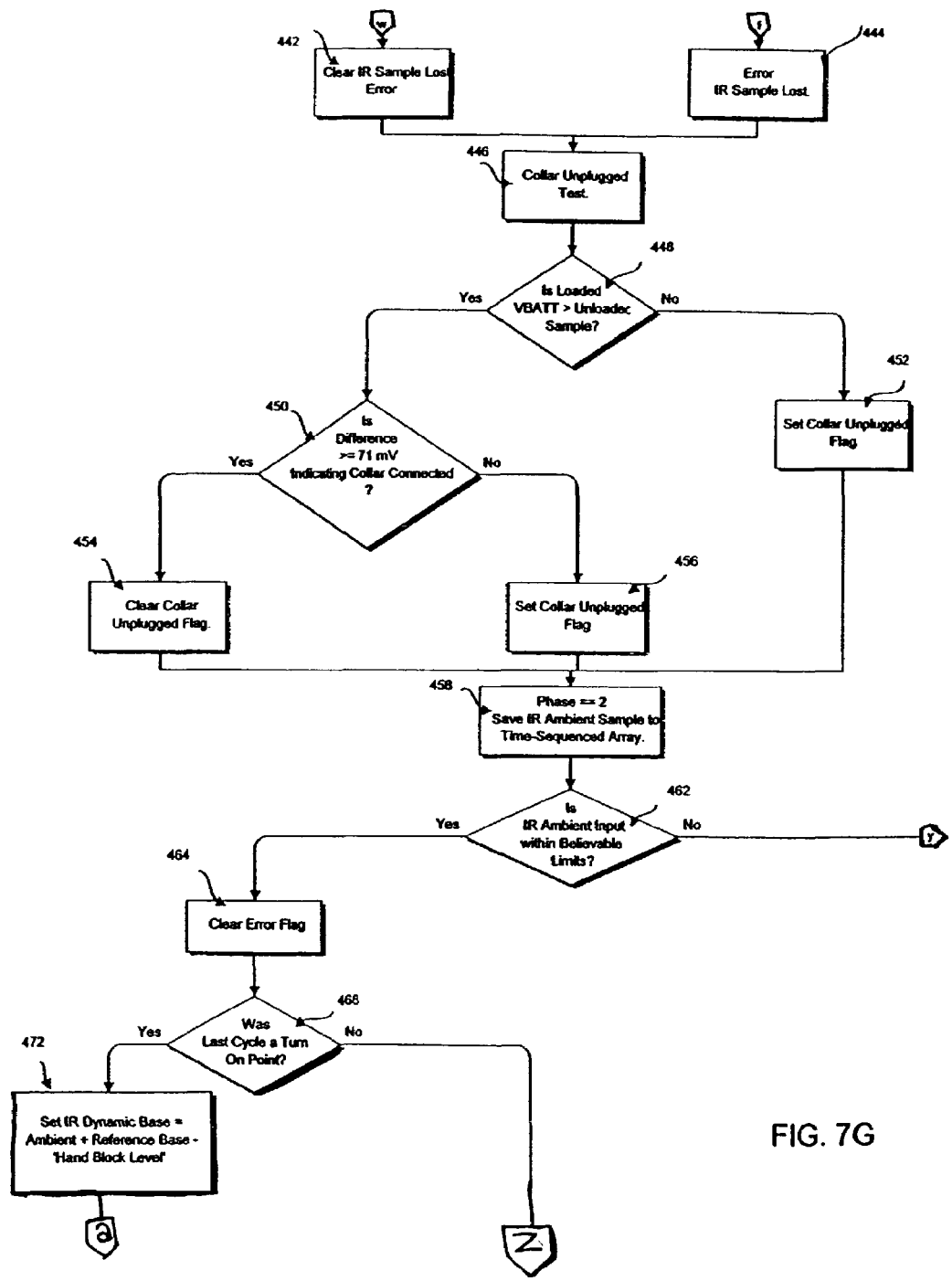
Figure 7H:
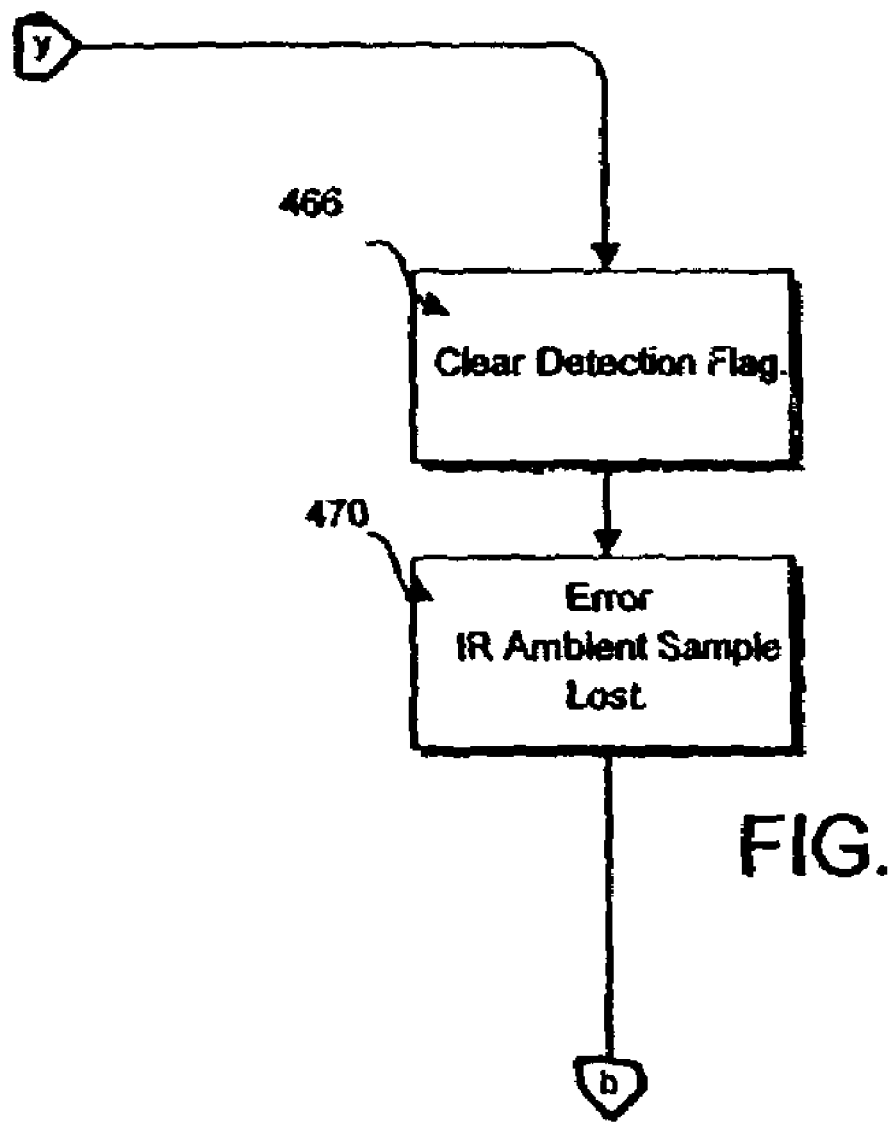
Figure 71:
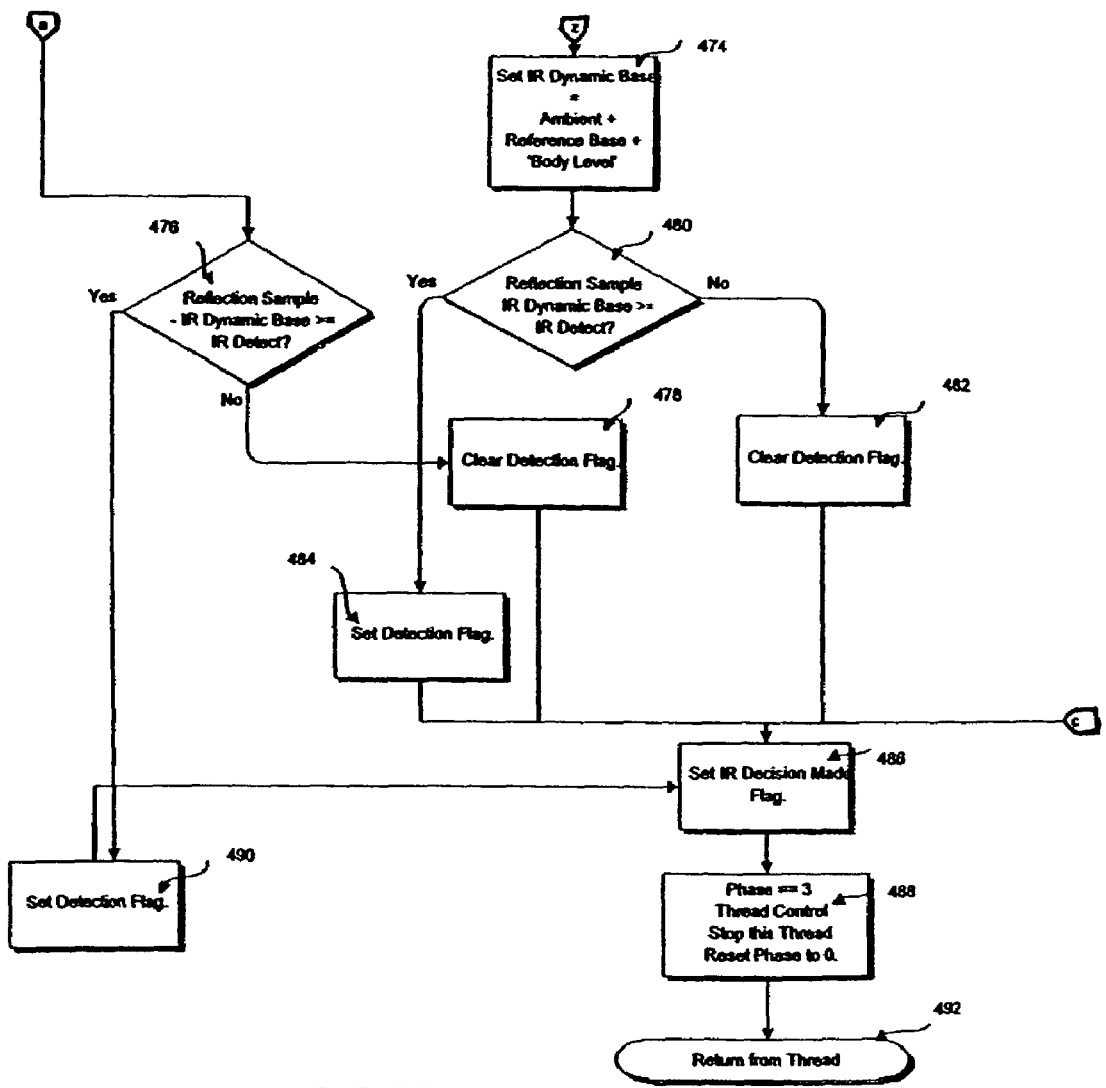
Figure 7J:
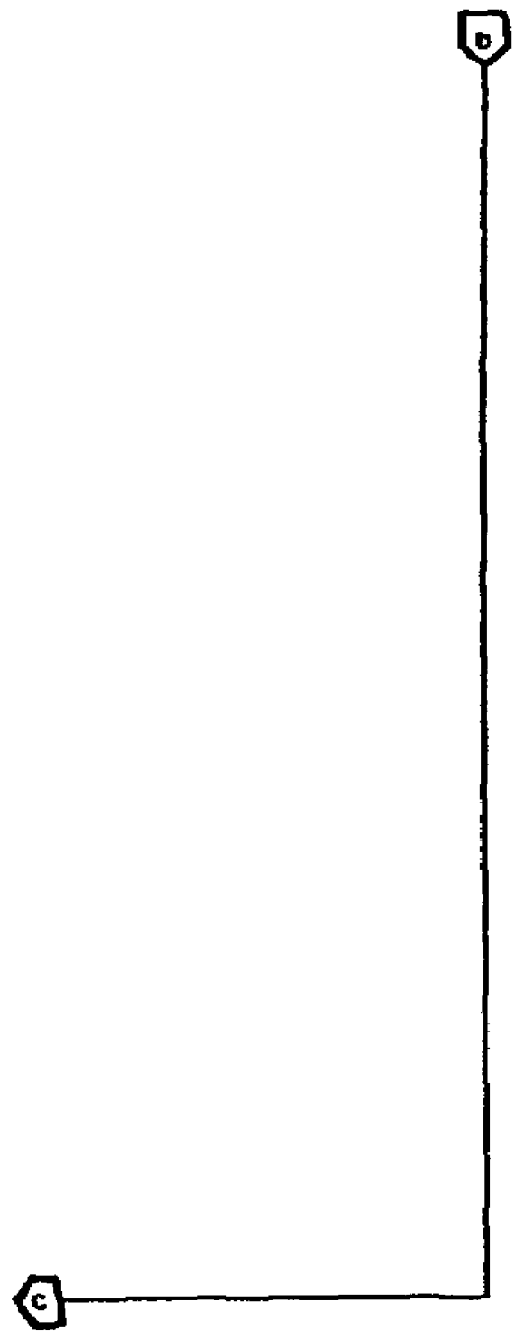

The IR reflection sample received in the IR and Battery Sampling Routine 326 is saved to a time-sequenced array in processing step 438. The decision symbol 440 indicates that the array is examined, comparing it to believable values. With reference to FIG. 7G, if the values are valid, then an error is not indicated and the IR Sample Lost Error flag is reset in processing symbol 442. If the values do not appear to be valid, then the Error flag is set in processing symbol 444.

In processing symbol 446, a test is performed on the overall system voltage to determine if the collar that contains the electronics 114 (FIG. 1) is working properly. The decision step 448 indicates that the voltage is examined comparing the normal operating voltage of the overall system to the voltage value at a time when the IR electronics are operating (this value is indicated as loaded voltage). If the loaded voltage is greater than the normal operating voltage, then the difference between the two voltages is examined as indicated by decision symbol 450. If the difference between the two voltages is greater than or equal to 71 mV, then the comparison indicates that the IR electronics (the collar) are in working order, and the flag indicating an error is cleared in processing symbol 454. If the difference is less than 71 mV, then the flag is set in processing symbol 456 to indicate an error.

If the symbol 448 indicates that the loaded voltage is less than the normal operating voltage, this indicates that the IR electronics are not working properly. Consequently, the error flag is set in processing step 452.

Phase two begins at processing symbol 458. Phase two of the Analog Conditioning and Error Checking Thread 366 examines the IR ambient sample received in the IR and Battery Sampling Routine 326 (FIG. 6) indicated by processing symbol 360 (FIG. 6B). The ambient sample is an IR sample by the detector 116 (FIG. 1) when the emitter 118 (FIG. 1) is not active; therefore, the ambient sample is an IR reading that indicates the normal environmental IR present.

With reference to FIG. 7G, as indicated by decision symbol 462, the ambient sample is saved to a time-sequenced array, and the query determines whether the IR ambient sample is within believable limits.

If the value is not within believable limits, the detection flag is cleared in processing symbol 466 and an error is set that indicates that the IR ambient sample is not valid. The flag indicating that the decision has been made is set in processing symbol 486. If the IR ambient sample is within believable limits, then an error flag is reset to indicate no error in processing symbol 464. Next, the decision symbol 468 indicates a query to determine if the last pulse cycle resulted in activation of the fluid dispensing device. If the last cycle resulted in the activation of the fluid dispensing device, then the IR dynamic base is set to the sum of the ambient value and the reference base decreased by the "hand block level" as indicated in processing symbol 472. The "hand block level" a constant value subtracted in order to account for errors in invalid detection readings.

With reference to FIG. 7I, if the difference between the reflection sample and the IR dynamic base is greater tan the detection value, the detection flag is then set in processing symbol 490. Because the IR dynamic base does not include the previously reflected IR from the user's hands, the difference between the IR dynamic base and the reflection sample will indicate detection. If the decision symbol 476 query does not indicate that an object is present, then the detection flag is cleared as indicated by processing symbol 478. Lastly, the IR decision made flag is set in processing symbol 486.

If the last cycle did not result in the activation of the fluid dispensing device in decision symbol 468 (FIG. 7G), then the IR dynamic base is set equal to the sum of the ambient value and the reference base increased by the "Body Level" as indicated in processing symbol 474. The "Body Level" is a constant based on the current range setting of the detector, requiring more energy to turn on the faucet. As indicated by the decision symbol 480, if the difference between the reflected sample obtained in the IR and Battery Sampling Routine 326 and the dynamic base is greater than or equal to a detection value, then the detection flag is set in processing symbol 484. Thereafter, the IR decision made flag is set in processing symbol 386. If, on the other hand, the difference is not greater than or equal to the detection value, then the detection flag is cleared in processing symbol 482, and the IR decision made flag is set as indicated by processing symbol 486.

Phase three of the Analog Conditioning and Error Checking 366 releases thread control and resets the phase of the thread to zero. This is indicated in processing step 488. The thread then returns as indicated by termination symbol 492.

The overall firmware operation 202 in FIG. 5 continues at processing symbol 252 in FIG. 5B. In processing symbol 252, the DIP switches of the system are read to ensure proper operation modes.

Processing symbol 254 indicates a call to the Motion Detection Thread 501, the flowchart for which is illustrated in FIG. 8A-8D. The Motion Detection Thread 501 is that functional part of the software that determines if the fluid dispensing device should remain activated in light of motion detected by the emitter/detector pair.

Figure 8A:
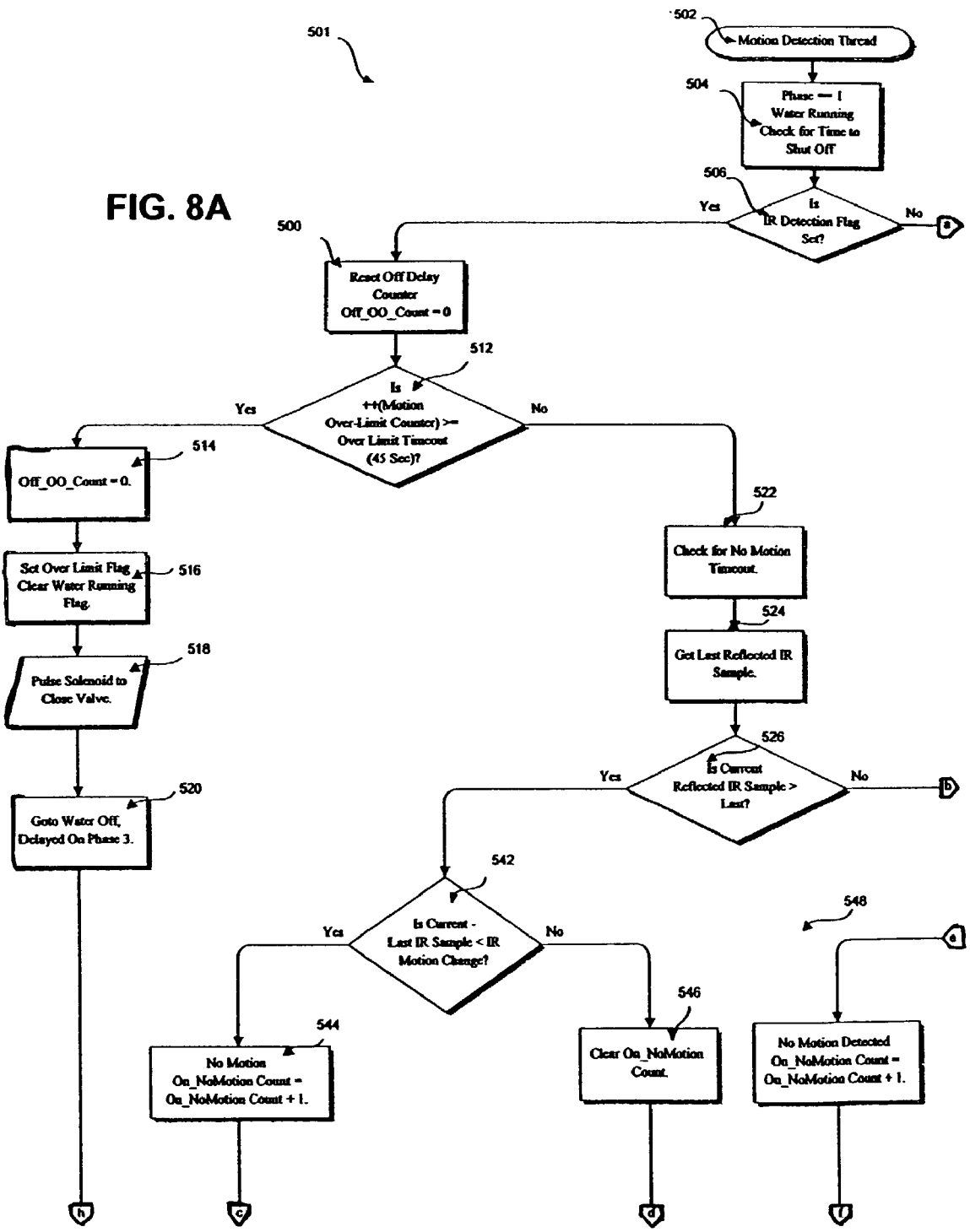
FIG. 8A–8F is a flowchart illustrating the Motion Detection Thread of the firmware of the fluid dispensing device that forms a part of the first preferred embodiment of the system and method of the present invention.

With reference to FIG. 8A, the Motion Detection Thread 501 begins at processing symbol 504 at phase one. As indicated by processing symbol 504, Phase 1 of the Motion Detection Thread 501 is executed when the device is currently dispensing fluid. The decision symbol 506 queries the IR Detection Flag to determine if an object was detected by the IR and Battery Sampling Routine 326. If the Detection Flag is set, the counter for water flow timeout is set to zero (0) as indicated in processing symbol 500.

The decision symbol 512 determines whether the water has been running for more than forty-five (45) seconds, which is a timeout limit. If the water has been running more than 45 seconds, then an over limit flag is set indicating that the water running limit is reached, and the flag indicating that the water is running is reset or cleared as indicated by processing symbol 516. The solenoid is pulsed to close the valve in processing symbol 518.

If the water has not been running for more than forty-five seconds in processing symbol 512, then the 45 second timeout is checked in 522, and the last reflected IR sample is retrieved in 524. The last reflected sample obtained in the IR and Battery Sampling Routine 326 is then compared to the current IR sample in decision symbol 526. If the current sample exceeds the previous sample, then the last IR sample is subtracted from the current IR sample. If the difference is less than a predetermined value that indicates a motion threshold in decision symbol 542, then a flag indicating that no motion was detected is incremented as indicated in processing symbol 544. If the difference is not less that the predetermined value, then a flag indicating that motion was not detected is reset or cleared as indicated in processing symbol 546.

Figure 8B:
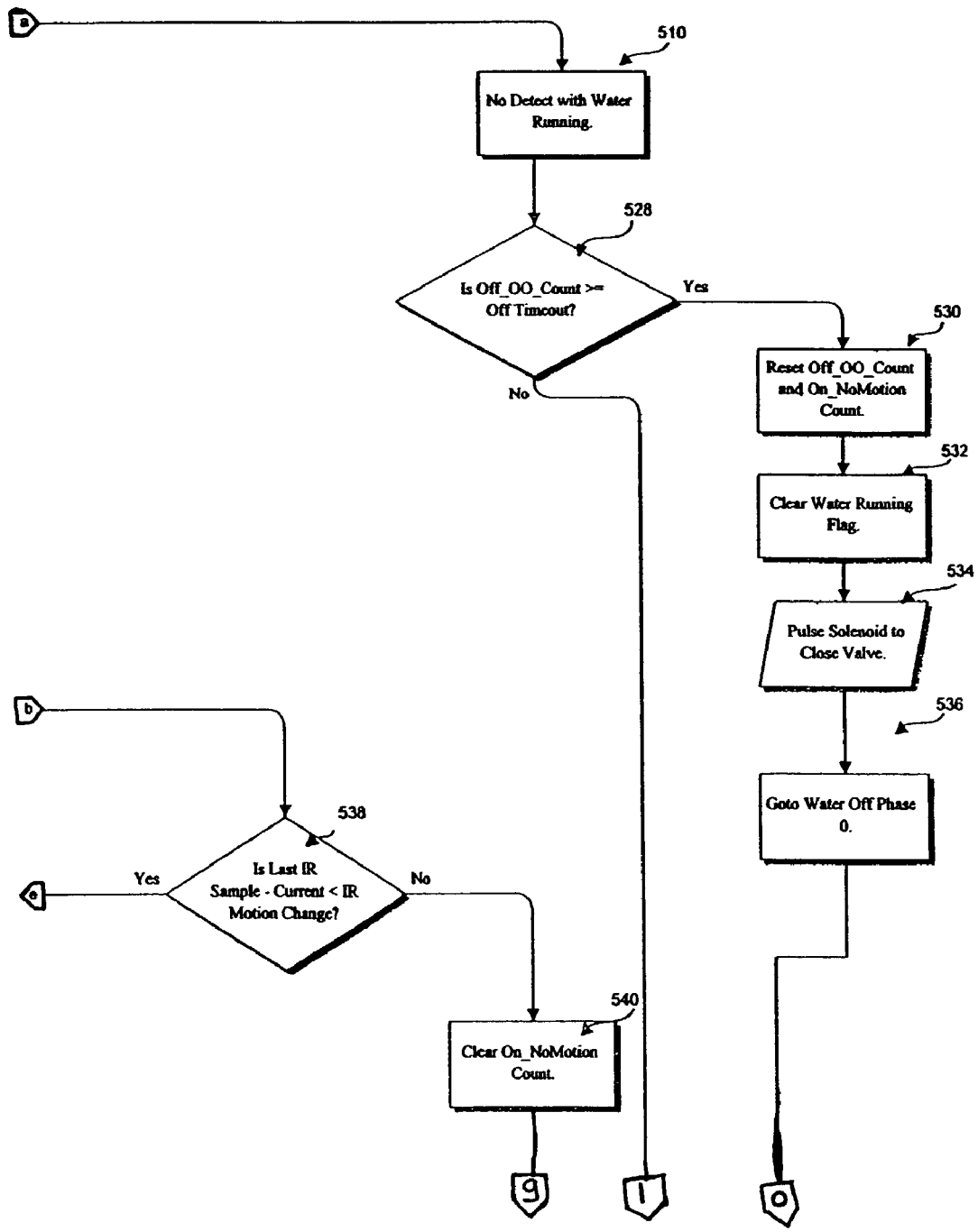

With reference to FIG. 8B, if in decision symbol 526 the query indicates that the current sample does not exceed the previous sample, then the current IR sample is subtracted from the last IR sample as indicated by the decision symbol 538. If the difference is less than a predetermined value that indicates a motion detection threshold, then a flag is incremented as indicated in processing symbol 548 (FIG. 8A) that indicates that no motion was detected. If the difference is not less that the predetermined value, then the flag indicating no motion detected is cleared as indicated in processing symbol 540 (FIG. 8B).

Figure 8C:
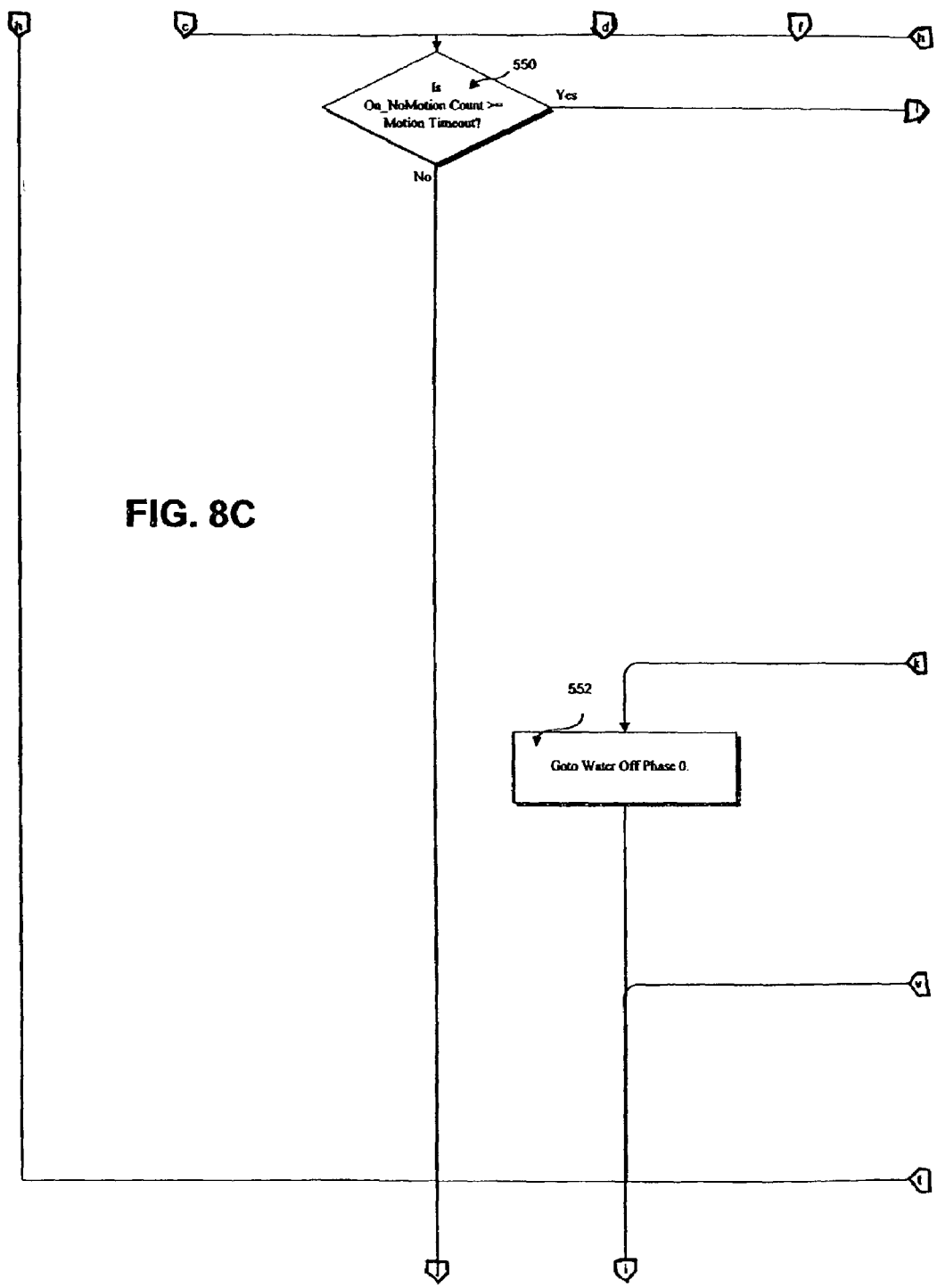

With reference to FIG. 8C, decision symbol 550 indicates that, if the flag indicating that no motion is detected exceed the motion timeout value, then the Motion Detection Thread 500 returns as indicated by the terminating symbol 554 in FIG. 8C. In other words, no motion is detected, and it has exceeded timeout, then the Motion Detection Thread 500 terminates until the water is activated again. With respect to FIG. 8D, if the timeout duration has not been surpassed, then the Motion Detection Thread 500 proceeds by resetting the flag indicating no motion and the counter in processing symbol 556. The Water Running indicator is cleared in processing symbol 558, and a separate process as indicated by the process call 560 is initiated that pulses the solenoid to close the valve.

Phase four begins at processing symbol 562. If the IR Detection Flag is clear (no detection of a user's hands) by the query indicated in decision symbol 564, then the thread returns to the water off phase zero (0) as indicated in processing symbol 552 (FIG. 8C).

Figure 8D:
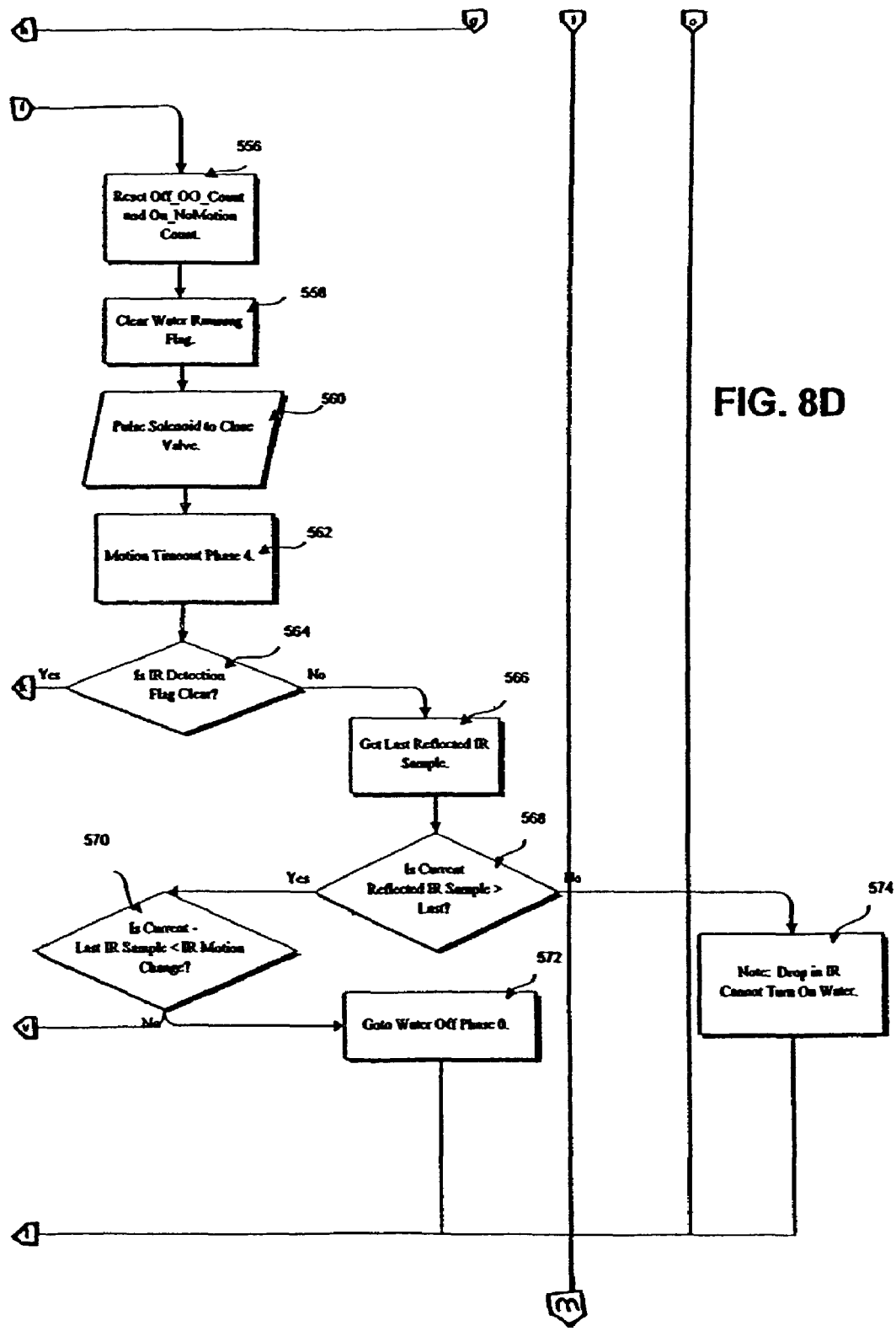
Figure 8E:
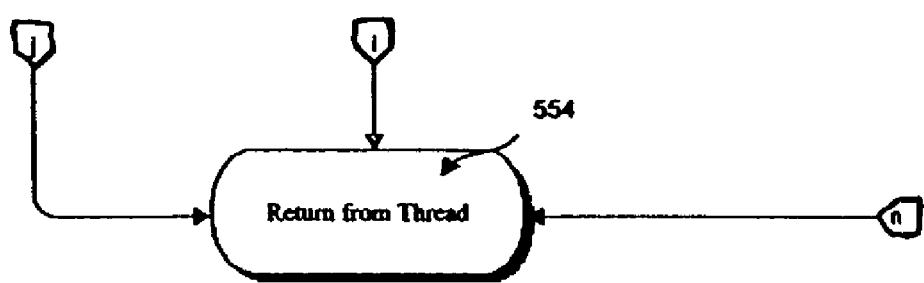
Figure 8F:

With reference to FIG. 8D, if a user's hands were detected in the decision symbol 564, then the previous reflected IR sample is retrieved in processing symbol 566. The current reflected IR sample is compared to the previous reflected IR sample in decision symbol 568. If the current sample is greater than the previous sample in decision symbol 568, then the difference in the current IR sample and the previous IR sample is examined to determine if it exceeds the IR motion change threshold in decision symbol 570. If it does not meet or exceed the threshold, then the thread returns in the terminator symbol 554 (FIG. 8E). In other words, a drop in IR will not turn on the water. If it does indicate a motion change in decision symbol 570, then water off phase zero (0) is initiated in processing symbol 572.

If at the decision symbol 506 in FIG. 8A, it is determined that the IR Detection Flag is not set, then there has been no motion detected and the fluid is currently being dispensed from the device. With respect to FIG. 8B, if the duration of the fluid dispensing has exceeded a timeout threshold from the query in decision symbol 528, then the No Motion Detection flag is incremented in processing symbol 530 and the Water Running flag is cleared in processing step 532. The solenoid is then pulsed to close the valve in the predefined process as indicated in 534, and the Water Off phase is set to zero (0) in process symbol 536.

Thread control is then returned to the overall firmware structure 202 as illustrated in FIG. 5. In FIG. 5C, decision symbol 258 indicates that the firmware determines if there are any pending events. If there are pending events then the main thread timer is queried to determine if a cycle has expired. If the cycle time has expired, the cycle begins again at processing step 240 (FIG. 5B) where the microcontroller is deactivated until the next cycle is initiated on the 250 millisecond interval.

If the cycle time has not expired, then the optical sensor looks for the Attention signal initiated by the handheld computer in processing symbol 262. The Attention signal is emitted by the handheld computer as indicated in the Send Status function 178 in processing step 182 (FIG. 4). If the handheld computer has requested connected mode of the fluid dispensing device and the Attention signal is a valid signal, then the decision symbol 264 indicates that a transmit status response is sent to the handheld computer in the subsequent predefined process step 266. Once the Status Response is transmitted, then the handheld computer and the fluid dispensing device enter connected mode as indicated in predefined processing symbol 268. The firmware remains in connected mode until a command is transmitted or a timeout occurs in processing symbol 268. If an End command is communicated by the handheld computer or a timeout occurs, the variables for the thread events are reset and the DIP switches are queried as indicated in processing symbol 270.

The TBM interrupts are re-enabled in processing symbol 272 allowing the pulse cycle to continue, then the operation of the IR electronics are examined as indicated in the decision symbol 274. If the IR electronics have been unplugged then the system is configured to do reflection calibration in one (1) second in processing step 276. In decision symbol 278, the IR electronics are then tested to determine if the devices are unplugged, if there is a battery warning, or if there exist any other errors. If each of the queries returns a negative response, then this error data is saved in processing symbol 282.

Figure 5D:
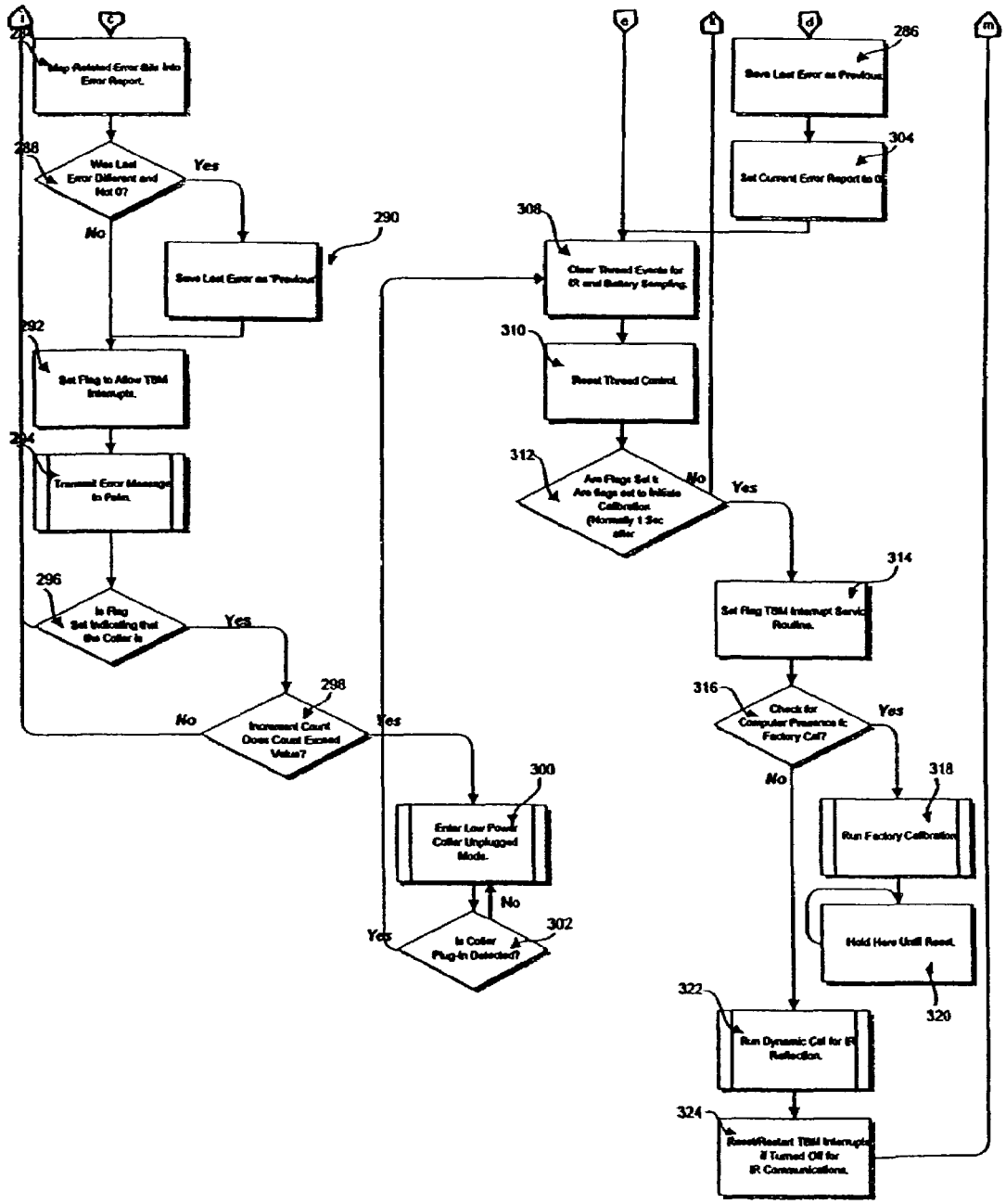

The error indications are saved into a report for user accessibility in processing symbol 284. The decision symbol 288 queries the error bits to determine if the errors changed from the last iteration of the firmware structure 202. If the error has changed, then the previous error is saved in processing symbol 290. With reference to FIG. 5D, the TBM interrupts are re-enabled in processing symbol 292, and error messages are transmitted to the handheld computer in predefined process symbol 294.

The decision symbol 296 indicates a query of the IR electronics. If the electronics are working properly, then the pulse cycle is reinitiated in FIG. 5B at processing symbol 240.

If the electronics are not working properly, then the system is placed into low power IR electronics unplugged Mode in predefined processing symbol 300. The system remains in low power mode as indicated by the decision symbol 302 until the electronics are reactivated. Once the IR electronics begin working properly, processing step 308 indicates that the preparation is taken for the recycling of the IR and Battery Sampling. Thread control is reset in processing symbol 310. If the calibration flag is set, then the TBM Interrupt Service Routine is initiated in processing symbol 314. If Factory calibration is required as determined in decision step 316, then the predefined Factory Calibration Thread is run as indicated by the predefined Factory Calibration symbol 318. The system then holds until reset in process symbol 320 at which time the Firmware structure begins anew at decision symbol 208 in FIG. 5A.

If Factory Calibration is not indicated in the decision symbol 316, then the predefined Dynamic Calibration is run as indicated in the predefined processing symbol 322. To reinitiate the threads, the TBM interrupts are reset in processing symbol 324, and a pulse cycle begins at processing symbol 240 where the microcontroller is deactivated until a cycle is initiated by the TBM.

If Factory Calibration is not indicated, then the Dynamic Calibration Thread 598 as illustrated in FIG. 9 is run from the firmware overview structure 202 at processing symbol 322. The Dynamic Calibration Thread 598 is executed both initially when the firmware is first powered up and periodically to adjust the IR hardware components as required by environment and system changes.

Figure 9A:
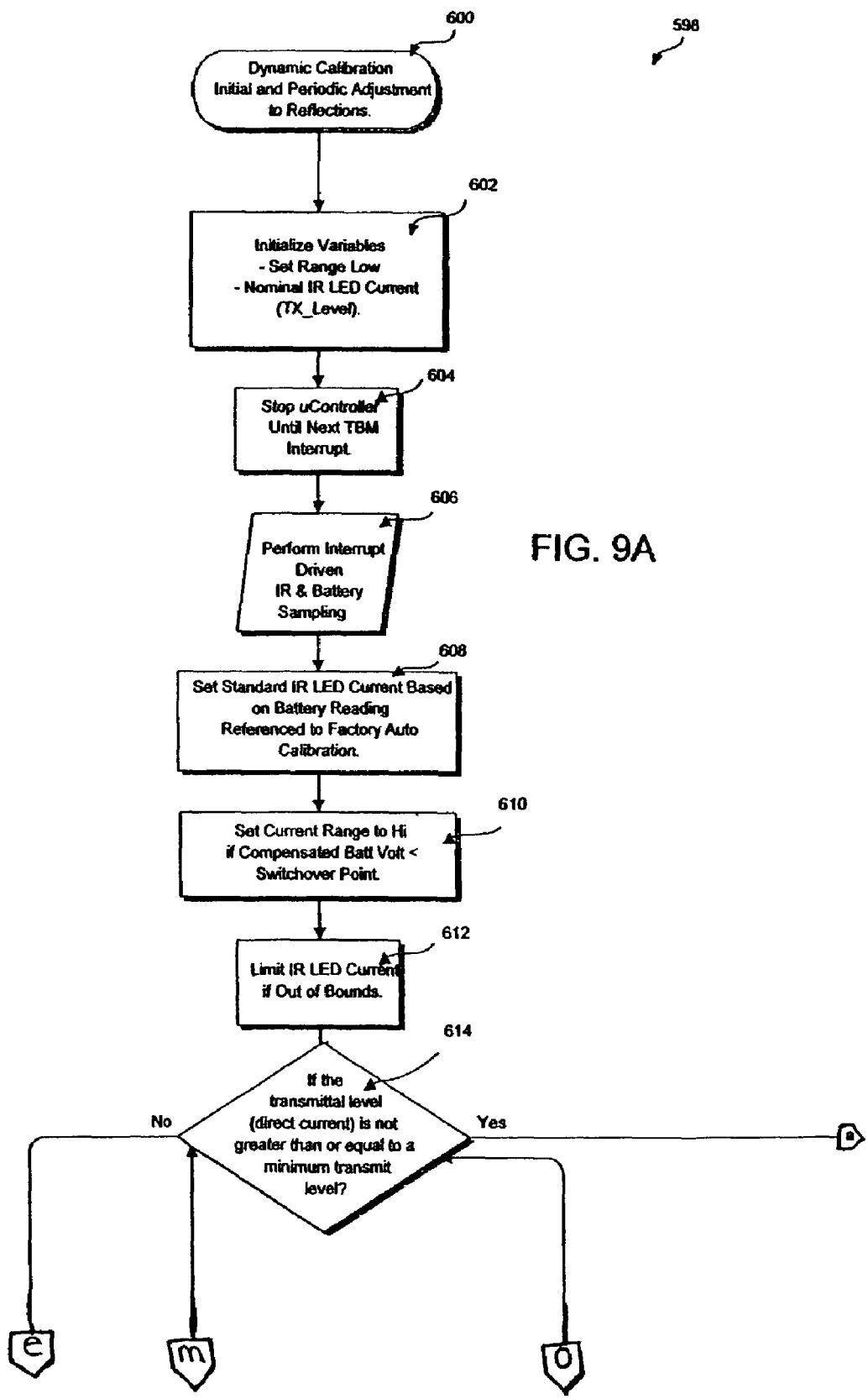
Figure 9B:
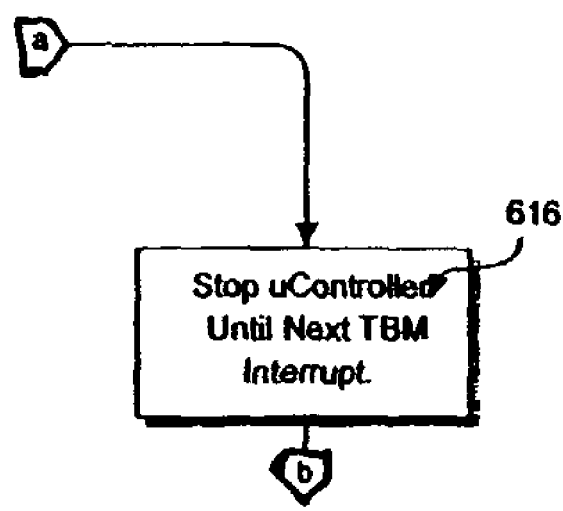

The Dynamic Calibration Thread 598 starts at the input symbol 600 in FIG. 9A. The calibration begins by initializing required variables, setting the initial emitter selection to low, and setting the IR LED current to a nominal value (the transmit level) as indicated in processing symbol 602. The microcontroller is deactivated for the duration of a regular 250 milliseconds TBM cycle in processing step 604. The Interrupt Driven IR and Battery Sampling Routine 326 (FIG. 6) is called in order to obtain initial samples of the battery voltage as indicated in processing step 330 (FIG. 6A), the reflected IR as indicated in processing step 356 (FIG. 6B), and the ambient IR as indicated in processing step 360 (FIG. 6B).

Processing symbol 608 indicates that the Dynamic Calibration Thread 598 sets the current input to the IR LED based on the battery voltage sample obtained from the IR and Battery Sampling Routine 326 (FIG. 6). The current range is set to high if the compensated battery voltage is less than the switchover point in processing symbol 610, and processing symbol 612 adjusts the IR LED current if it exceeds an operational limit that affects performance.

Decision symbol 614 begins the actual calibration of the IR LED and the optical sensor. If the transmit level (or initially the nominal IR LED current) is less than a minimum transmit value in order for the IR emitter to reach an effective range, then the microcontroller is deactivated until the next TBM cycle in processing symbol 616 in FIG. 9B, and the Interrupt Driven IR and Battery Sampling Routine 326 (FIG. 6) is run in processing symbol 618 in FIG. 9D.

With reference to FIG. 9D, in the decision symbol 620, the reflected IR including the ambient sample is compared to the ambient level when the IR LED has not emitted a pulse. This is in contrast to the initial setting that simply used reference values according to the standard LED based on the battery voltage reading.

Figure 9C:
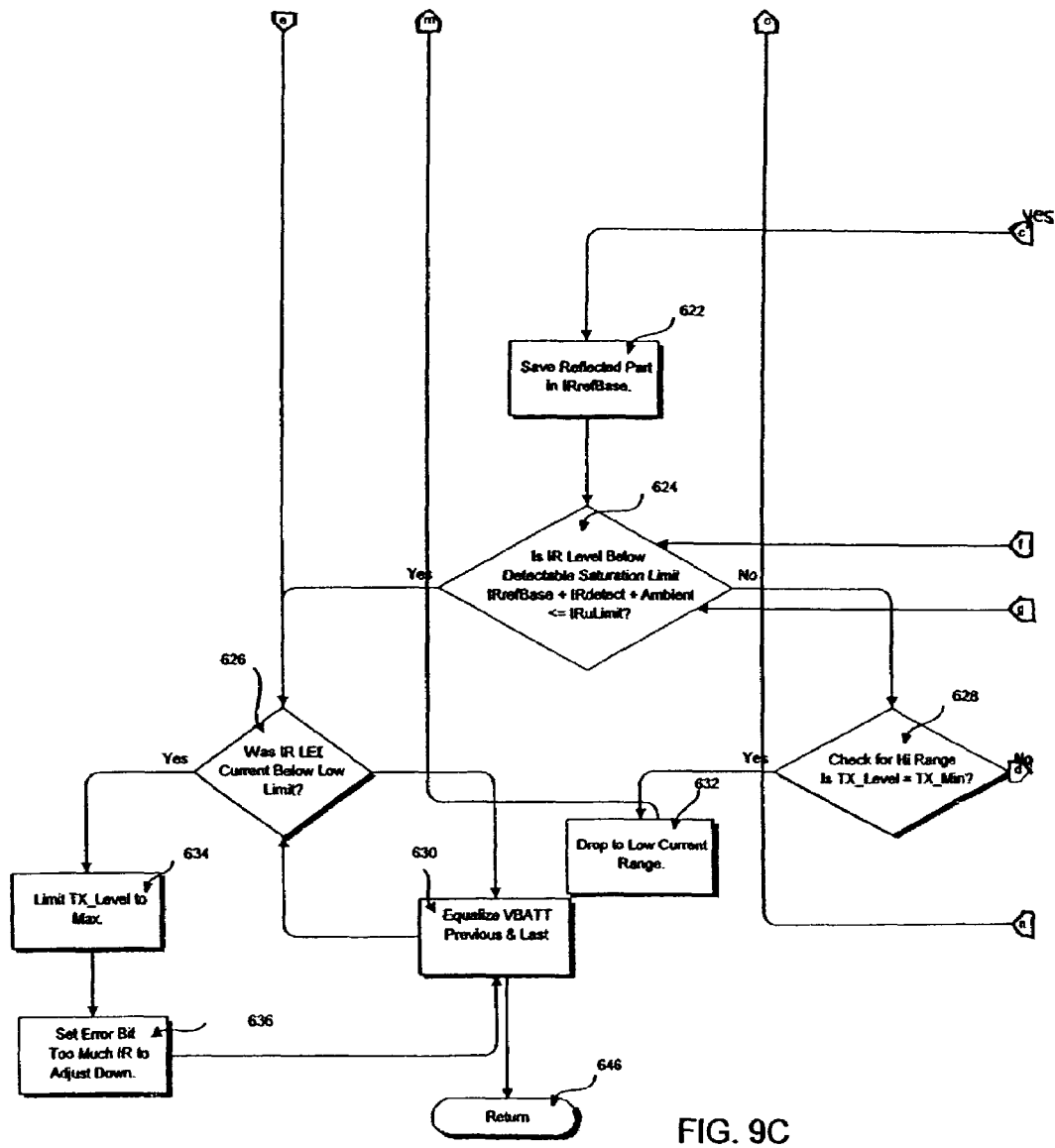

With reference to FIG. 9C, if the sum of the reflected IR and the ambient level is greater than the ambient level when the IR LED has not emitter a pulse, then the reflected IR is the Reference Base Value as indicated in processing symbol 622. If the IR level, which is defined as the sum of the Reference Base, the Reflected IR, and the Ambient IR, is below a detectable saturation limit in decision symbol 624, then the current input to the IR LED is examined in decision symbol 626.

If the current input to the IR LED is below the low limit, then the transmit level is set to a maximum value in processing step 634, and an error bit is set that indicates that the emitter cannot be adjusted down any farther in processing symbol 636. The battery voltage is then equalized in processing symbol 630 in order to prevent battery error, and the Dynamic Calibration Thread returns as indicated by the terminator symbol 646, with errors. If the current input to the IR LED is not below the low limit, then the battery voltage is then equalized in processing symbol 630 in order to prevent battery error, and the thread returns as indicated by the terminator symbol 646, without errors.

If the sum of the reflected IR and the ambient level is not greater than the ambient level when the IR LED has not emitted a pulse in decision symbol 620 (FIG. 9D), then the difference between the Ambient IR and the Reflected IR (including the Ambient IR) is examined in decision symbol 638 in FIG. 9D. If the difference is less than the expected noise level, then the Reference Base is set to zero (0). If the difference is not less than the expected noise level, then an error bit is set in processing symbol 642, and the IR level is examined in decision symbol 624. If it is below a detectable limit, then the process provides an error before exiting if the IR LED current was below a low limit. If it was not below a low limit, it simply exits.

Communication Protocol

Data communication between the optical interface ports of the handheld computer 104 (FIG. 1) and the fluid dispensing device 106 (FIG. 1) is now described. Communication between the devices is implemented as Broadcast Mode or Connected Mode.

Broadcast Mode

The Broadcast mode is employed when the receiving control logic of a preferred embodiment discovers errors including, but not limited to, a malfunctioning solenoid, a low battery, or a reflected signal that is out of range at calibration. When such an error is detected during the normal operations of the firmware of the fluid dispensing device, a signal is emitted from an IR emitter 118 (FIG. 1) of the fluid dispensing device.

The signal emitted has the following format:

ERRSSSSSSSE(CS)(LF).

Figure 10:
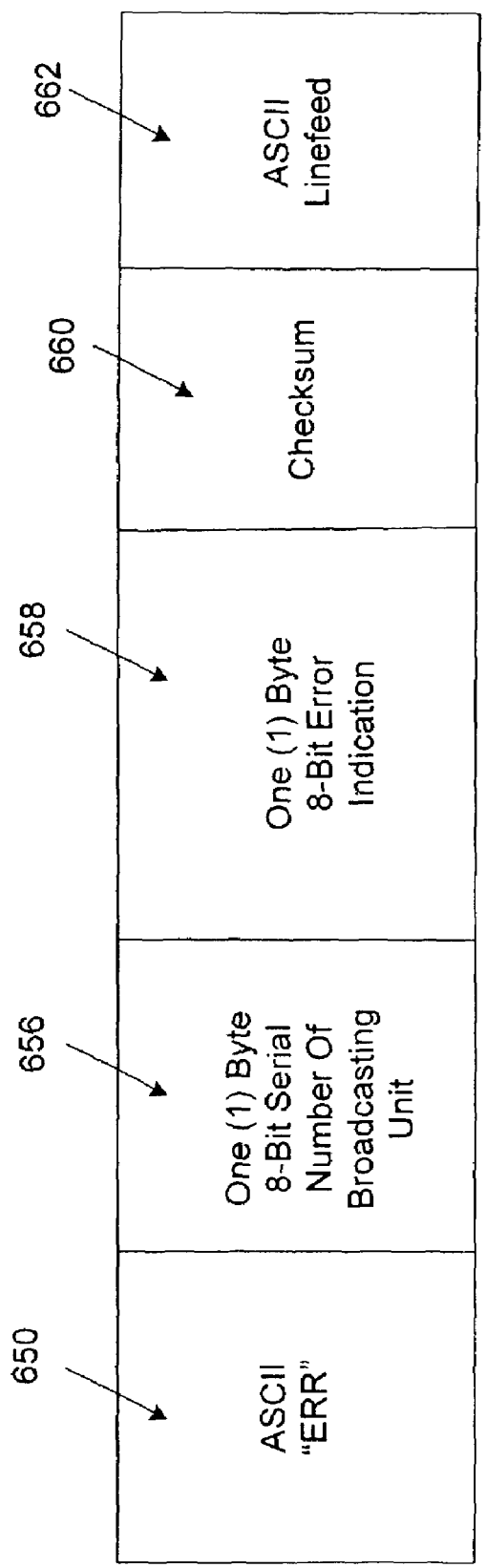
FIG. 10 is a block diagram illustrating the data unit descriptions of a Broadcast signal.

The emission is sent once per second. The specification of the signal is illustrated in FIG. 10. The first three bytes indicate that the signal is a Broadcast signal including an ASCII "ERR" 650. The next byte 656 includes an 8-bit serial number identifying the unit that has detected an error. Byte 658 indicates the type of error that has been detected. The following table describes the types of errors and the corresponding byte indicators:

TABLE 1

| BIT | ERROR TYPE |
|---|---|
| Bit 0 | Solenoid Open Circuit or Unplugged |
| Bit 2 | Solenoid load too heavy |
| Bit 3 | Ambient IR level out of Range |
| Bit 4 | Reflected IR out of range at Calibration |
| Bit 5 | Low Battery Warning |
| Bit 6 | Collar Unplugged |

The checksum byte 660 is a modulo 256 checksum inverted, and the last byte is an ASCII linefeed 662 to indicate termination of the signal.

Figure 22:
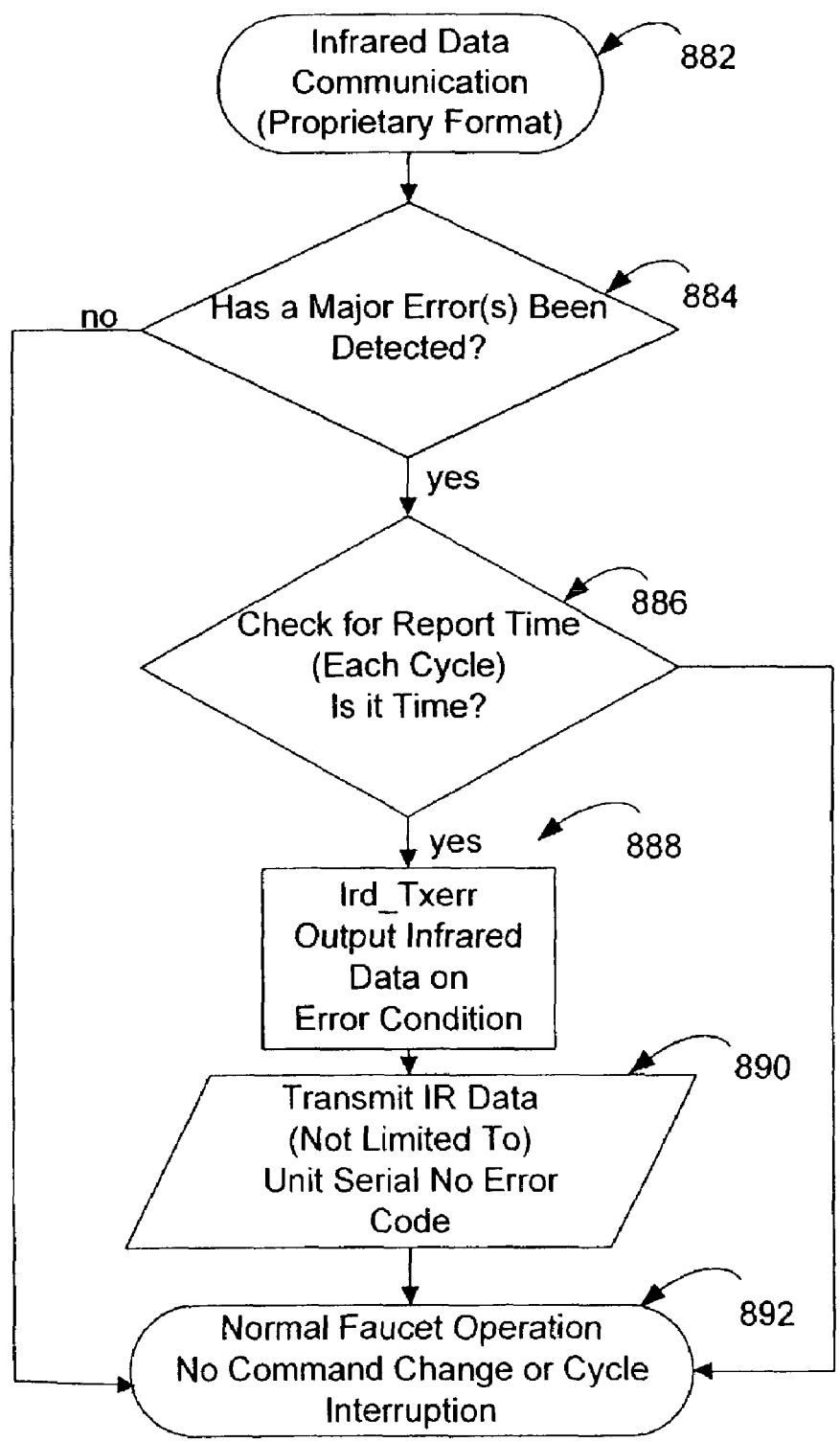
FIG. 22 is a flowchart illustrating the Broadcast functionality of the fluid dispensing device and the data unit that is depicted in FIG. 10.

The control logic of the handheld computer processes a discovered error(s) and communicates the error(s) to the handheld computer. The Broadcast Communication Process is shown in FIG. 22 and is designated generally throughout with reference numeral 882.

Decision symbol 884 determines if an error has been detected within the fluid-dispensing device. Within the system, a timer is set, for example to broadcast error messages every five (5) pulse cycles. Therefore, in decision symbol 886 it is determined whether it is time to send out a Broadcast Signal. If it is not, then the fluid dispensing device continues with normal operation in terminating symbol 892.

If it is time to transmit a Broadcast Signal, then the error data is sent in processing symbol 888.

The handheld computer executes a scanning function that can be initiated by a user. FIG. 3 represents the communication function of the handheld computer. The optical interface port is initialized 148, and the IR-State variable is set indicating that the port is open in 150. The gCommand variable of the switch symbol 152 indicates that a user has selected the scan functionality. The scan function searches for a Broadcast signal of the type described.

Once detected, the signal is parsed and the information is stored on the handheld computer. This information is then readily available to the user for maintenance purposes.

Connected Mode

The Connected Mode is initiated by the handheld computer when a user selects a functionality that requires data to be sent to the fluid dispensing device. As described, infra, an Attention Signal is emitted from the optical interface port of the handheld computer.

Figure 11:
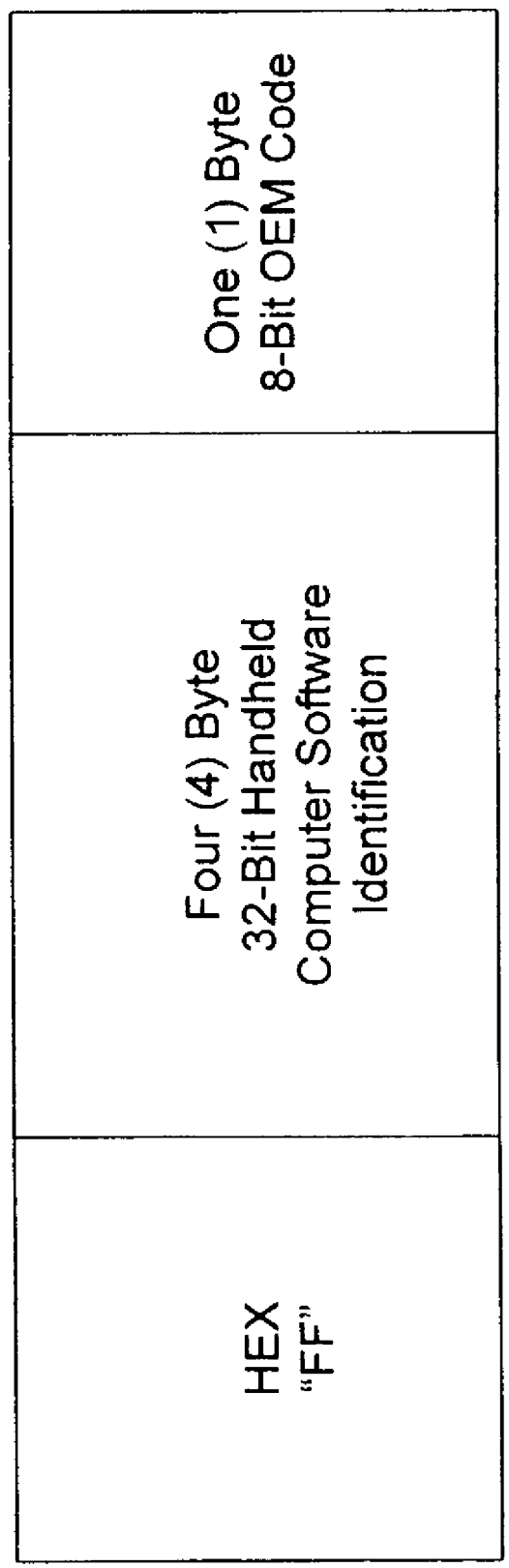
FIG. 11 is a block diagram illustrating the data unit descriptions of an Attention signal.

The Attention Signal specification is illustrated in FIG. 11. The Attention Signal is defined as a hexadecimal "FF" 664. The "FF" is followed by a four (4) byte computer software identification ASCII code 668. The four-byte code 668 includes 4 ASCII characters identifying the company and product. The last byte 670 indicates an Original Equipment Manufacturing (OEM) code.

The "FF" 664 is sent continuously for 300 milliseconds (approximately 50 milliseconds longer than a normal fluid dispensing device pulse cycle). This allows the fluid dispensing device the opportunity to detect the Attention Signal if the Attention Signal is initially sent during a 250 millisecond cycle.

The fluid dispensing device responds within 39 milliseconds (14 milliseconds if the water is off). If there is no response from the fluid dispensing device, then the Attention Signal is sent repeatedly at a predetermined interval until a response is detected by the handheld device.

Figure 12:
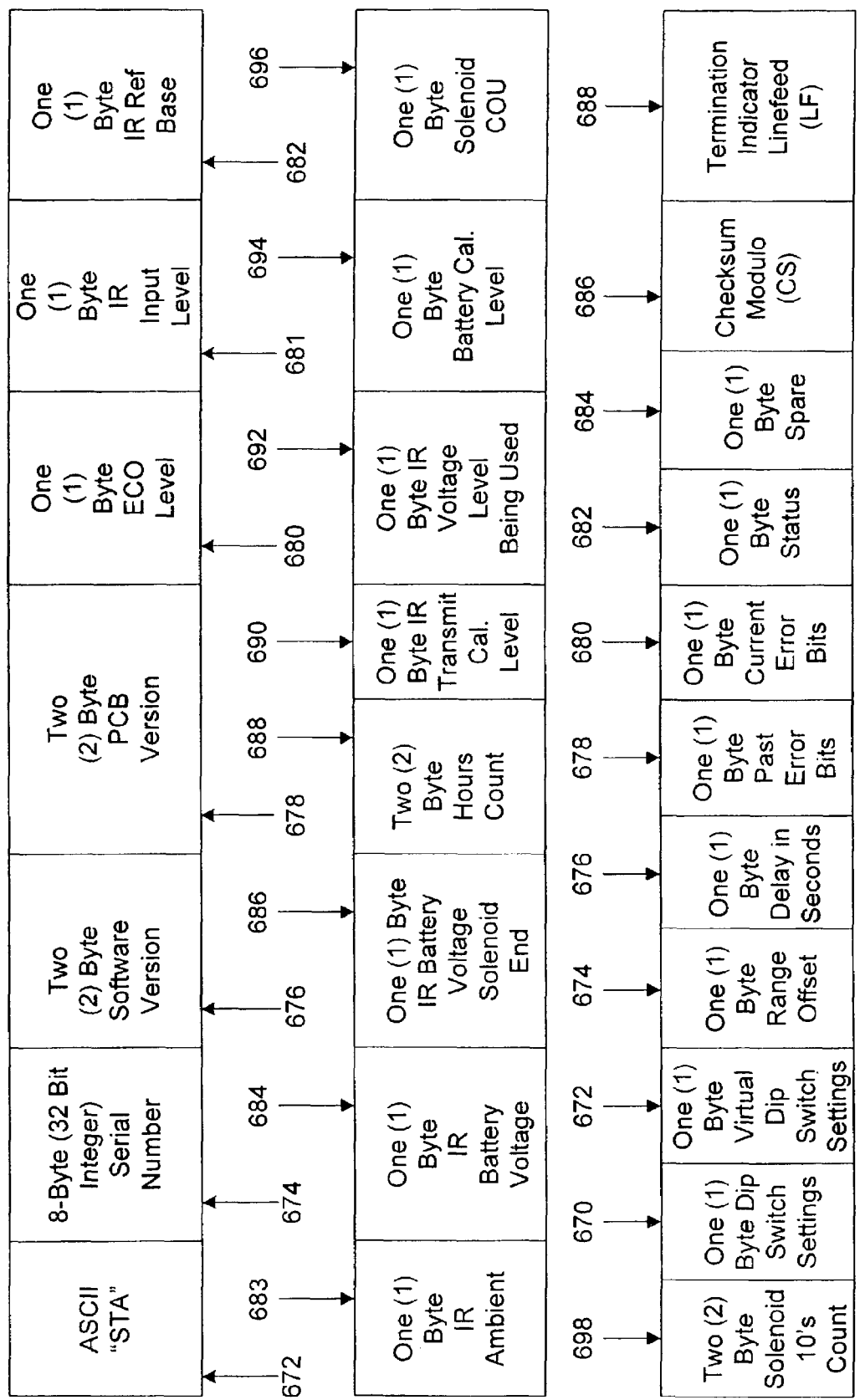
FIG. 12 is a block diagram illustrating the data unit descriptions of a Connected Mode request signal.

The Attention Signal response sent by the fluid dispensing device includes status information that is described with reference to FIG. 12. The initial ASCII "STA" byte 672 indicates that the fluid dispensing device is responding to the Attention Signal. The 8-byte serial number 674 indicates the serial number of the device responding to the Attention Signal. This 8-byte word is displayed on the handheld computer as a hexadecimal number. The 2-byte software version 676 indicates to the handheld device the version of the firmware used on the fluid dispensing device. The next 2-byte PCB version 678 indicates the board revision number and the part number of the board. The one-byte Engineering Change Order ("ECO") level indicates previous maintenance order. The one-byte IR input level 681 identifies the IR sensitivity. The one-byte IR reference base reading provides an eight-bit reading. The one-byte IR ambient reading 683 is provided. The one-byte IR battery voltages 684 and 686 provide a normal operating battery voltage and a battery voltage at the end of a solenoid pulse, respectively. The following two bytes provide an hour count 688 for time purposes. The IR transmit calibration level byte 690 provides a voltage output value of the emitter, and the next byte provides a one-byte voltage level 692 of the voltage being used. The next byte is the battery calibration level 694 indicating a voltage reading of the battery at calibration. A one-byte solenoid count 696 and a two-byte solenoid 10's count 698 follow. The dip switch settings are indicated in the next byte 670. The following table describes the bit numbers with corresponding definitions:

TABLE 2

| BIT | DESCRIPTION |
| --- | --- |
| B7 | DIP Switch 5 (water saver) |
| B6 | DIP Switch 1 (Range 1) |
| B5 | DIP Switch 2 (Range 2) |
| B4 | DIP Switch 3 (Scrub Mode, 60 second off delay) |
| B3 | DIP Switch 4 (Meter Mode) |
| B2 | Unused extra input jumper |
| B1 | Not used |
| B0 | Not used |

The virtual DIP switch settings are provided in byte 672 and are defined the same as the manual DIP switch settings except B0 is defined as "Use All Virtual Settings." Range offset 674, delay in seconds 676, past error bits 678, and current error bits 680 provide additional information describing the current fluid dispensing device parameters. Status of the fluid dispensing device is given in the next byte 682 and the bits are defined as follows:

TABLE 3

| BIT | DEFINITION |
| --- | --- |
| B4 | PROGRAMMING ERROR, NUMBER OF BYTES SPECIFIED |
| B2 | PROGRAMMING ERROR, ADDRESS SPECIFIED |
| B1 | FLASH PROGRAM OPERATION NOT VERIFIED |
| B0 | LAST COMMAND CHECKSUM FAILED |

A one-byte spare is provided 684, and the transmission is terminated with a checksum 686, and a linefeed 688.

Once connected mode is established, the handheld computer has several functions. The handheld computer can send a status request, send a set command, or send a program command.

Figure 13:
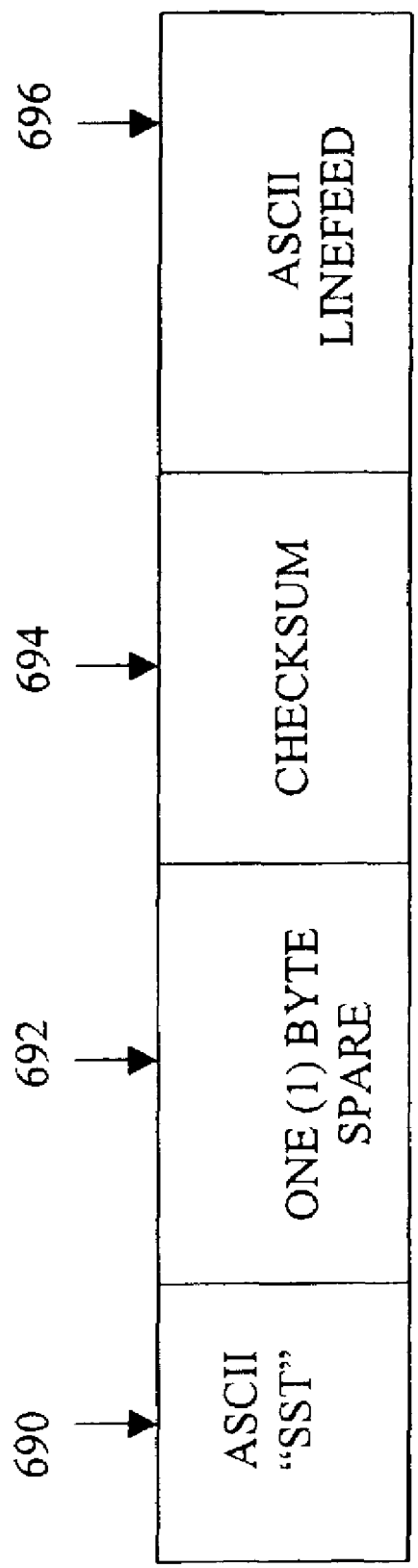
FIG. 13 is a block diagram illustrating the data unit descriptions of a Status signal.

A status request from the handheld computer is responded to by the fluid dispensing device indicating that information that is sent when Connected Mode is accomplished. The status request flowchart in FIG. 4 illustrates the software flow on the handheld computer when a Status command is requested. Processing symbol 184 indicates the transmission of a Status command, and the specification for the Status command is illustrated in FIG. 13. A status command begins with and ASCII "SST" 690. A one-byte spare 692 is followed by a checksum 694 and an ASCII linefeed 696 for termination.

Figure 14:
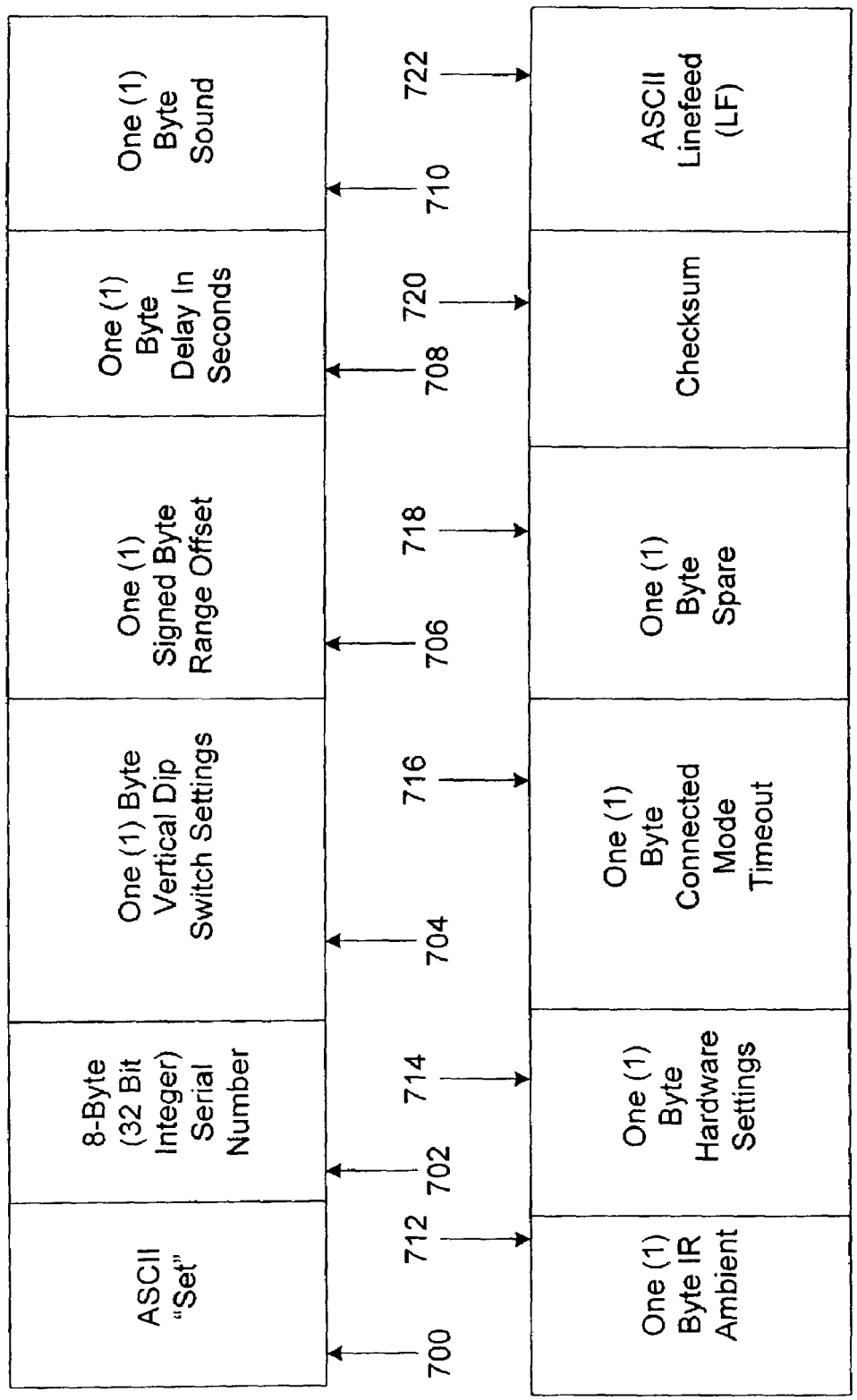
FIG. 14 is a block diagram illustrating the data unit descriptions of a Set signal.

A Set command allows a user of the handheld device to reprogram various electronics of the fluid dispensing device, including but not limited to the DIP switches (i.e. virtual DIP switch settings), range offset, delay in seconds, sound, hardware settings, and connected mode timeout. FIG. 14 illustrates a string transmitted by the handheld computer to accomplish a Set command. The ASCII "SET" string 700 is sent in the least significant byte. Following the "SET" string is an eight-byte serial number 702 indicating the handheld computer that is initiating the "SET" command. The one-byte virtual DIP switch settings 704 are described by the following table:

TABLE 4

| BIT | DESCRIPTION |
| --- | --- |
| B7 | DIP Switch 5 (water saver) |
| B6 | DIP Switch 1 (Range 1) |
| B5 | DIP Switch 2 (Range 2) |
| B4 | DIP Switch 3 (Scrub Mode, 60 second off delay) |
| B3 | DIP Switch 4 (Meter Mode) |
| B2 | Unused extra input jumper |
| B1 | Not used |
| B0 | All Virtual Settings |

The emitter range offset is provided in the next byte 704, and a delay is provided in the next byte 708. The sound can be turned on/off with the sound byte 710. B0 indicates sound off. Byte 712 provides the IR ambient level reading. The user can reset hardware settings in the following byte 714 including B0 that resets the main board and B1 that indicates a soft reset. Resetting the main board includes the fluid dispensing device waiting 10 seconds, exiting Connected Mode, then resetting all the variables. A Soft Reset includes waiting 10 seconds, exiting Connected Mode, retaining virtual settings, and re-calibration. The next byte 716 allows the Connected Mode timeout to be changed in the range of 0–255 seconds. Finally, a spare byte 718, a checksum byte 720 and an ASCII linefeed 722 terminates the "SET" command.

Figure 15:
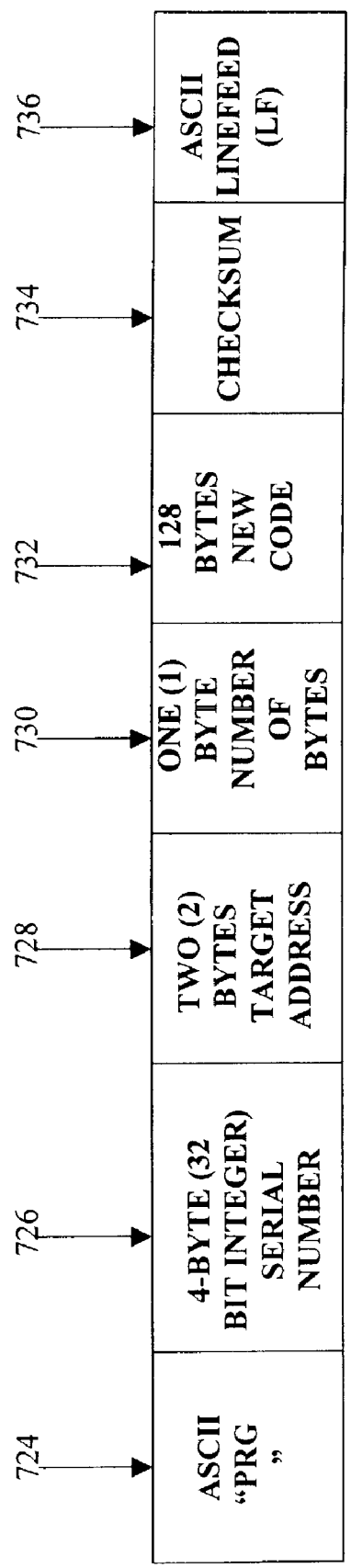
FIG. 15 is a block diagram illustrating the data unit descriptions of a Program signal.

A Program Command allows a handheld computer user to reprogram the fluid dispensing device. The Program Command Specification is illustrated in FIG. 15. ASCII "PRG" 724 initiates a Program Command. A four-byte serial number 726 follows indicating the identification of the handheld computer. The next two bytes 728 provide the target address of the fluid dispensing device. Typically, the target address includes the software type, the PCB code and the address returned from an "STA" Command. The number of bytes making up the new code is transmitted in one byte 730, and the code itself is transmitted in the following 128 bytes 732. If the code exceeds the 128 byte limit, then multiple "PRG" Commands can be sent from the handheld computer in order to transmit the entire piece of code. A checksum 734 and an ASCII linefeed 736 terminate the signal.

Figure 16:
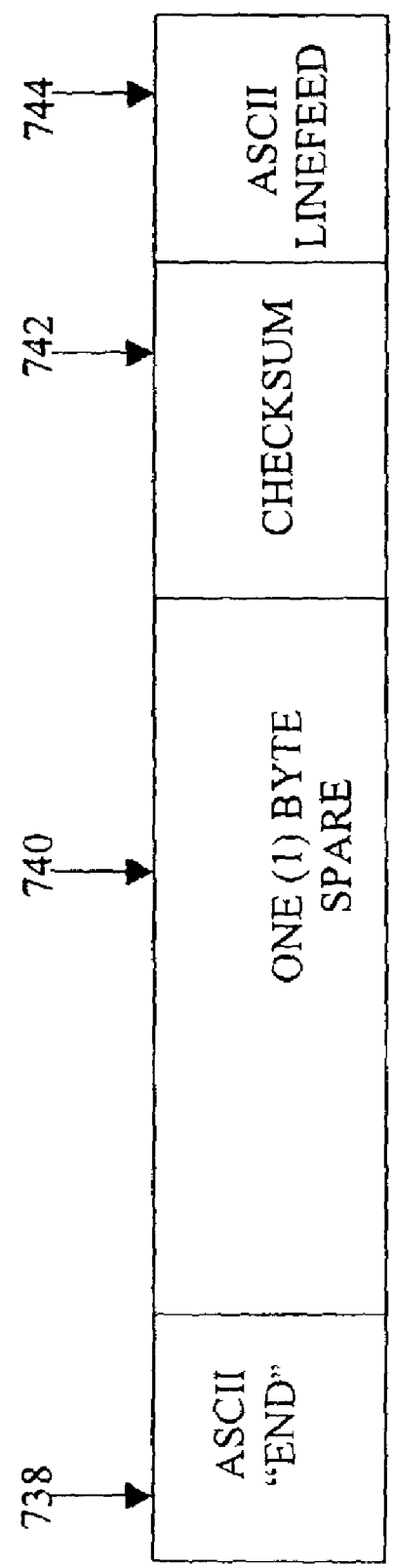
FIG. 16 is a block diagram illustrating the data unit descriptions of an End signal.

The handheld computer sends an End Command as illustrated in FIG. 16 in order to terminate the Connected Mode between the handheld computer and the fluid dispensing device. An ASCII "END" string 738 initiates the End Command. It is followed by a one-byte spare 740 and a checksum 742. The End Command is terminated by an ASCII linefeed 744.

Graphical User Interface of Handheld Computer

Figure 17:
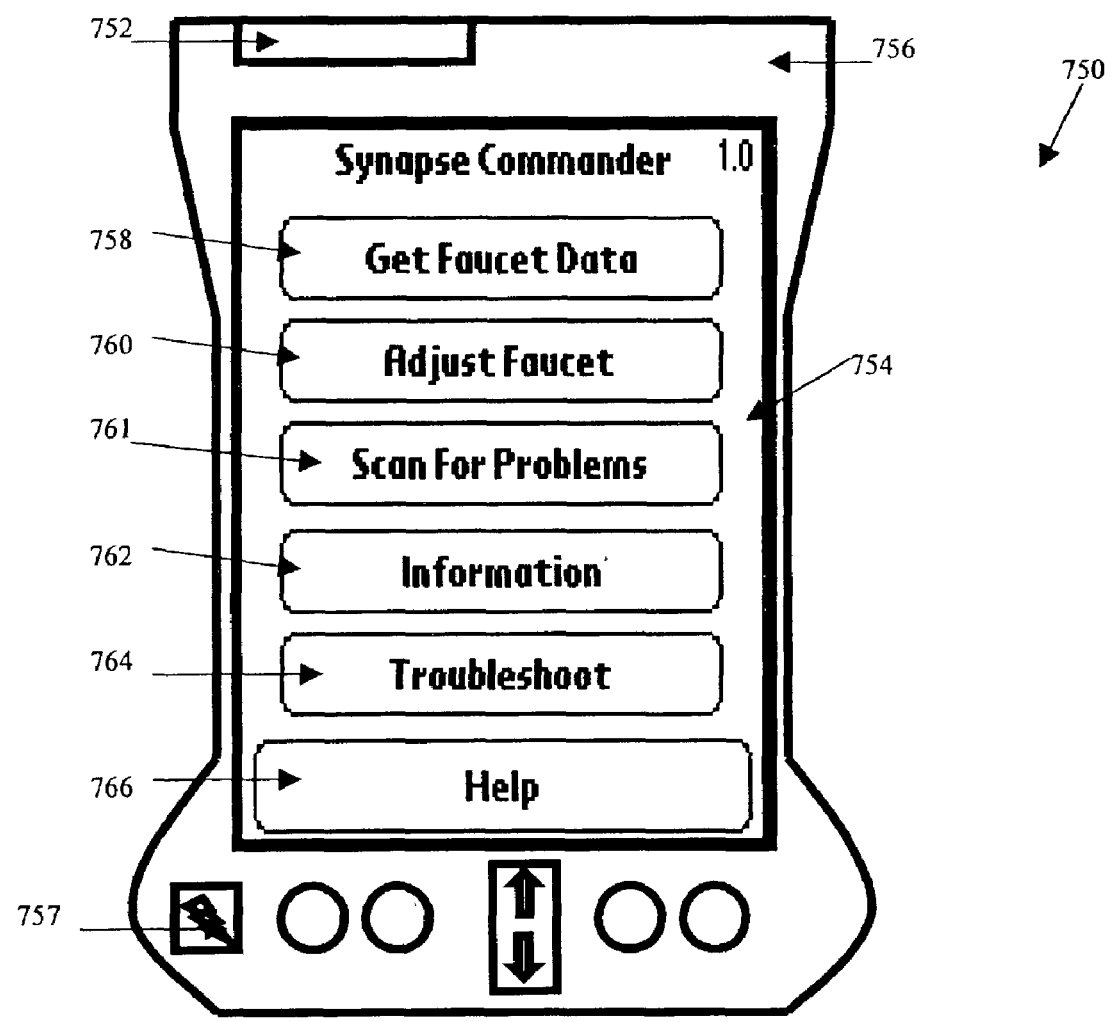
FIG. 17 is a graphical depiction of the graphical user interface of a handheld computer illustrating five (5) exemplary user options, including three options that incorporate an optical link with the fluid dispensing device of the present invention, "Get Faucet Data", "Adjust Faucet", and "Scan For Problems".

The Graphical User Interface (GUI) of the handheld computer is now described with reference to FIG. 17. The handheld computer 750 generally includes a casing 756 having a monitor 754, an optical interface port 752, and a power button 756. The monitor can be a touch-screen or any other type of monitor known in the art.

The system provides the user with several options including 1) "Get Faucet Data" 758, 2) "Adjust Faucet" 760, 3) "Scan for Problems" 761, 4) "Information" 762, 5)

"Troubleshoot" 764, and 6) "Help" 766. Of the six (6) options provided, options 1) through 3) require communication with the fluid dispensing device.

The "Get Faucet Data" option 758 retrieves and stores fluid dispensing device information. Retrieval of the fluid dispensing device data is accomplished by executing the SST command of the handheld computer. As described, the handheld computer emits an Attention Signal. When the fluid dispensing device detects the Attention Signal the handheld computer and the fluid dispensing device enter Connected Mode. The fluid dispensing device then transmits a set of information describing various parameters of the fluid dispensing device.

Figure 18:
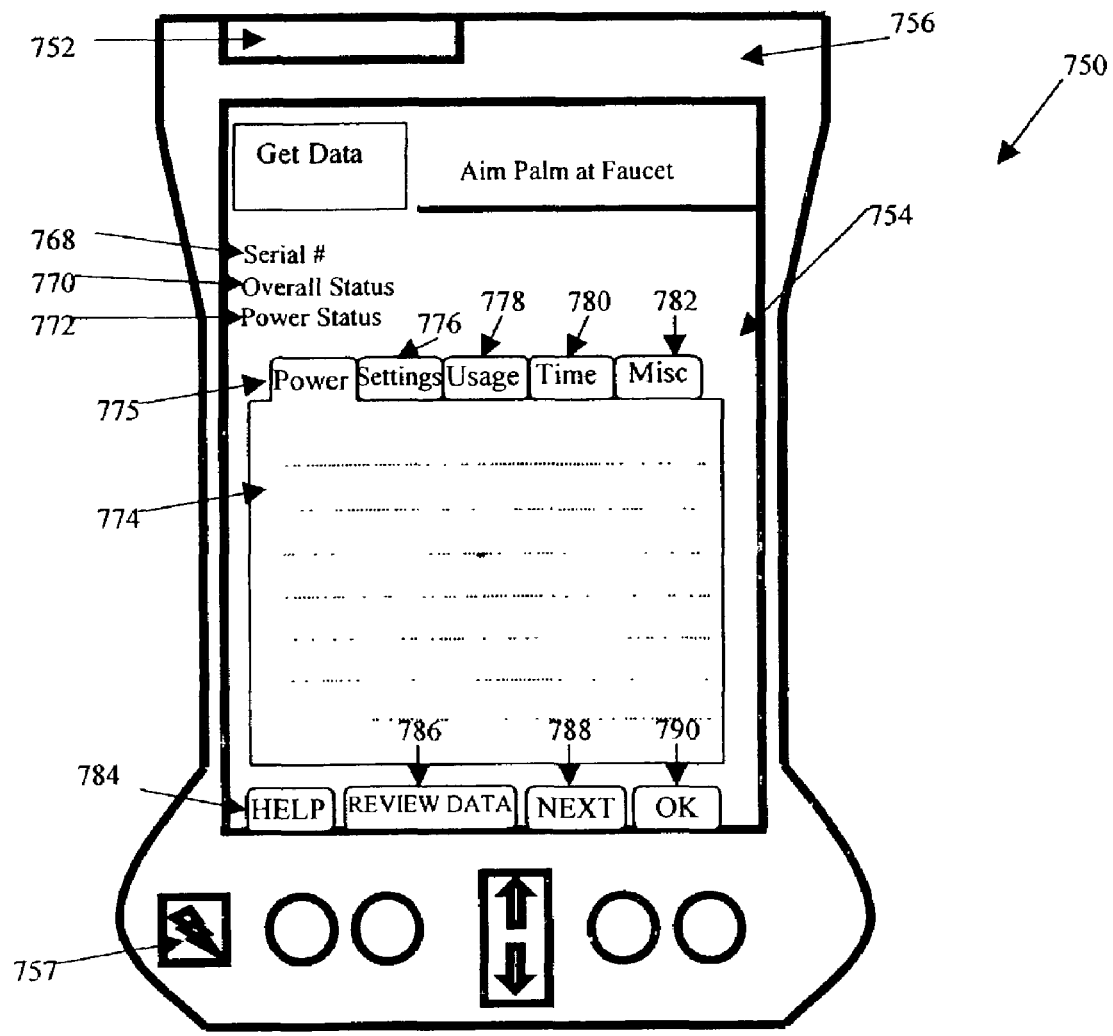
FIG. 18 is a graphical depiction of the graphical user interface of a handheld computer illustrating the "Get Faucet Data" option form that allows a user to retrieve current fluid dispensing device parameters.

Once the data is retrieved, the data is stored in the handheld computer for user accessibility. FIG. 18 illustrates the GUI interface that is displayed once the data is received from the fluid dispensing device. The fluid dispensing device data can be reviewed by pressing the five tabs on the screen including Power 775, Settings 776, Usage 778, Time 780, and Miscellaneous 782.

The Power tab 775 contains data relating to the power operating parameters of the fluid dispensing device. These parameters include normal operating voltage, loaded voltage, time in use and battery replacement date.

The Settings tab 776 contains data on the various system settings accessible to the user. These settings include, but are not limited to, operating mode, range setting, range offset, delay setting and virtual settings. The factory default operating mode is the normal motion detecting mode where water flows within 250 milliseconds after activating sensor and stays on as long as motion is detected. The maximum on time in this mode is 45 seconds. Additional modes include scrub mode where water continues to flow for sixty (60) seconds after deactivation of the sensor, metered mode having a 10-second flow time from first hand detection, and water saver mode having a 5-second maximum on time starting from first hand detection and fast turnoff when hands are removed.

The Usage tab 778 provides information such as the number of uses, uses per day and uses per month. The Time tab includes the time of the scan, the date of the scan and the total on-time for the faucet. Finally, the Miscellaneous tab 782 includes current errors, past errors, software version, PCB number and engineering change level.

Additional pushbuttons Help 784, Review Data 786, Next 788, and OK 790 provide additional functionality. Review Data 186, when selected, displays data from the fluid dispensing device. Next 780, when selected, performs another "Get Faucet Data" function on a fluid dispensing device.

Figure 19:
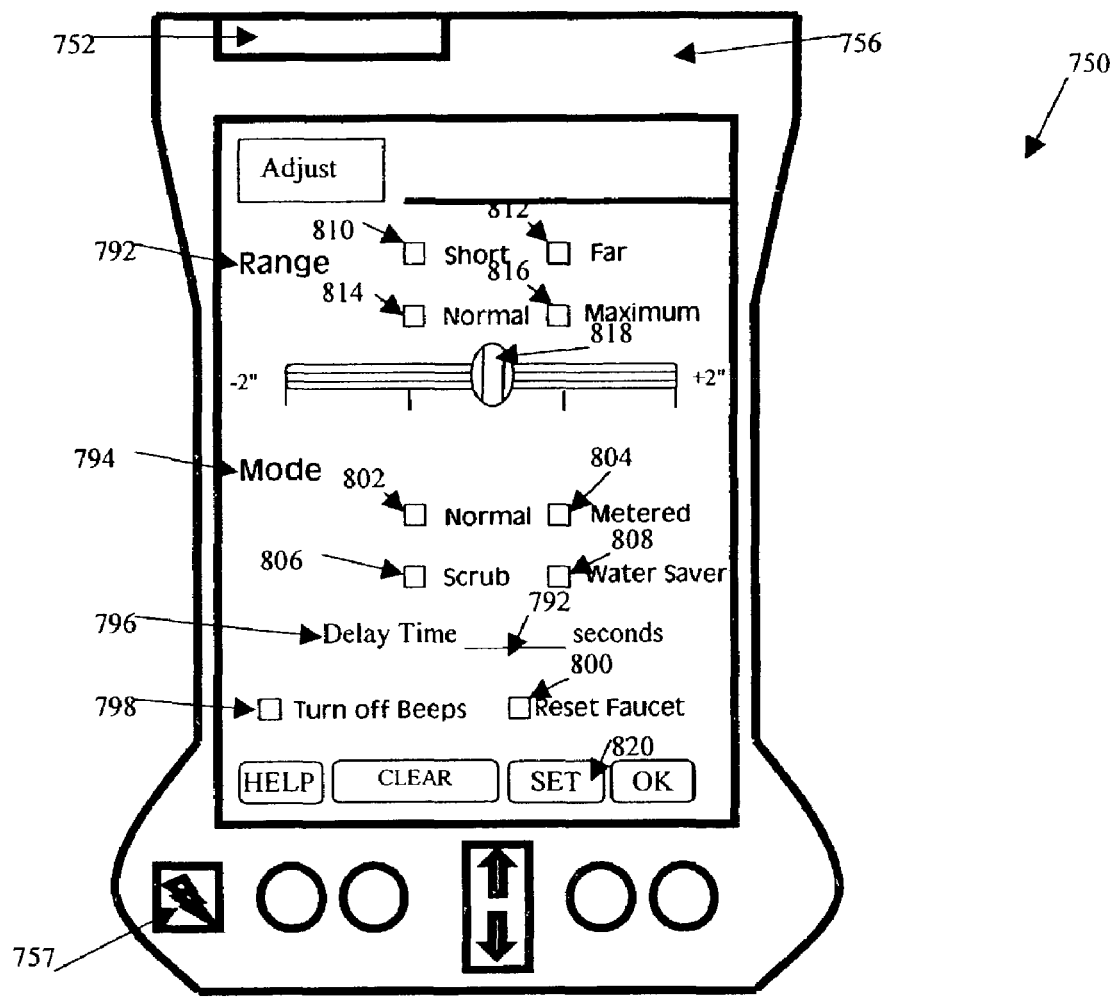
FIG. 19 is a graphical depiction of the graphical user interface of a handheld computer illustrating the "Adjust Faucet" option form that allows a user to edit current fluid dispensing device parameters.

The "Adjust Faucet" option 760 (FIG. 17) allows a user to edit the parameters of the fluid dispensing device and download parameter changes to the device, itself. Selecting the "Adjust Faucet" option 760 from the Commander menu in FIG. 17 displays the GUI illustrated in FIG. 19. This GUI is a form having numerous areas in which the user can enter information about the parameters of the fluid dispensing device. The user can modify the "Range" 792 of the emitter by selecting one of the checkboxes "Short" 810, "Normal" 814, "Far" 812 or "Maximum" 816.

The user can also modify the "Mode" 794 in which the fluid dispensing device is operating. The user can place the device in "Normal" mode 802, "Scrub" mode 806, "Metered" mode 804 or "Water Saver" mode 808 by selecting the corresponding checkbox.

The range slider 818 allows the user to add or subtract 2 inches from the optics range. Initially, the user must calibrate the faucet to determine the current range length. The slider can then be used to adjust the current range ±2 inches.

In addition, the user can change the "Delay Time" 796 of the operating mode selected. The user can enter a delay time ranging from zero to 180 seconds by entering the time in the text field 792. Also, the user can elect to "Turn off Beeps" by selecting the checkbox 798 or "Reset Faucet" by selecting the checkbox 800.

Once edits have been completed, the user selects the "SET" pushbutton 820. As described, infra, with reference to FIG. 14, the Set Command is initiated by transmitting the "SET" signal after obtaining Connected Mode. The "SET" stream is sent to the fluid dispensing device, and the requested changes to the device parameters are updated.

Figure 20:
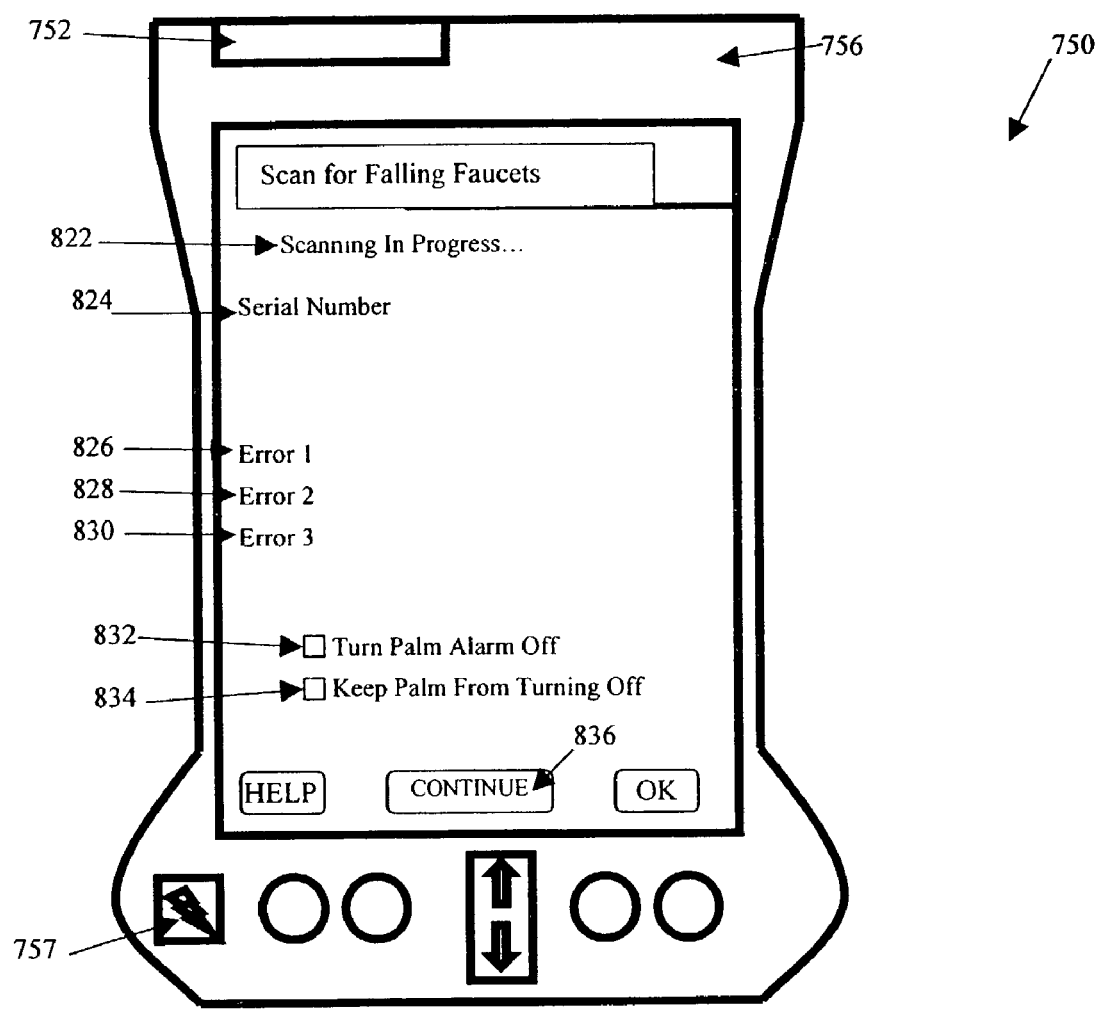
FIG. 20 is a graphical depiction of the graphical user interface of a handheld computer illustrating the "Scan For Problems" option form that allows a user to retrieve Broadcast signals as diagrammed in FIG. 10 from a set of fluid dispensing devices.

The "Scan For Problems" option 761 (FIG. 17) allows a user to scan a set of fluid dispensing device, searching for a signal from a device that has entered Broadcast Mode. This allows the handheld device to determine from the Broadcast Mode signal devices that are currently in need of service. Selecting the "Scan For Problems" option 761 from the Commander menu in FIG. 17 displays the GUI illustrated in FIG. 20. As indicated, when the GUI illustrated in FIG. 20 is displayed, the "Scanning in Progress" message 822 is displayed.

If a fluid dispensing device is in Broadcast Mode, the "Serial Number" 824 of the malfunctioning device is displayed. In addition, errors associated with the device "Error 1" 826, "Error 2" 828 and "Error 3" 830 are displayed. The user can prevent the handheld device from sounding an alarm by selecting the "Turn Palm Alarm Off" checkbox 832. Also, the user can select to keep the handheld computer on for as long as active scanning is in progress by selecting the "Keep Palm From Turning Off" checkbox 834.

The user may continue scanning by selecting the "Continue" pushbutton 836.

Exemplary System Hardware

While numerous hardware configurations, in addition to those described briefly above, may be employed in accordance with the system and method of the present invention, reference will now be made in detail to a second preferred hardware configuration and arrangement applicable for use within the system of the present invention.

Because the features of the present invention can be shown with block and other diagrams, conventional electronic elements well known to those skilled in the art, such as transistors, amplifiers, resistors, capacitors, programmable processors, logic arrays, memories and corresponding couplings and connections of such elements are not shown. A person skilled in the art could readily understand the block diagrams illustrating embodiments of the present invention. The block diagrams show specific details that are pertinent to the present invention and do not obscure the disclosure with details that would readily be apparent to those skilled in the art.

Figure 23:
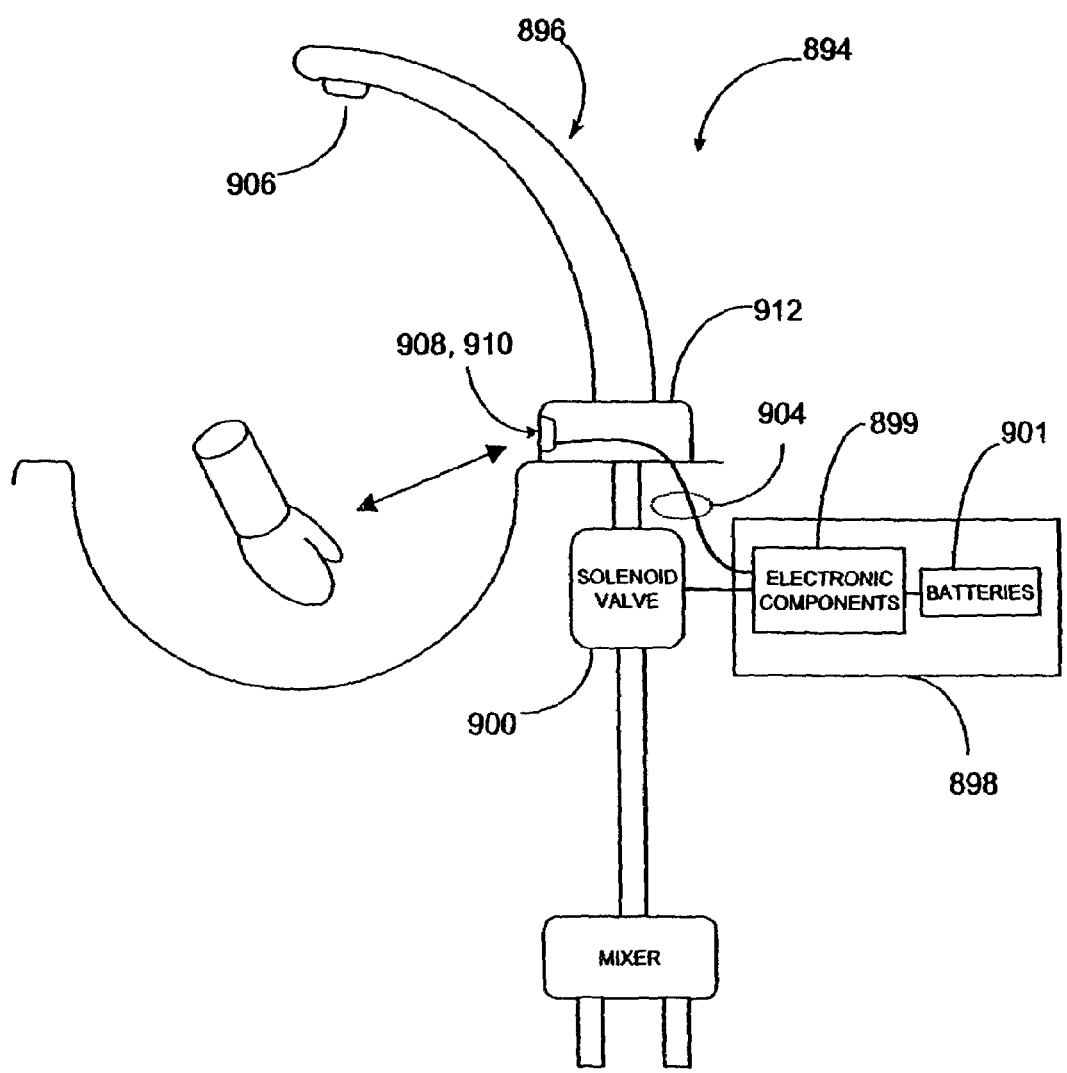
FIG. 23 is a diagram of a conventional electronically operated dispensing device.

A conventional electronically operated flow control device 94 commonly found in the art is shown in FIG. 23. The prior art embodiment depicted in FIG. 23 generally includes a faucet 896, an electronics box 898 for housing electronic components 899 and batteries 901. The electronic components 899 are coupled to a solenoid valve 900, which may move between an open position and a closed position in response to instructions provided by the electronic box 898. Generally speaking, a wiring harness 904 having cables provides power and a communication link between electronics box 898, faucet 896 and solenoid valve 900.

As further shown in FIG. 23, faucet 896 of conventional electronically operated flow control device 894 typically includes an IR emitter 908 and an IR receiver 910 mounted within a collar 912 (or neck) of faucet 896. The IR emitter 908 and the IR receiver 910 cooperate to transmit and receive IR signals, which indicate the presence of a user's hands or other objects in the vicinity of an aerator 906 When a signal emitted from IR emitter 908 is reflected back and received by IR receiver 910, IR receiver 910 generates an electrical signal, referred to as a "reflection signal," that has a voltage corresponding to the signal strength of the reflected IR signal. The reflection signal is coupled through a wire in the wiring harness 904 to electronics box 898. The electronic components 899 process the reflection signal and send a control signal through wiring harness 904 to the solenoid valve 900. When an external object, such as a user's hands, moves into the detection range of IR emitter 908 and receiver 910, the signal strength of the reflected signal and, therefore, the voltage of the reflection signal should be higher than normal. Thus, the electronic components 899 detect the presence of the external object. When the magnitude of the reflection signal is above a particular threshold value a control signal causes the solenoid valve to open, allowing water to flow in faucet 896. In most conventional flow control devices 894 water flows until a timer expires or until the reflection signal is again below the threshold value indicating that the external object is no longer within the detection range of IR emitter 908 and IR receiver 910.

Figure 24:
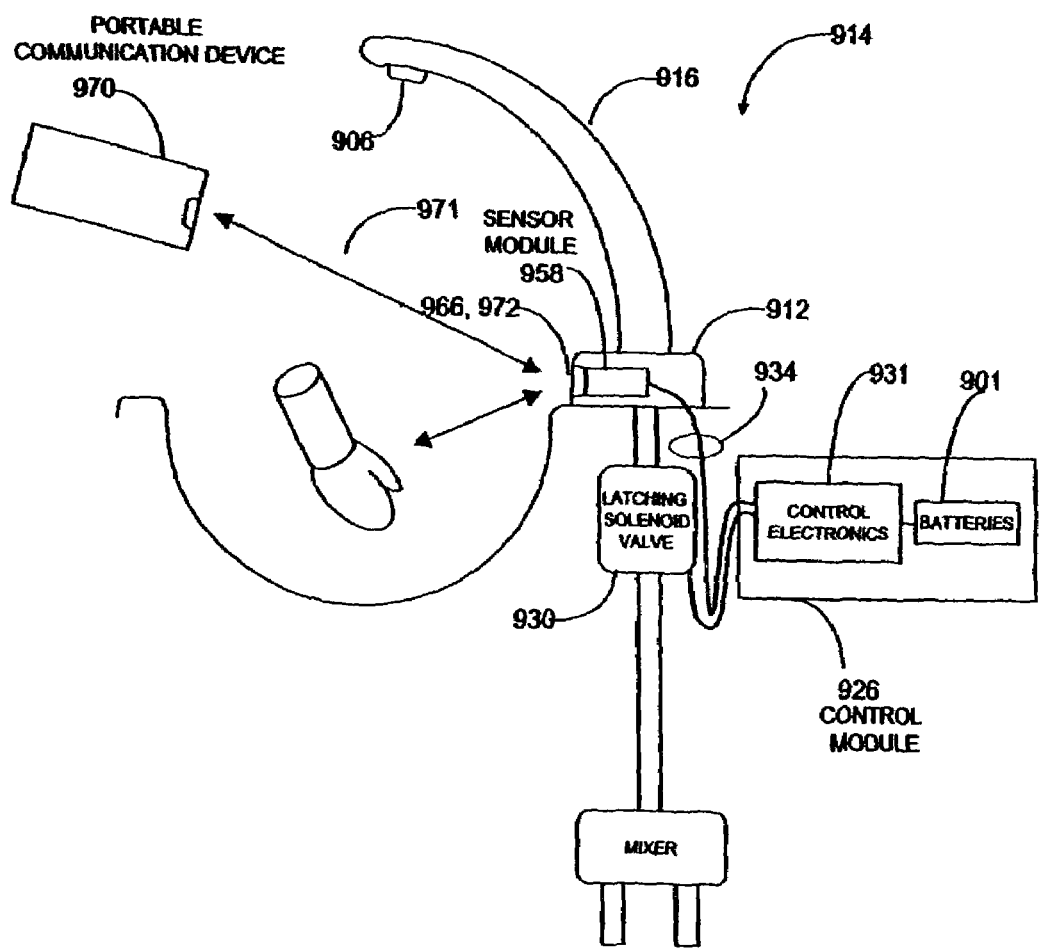
FIG. 24 is a diagram illustrating a second preferred electronically operated dispensing device incorporating a portable communication device in accordance with the present invention.

An exemplary embodiment of a remotely managed electronically operated dispensing apparatus of the present invention is shown in FIG. 24, and is designated generally throughout by reference numeral 914. Remotely managed electronically operated dispensing apparatus 914 preferably includes a dispensing unit, such as a faucet 916. Faucet 916 preferably includes a collar 912 having an emitter aperture 972 preferably covered by a signal transmissive lens, and a receiver aperture 966, which permit signals, such as, but not limited to, IR signals to exit and enter collar 912. Remotely managed automatic dispensing apparatus 914 further includes a control module 926, a latching solenoid valve 930 that opens and closes in response to signals provided by control module 926. In the preferred embodiment, control module 926 is contained in an enclosure that incorporates an anti-vandalism bracket (not shown). Remotely managed automatic dispensing apparatus 914 may also include one or more flexible sheaths (not shown) for protecting and positioning the electrical cables 934, which provide a communication link between a sensor module 958 (FIG. 27) positioned within collar 912 of faucet 916 and control module 926, and between control module 926 and latching solenoid valve 930.

The primary purposes of the flexible sheaths are to protect the electrical wiring and to position the electrical wiring with respect to control module 926 and latching solenoid valve 930 such that flexible sheaths form one or more drip loops which are designed to capture any water inadvertently running down the electrical wiring from a leak in faucet 916, the sink, or otherwise. A primary objective of the drip loops is to prevent water from entering the cables and reaching the electronics within the control module 926 and/or the latching solenoid valve 930. Gravitational forces act on any water collected in the drip loops thereby preventing that water from contacting the connectors or other electronic circuitry within or adjacent to control module 926 and latching solenoid valve 930.

Remotely managed automatic dispensing apparatus 914 also preferably includes a sensor board or sensor module 958 (FIG. 27) that is particularly well suited for being retrofit within collar 912. The sensor module 958 may be designed similar to or identical to conventional sensor modules employed within conventional flow control devices 894. More specifically, the sensor module 958 may be constructed and arranged so that it may be installed in a collar having only two apertures, which is typical for conventional flow control devices 894.

As will be described in greater detail below, remotely managed automatic dispensing apparatus 914 of the present invention is preferably designed to communicate with a portable communication device 970. The portable communication device 970, which in the preferred embodiment is a reprogrammed personal digital assistant (PDA), is preferably configured to transmit and receive IR signals for establishing a communication link 97 with managed automatic dispensing apparatus 914.

In addition to an IR emitter 960 and an IR sensor 962, such as a detection or object photo detector, sensor module 958 of the present invention preferably incorporates a data or communication IR sensor 964 such as another photo detector, for receiving communication signals from the portable communication device 970. In one embodiment, IR sensor 962 and the communication IR sensor 964 are mounted back-to-back (not shown) on sensor module 958. Generally speaking, photo detector lens 965 is positioned near the front of sensor board 958 for receiving light through receiver aperture 966, while communication photo detector lens 968 faces the rear of IR sensor 962. Transparent silicone sealant fill 967 may hold the sensors 962 and 964 securely in aligned position. Additional arrangements of JR sensors 962, 964 are possible in other embodiments. In particular it is not necessary communication IR sensor 964 to receive IR signals through the hole 973 of IR sensor 962. For example, a side-by-side configuration for sensors 962 and 964 may be employed if desired. Further, in another embodiment a single sensor, such as IR sensor 962 may serve for detecting reflections and for receiving communication signals.

According to techniques that will be described in more detail below, control module 926, sensor module 958 within collar 912, and latching solenoid valve 930 may be utilized to control operation of faucet 916 and to provide information pertaining to the operational state of faucet 916. Similarly, these components may be implemented within and utilized to control other fluid dispensing devices, such as toilets, for example.

As depicted in FIGS. 24 and 31, sensor module 958 is preferably mounted such that IR emitter 960 is positioned behind and aligned with the transmit aperture 972 of collar 912, while detection photo detector 962 and communication photo detector 964 are positioned behind and aligned with the receive aperture 966 of collar 912. So arranged, the IR signals emitted by IR emitter 960 are transmitted through transmit aperture 972, and both the reflected signal from IR emitter 960 and the communication signal emitted by a portable communication device 970 for controlling and managing the operation of automatic dispensing apparatus 914 are received through receive aperture 966. When desired, automatic dispensing apparatus 914 may send information to portable communication device 970 (upstream information) through transmit aperture 972. Further, automatic dispensing apparatus 914 may receive information from portable communication device 970 (downstream information) through receive aperture 966. Typically, most IR devices, such as the IR emitter 960 and IR detectors 962, 964, have an integrated lens to focus infrared signals and protect the semiconductor material.

As shown in FIG. 24, portable communication device 970, such as a Palm IIIe™ manufactured by 3com®, which preferably utilizes the Palm Computing Platform®, for example, may be configured to communicate with the remotely managed automatic dispensing apparatus 914 of the present invention. Generally speaking, the portable communication device 970 used to communicate with the remotely managed automatic dispensing apparatus 914 of the present invention includes an IR emitter and IR sensor that provide for exchange of data via IR signals passed through apertures 966, 972. It will be understood by those skilled in the art, however, that other devices and particularly portable devices, such as personal digital assistants manufactured by other manufacturers, cellular telephones, pagers, portable computers, and the like may be used to communicate with the remotely managed automatic dispensing apparatus 914 of the present invention. In addition, communication signals other than IR signals may be used to transfer data between any such portable communication device and the remotely managed automatic dispensing apparatus 914 of the present invention. It is not necessary that a device communicating with the remotely managed automatic dispensing apparatus 914 be a portable device configured for IR communication. For example, one or more wires may be coupled to the remotely managed dispensing apparatus 914 to serve as a communication channel for a non-portable communication device. This being said, the preferred embodiments of the present invention will be described hereafter with reference to the portable communication device 970 being the PalmIIIe™, but the preferred embodiments are in no way intended to be limited only to the above mentioned PDA.

Generally speaking, the present invention provides an improved maintenance and monitoring system for use in commercial facilities such as office buildings, manufacturing plants, warehouses, or the like. For example, public restrooms in an office building may benefit from such a system in that such a system may facilitate the efficient operation, management and servicing of multiple conventional automatic flow control devices throughout the building. More specifically, conventional automatic flow control devices are battery powered and therefore require battery replacement. In addition, there are typically a plurality of such devices in any given restroom within the building. As one would expect, the maintenance of such conventional dispensing devices is both time consuming and labor intensive since maintenance personnel have no efficient way of determining whether such devices require battery replacement or are otherwise defective. As a general rule, manual interaction with each device is required to make these determinations. For example, maintenance personnel position their hands beneath the aerator of each conventional automated sink to determine if the faucet is operating correctly. Troubleshooting, however, requires the time consuming steps of removing the cover of electronics box 898, and physically checking and analyzing the circuitry and other components thereof. Accordingly, there is a need for an improved maintenance and monitoring system for commercial facilities having large numbers of automatic flow control devices.

Figure 25:
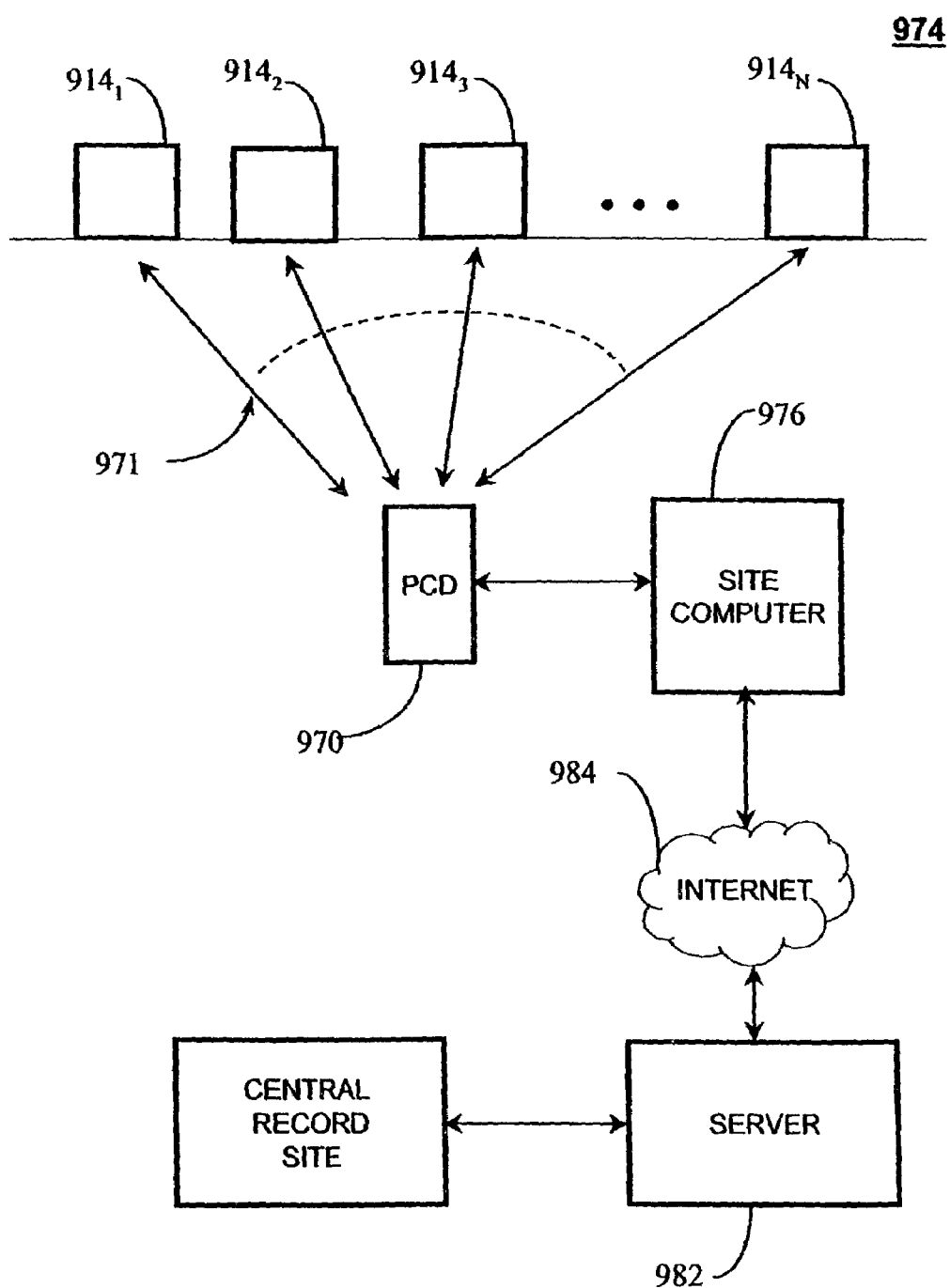
FIG. 25 is a schematic diagram of an exemplary remotely managed dispensing system incorporating the dispensing apparatus depicted in FIG. 24.

As depicted schematically in FIG. 25, remotely managed automatic dispensing apparatus 914 may be a part of a remotely managed automatic dispensing system 974. System 974 preferably includes a plurality of remotely managed automatic dispensing apparatuses $914_1$, $914_2$, ..., $914_N$, each having an associated dispensing unit, such as a faucet 916 or other dispensing device. The portable communication device 970 may exchange data with each of the automatic dispensing apparatuses via one or more IR communication links 971. A site computer 976 capable of communicating with portable communication device 970 may store information about each of the site's managed automatic dispensing devices. Optionally, one of ordinary skill in the art will recognize that system 974 may be monitored and controlled in a network environment. In a preferred embodiment, a remote server 982 may receive data relating to system 974 from PCD 970 or a site computer 976 over the Internet 984 or other network environment via any standard network connection.

System 974 of the present invention largely obviates the need for manual troubleshooting or servicing of dispensing devices. By implementing the system 974 of FIG. 25, maintenance personnel may enter an area, for example a restroom, containing numerous remotely managed automatic dispensing apparatuses 914 of the present invention, communicate with one or more of the apparatuses 914, and determine which, if any, of the apparatuses are defective or otherwise require servicing based on data communicated from the one or more apparatuses 914. In accordance with the preferred system 974 of the present invention, a failing or malfunctioning apparatus 914 may automatically discover an operational problem and broadcast an IR data signal indicating the nature of the problem. This IR data signal may indicate, for example, the serial number, location, and problem, among other things for the defective apparatus 914 in the room. Depending upon the nature of the problem associated with one or more of the apparatuses 914, portable communication device 970 may preferably provide the maintenance person with troubleshooting information indicative of the problem. Moreover, PCD 970 may also be used to repair defective apparatuses 914. For example, when the problem associated with a defective apparatus 914 is software related, PCD 970 may be used to transmit a software update or otherwise reprogram defective apparatus 914 by transmitting software updates via IR.

In addition, portable communication device 970 preferably includes memory for storing information such as the maintenance history and/or software update history of each device, or an installation and user's guide that may be used by maintenance personnel to install and operate new apparatuses 914. The memory may also be used to maintain records of data gathered or entered for each apparatus 914, by serial number. More preferably, portable communication device 970 may be used to transmit, to one or more apparatuses 914, commands for adjusting apparatus parameters such as IR range, and/or update the software of a given apparatus 914, thus largely eliminating the need for maintenance personnel to open the electronics box 926 and physically access one or more of the apparatus boards. Such commands may be received by IR sensor 964 and processed by signal processor 1006 (FIG. 27).

Information collected by portable communication device 970 may also be transferred to a site computer 976 for updating device records in stored memory of the site computer. In addition, any information transmitted by any apparatus 914 to portable communication device 970 may be sent to a web server 982 via the Internet 984 where the information may be logged and stored in a relational database, such as Microsoft Access, for device fault analysis or other research. Additionally, web server 982 may generate and deliver responses to trouble reports received from portable communication device 970 and system updates to site computer 976 via the Internet 984.

FIGS. 26*a*–26*f* depict various display screens, as viewed on portable communication device 970, that may be used in connection with system 974 of the present invention. For example, a control panel screen 986 displays, on portable communication device 970, a menu of selectable items for the managed automatic dispensing apparatus 914. By way of example, but not limitation, a user may select "Information" from screen 986 and obtain information about a faucet as viewed on Information screen 988. Adjust screen 989 provides inputs for adjusting faucet parameters, such as detection distance, flow mode, and time on. Additional example screens are shown in FIGS. 26*d*–26*f* and provide maintenance personnel with information that will reduce troubleshooting time and time to repair. The depicted screens represent preferred examples of the types and arrangements of information that may be available to maintenance personnel on display screens provided by PCD 970.

Figure 27:
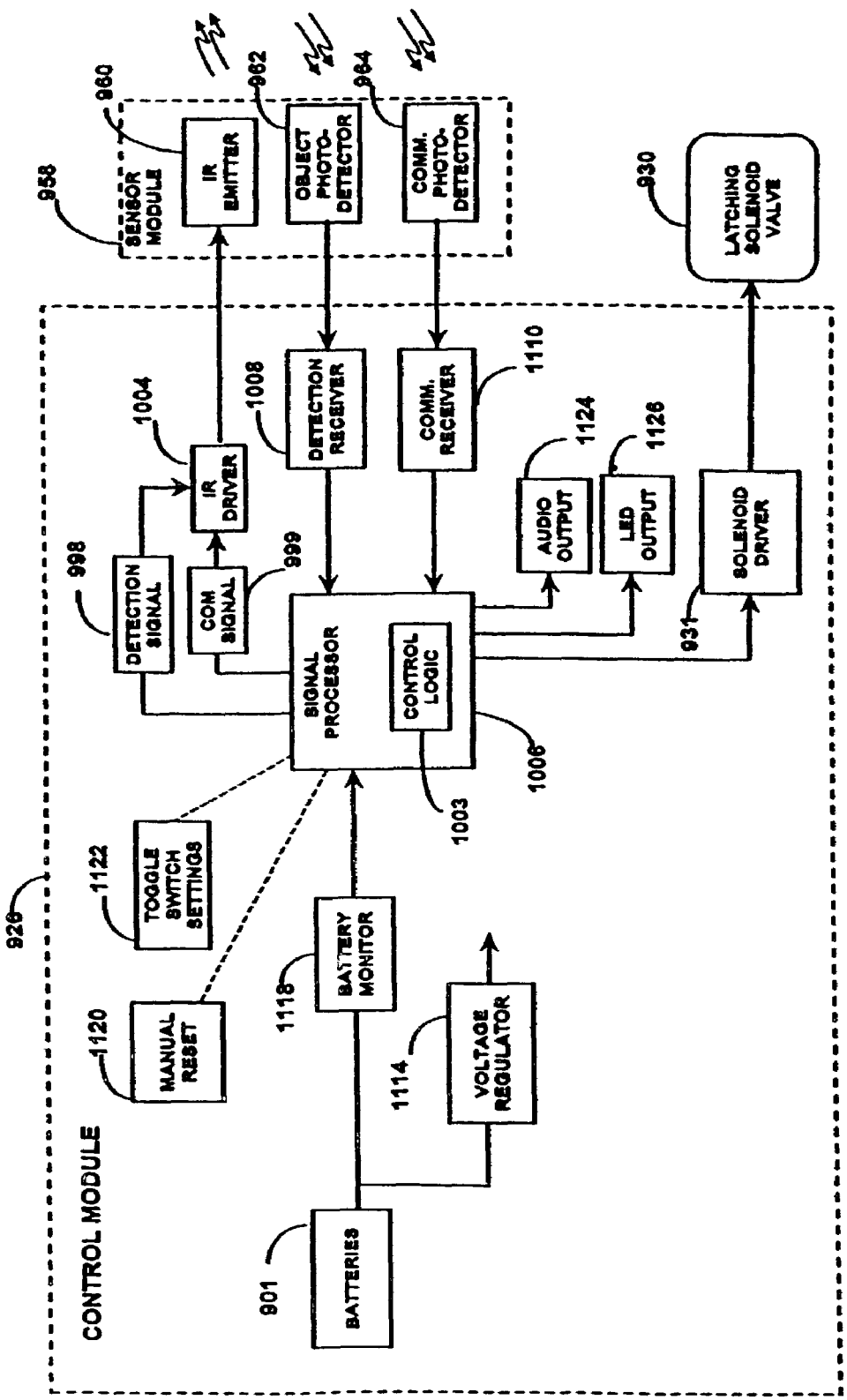
FIG. 27 is a block diagram illustrating a the preferred elements of the control module depicted in FIG. 24.

The block diagram of FIG. 27 illustrates a more detailed view of control module 926 and sensor module 958. The control module includes control logic 1003 for controlling the operation of remotely managed dispensing apparatus 914. The control logic may be implemented in hardware, software or a combination thereof. In the preferred embodiment, the control logic 1003 is implemented in software and stored within a signal processor, such as, for example, a Motorola microprocessor (MC88HC908GP32CF8) having flash memory, analog-to-digital (A/ID) converters and a variety of input and outputs as are described in the vendor's data sheets. When the remotely managed dispensing apparatus 914 is implemented as a faucet that dispenses fluid into a sink, the electronics of the remotely managed dispensing apparatus 914 may preferably be located in sensor module 958 contained in the collar 912 of the faucet and in control module 926, which is typically mounted under the sink. The two modules 926, 958 may be electrically connected via cables 934 (FIG. 24). In addition, a cable extends from the control module 926 to a latching solenoid valve 930 that directly controls fluid flow. The control module 926 is preferably positioned in a secure enclosure while the sensing electronics or sensor module 958 is preferably positioned on a sensor board potted in collar 912 of the faucet. The potted arrangement reduces the likelihood that water will come into contact with the sensing electronics, and thus minimizes the risk of corrosion and other damage to these parts.

The signal processor 1006 provides a detection signal 998 and a communication signal 999 for transmission from an IR emitter 960 in the sensor module 958. The detection signal 998, preferably generated by the control logic 1003, is a sequence of one or more narrow pulses. In the preferred embodiment, the pulses occur several times per second although other time intervals may be utilized in other embodiments. The detection signal is preferably sent to IR driver circuit 1004 and coupled via a cable to the IR emitter that wirelessly transmits the narrow IR pulses. In the preferred embodiment, one pulse is transmitted every 250 milliseconds. The detection signal is transmitted when the automatic dispensing apparatus is in a detection mode and the communication signal is transmitted when the automatic dispensing apparatus is in a communication mode. The managed automatic dispensing apparatus in the preferred embodiment transfers from the communication mode back to the detection mode when control logic 1003 determines that all information has been exchanged.

Reflected detection signals are detected by an object photo detector 962 and are thereafter coupled to the signal processor 1006 via a detection receiver 1008. Other receiver elements such as a filter or amplifier, or both may be utilized to process the reflected signals detected by the object photo detector 962. In the detection mode, the managed automatic dispensing apparatus transmits a detection signal, receives reflected detection signals, and remains in the detection mode until there is a request to transfer to a communication mode. The communication mode request may be initiated by the portable communication device 970 as disclosed above and further described in co-pending U.S. Patent Application filed Oct. 23, 2001, entitled, "Data Communications System and Method for Communication Between Infrared Devices," and assigned Attorney docket No. 00-0895.16, which is hereby incorporated herein by reference, if desired, or may be initiated by the control logic 1003. A request by the PCD 970 for switching to the communication mode preferably is initiated by a transmission of a known digital sequence from the PCD 970. Once the known sequence is detected by the communication photo detector 964, communicated to control logic 1003 via communication receiver 1110 and verified by control logic 1003, the automatic dispensing apparatus 914 transitions to the communication mode. When the managed automatic dispensing apparatus 914 is in the communication mode, the control logic 1003 transmits a communication signal to the IR emitter 960. The communication signal may require a boost from the IR driver circuit 1110 before being transmitted to the IR emitter 960. The non limiting communication signal of the present invention may be based on the specifications described in an IR Data Association Specification and may be limited to half duplex transmission at or less than 9600 bps. Those skilled in the art could use a variety of modulation technologies to provide for information or data exchange.

When the object photo detector 962 generates a signal in response to reflected signals from an object, such as a person's hand, the signal is communicated to signal processor 1006. If the signal is greater than a threshold value, receive logic in the signal processor provides an open valve signal to a solenoid driver 931. Solenoid driver 931 and any associated electrical components can be similar or identical to an H-bridge circuit described in U.S. Pat. No. 5,819,336, which is hereby incorporated herein by reference. The solenoid driver 931 is adapted to drive a latching solenoid valve 930 that opens in response to the open valve signal or closes in response to a close valve signal from the signal processor 1006.

The control module 926 may be powered by one or more batteries 901 or by some other suitable power source. One embodiment of the present invention incorporates four (4) AA batteries in series (around 6 volts) coupled to a voltage regulator 1114 for providing a regulated voltage of three (3) volts for most of the electronics and uses six (6) volts to power the latching solenoid valve 930 and the IR emitter 960. An audio output 1124 and LED output 1126 serve as troubleshooting indicators. For example, if the battery voltage is low, the LED preferably exhibits a defined on/off pattern. A battery monitor 1118 serves several functions. Under no-load conditions, the battery monitor 1118 determines, comparing the battery voltage with a known voltage, if the battery should be replaced. In addition, the battery monitor 1118 may determine if the windings in the latching solenoid valve 930 are in an open circuit condition or in a short circuit condition by observing the battery loading characteristics. Information from the battery monitor 1118 may be sent to the portable communication device 970 when the remotely managed dispensing apparatus 914 is in the communication mode. In addition, an audio signal from the audio output device 1124 or a visual output from the LED output 1126 may be used to notify maintenance technicians of a variety of identified problems.

FIG. 28 is a block diagram illustration of timing aspects of the automatic dispensing apparatus 914 of the present invention. The control logic 1003 preferably generates a detection signal 998 when the managed automatic dispensing apparatus 914 is in the detection mode and preferably generates a data communication signal 999, for the upstream direction, when the managed automatic dispensing apparatus 914 is in the communication mode. The control logic 1003 processor is configured to generate either the detection signal 998 or the communication signal 999, but the control logic 1003 preferably does not generate the signals simultaneously. The signal generated by the control logic 1003 is sent to a digital-to-analog converter (DAC) 1134 and is preferably conditioned by driver circuit 1007. An output from the driver circuit 1006 is coupled over a communication link such as a wire to the IR emitter 960 in sensor module 958. Preferably, a transmit aperture 972 in collar 912 of the dispensing device allows the infrared signal to exit from an emitter lens integrated in IR emitter 960. Other arrangements of emitters, lenses, and apertures may provide other embodiments for transmission of infrared signals. The method of generation of the above-mentioned transmit signals is not a limitation of the present invention. In the preferred embodiment, both the pulse width and the pulse height of the detection signal and communication signal may be controlled. For example, the width of the signal preferably is controlled utilizing transistors, and the height of the signal is preferably controlled by a digital value sent to a DAC. The arrangement of the transistors and the DAC could be implemented by those skilled in the art.

FIG. 29 is a timing diagram 944 showing an event repeat time 946, which is preferably approximately 250 milliseconds in the preferred embodiment. Within the repeat time, there is an activity time 948 of around 200 microseconds. During the activity time three samples are taken and stored within memory of the signal processor 1006. In addition the control logic 1003 generates a detection signal 998, positioned in time as shown in FIG. 29. Control logic 1003 samples the battery condition 951, then samples a reflection signal 952, and finally samples the ambient condition 953 (such as room lighting). The reflection sample 952 and ambient sample are taken from object photo detector 962. The reflection sampling occurs immediately after or as the detection signal, represented by pulse width 950 (approximately 60 microseconds), is transmitted. The ambient sampling is used to determine the light levels when no reflections occur. Those skilled in the art would appreciate that variations of the sampling times is not a limitation on the present invention. In general, narrow pulses pull less energy from the battery providing for energy savings, but narrow pulses contain higher frequencies than wide pulses. Components that process the higher frequencies associated with the narrow pulses typically cost more and a cost/efficiency factor is a design consideration. When the repeat time is 250 milliseconds as shown in FIG. 29, the activity time occurs approximately four (4) times per second. Experience has shown that this frequency of activity satisfies the needs of a person using the automatic dispensing unit of the present invention. The use of the ambient sample and the reflection sample are inputs to an adjustment algorithm described in a co-pending U.S. patent application filed Oct. 23, 2001, entitled, "System and Method for Automatic Dynamic Calibration for Infrared Sensing Device," and assigned Attorney Docket No. 00-0895.19, which is hereby incorporated herein by reference. Although not specifically discussed in this specification, initial system calibration is described in detail in a co-pending U.S. patent application filed Oct. 23, 2001, entitled, "Method of Automatic Standardized Calibration for Infrared Sensing Device," and assigned Attorney Docket No. 00-0895.17, which is hereby incorporated by reference herein. In addition to the three samples described above, other samples may be taken to determine the condition of elements within the automatic dispensing apparatus 914 of the present invention. For example, samples taken when the latching solenoid valve 930 is activated may be used to determine changes in the required activation power. Changes in the activation power may give an indication of the solenoid's condition or could indicate above normal pressure in the water supply line. Neither the number of samples, type of samples, or order of samples is considered a limitation on the present invention.

Figure 30:
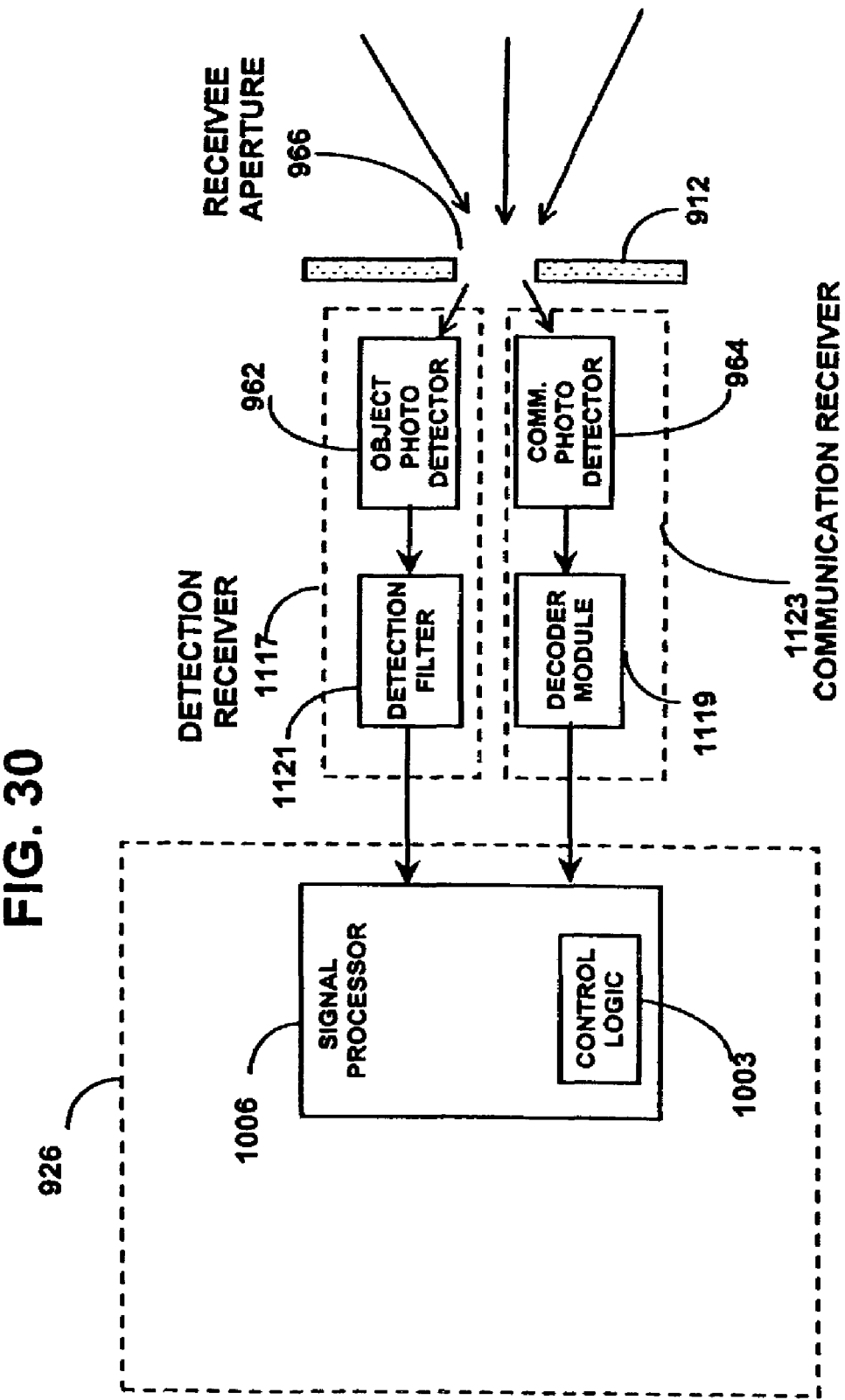
FIG. 30 is a block diagram illustrating the preferred elements of the receiving portion of the control module depicted in FIG. 27.

FIG. 30 is a block diagram showing a preferred receiver arrangement in accordance with the preferred electronically operated dispensing apparatus of the present invention. As shown in the diagrammatic illustration a detection receiver 1117 and a communication receiver 1118 are shown side-by-side. The detection receiver 1117 includes object photo detector 962 coupled to a detection filter 1121. The output of detection filter 1121 preferably is coupled to and processed by the control logic 1003. The communication receiver 1123 includes the communication photo detector 964 coupled to a decoder module 1119, the output of which is processed by the control logic 1003. In one embodiment, the object photo detector 962 and the communication photo detector 964 may be arranged back-to-back (not shown). Various other embodiments, however, are also possible. For example, in another embodiment a single photo detector could provide signals to the detection filter and a decoder module. An arrangement of filters could also be used to separate the lower frequencies of the reflection signals from the higher frequencies of the communication signals. A more preferred embodiment will be described below with reference to FIGS. 32*a*–32*c*. While only a single aperture is shown in FIG. 30, a communication lens and detection lens may be incorporated with photo detectors 962 and 964. The arrangement and location of the aperture and lenses are not intended to limit the scope of the present invention.

FIG. 31 illustrates an exemplary top view mounting arrangement for the IR emitter 960 and the two IR detectors or photo detectors 962, 964. When the emitter and detectors are mounted on a sensor Printed Circuit Board (PCB) of the sensor module 958, the PCB fits within the collar 912 of the automatic dispensing apparatus 914. In addition to the emitter and detectors, other electronic components (not shown) may reside on the PCB. As one of skill in the art will readily recognize, one or more cables preferably couple the PCB to the control module 926.

Figure 32A:
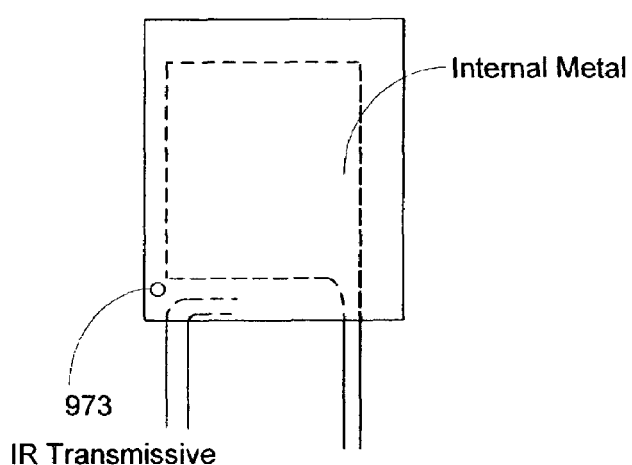
FIG. 32a–32c illustrate various views of a front-to-back mounting of photo diodes in accordance with a preferred embodiment of the present invention.
Figure 32B:
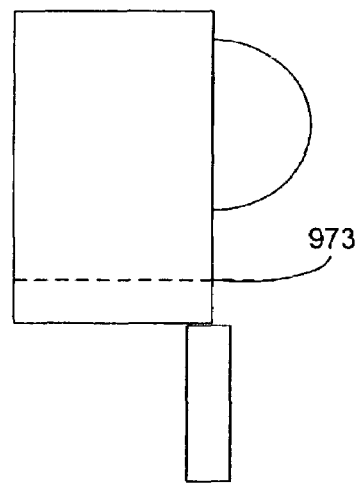
Figure 32C:
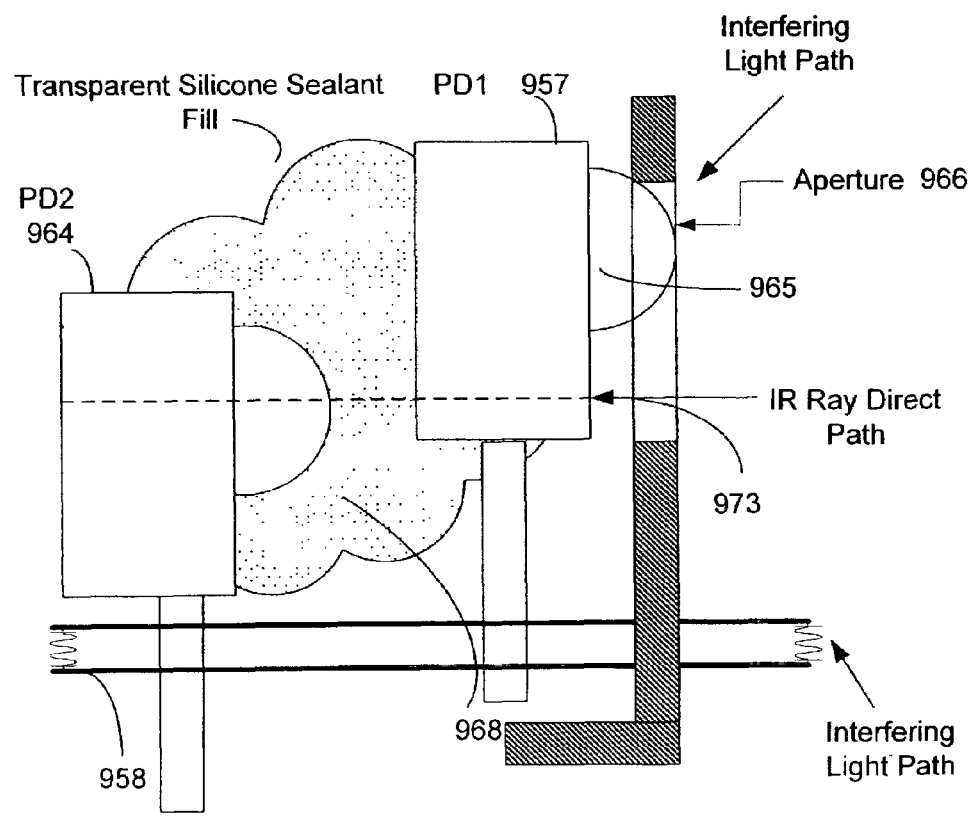

FIGS. 32*a*–32*c* illustrate a preferred front-to-back arrangement for the two IR detectors or diodes 962, 964. Object photo diode 962 is mounted at the front of the sensor printed circuit board and the communication photo diode 964 is mounted behind and preferably offset slightly from photo diode 962. The diodes are preferably positioned some standoff distance from one another, and secured in the positions as shown, with transparent silicone sealant fill 967 as depicted in FIG. 32*c*. The object photo diode 962 preferably includes an IR transmissive aperture 973 that provides for IR signal coupling between an IR source, such as portable communication device 970, and communication photo diode 964. Generally speaking, the above mentioned arrangement allows IR signals to pass through aperture 973 to communication photo diode 964, thus providing better IR reception of data signals than the back-to-back arrangement. Although other sensors may be employed in accordance with the present invention, the preferred object photo diode 962 may be a diode identified by part number BPV23F and the communication photo detector 964 may be a diode identified by part number BPV22F, both of which are manufactured by Vishay Intertechnology, Inc. The photo diodes 962, 964 are preferably mounted on the sensor printed circuit board with conventional electronic components. In addition, and as indicated in FIG. 32c, the arrangement positioned behind a single aperture has the effect of minimizing interference from undesired light sources, such as sunlight or room lighting.

Because the automatic dispensing apparatus 914 in the described embodiment is battery powered, it may be desirable to utilize a battery savings methodology. Such a battery saving methodology is embodied when the control logic 1003 configures the signal processor 1006 to operate in an on mode, a wait mode, and a stop mode. When the automatic dispensing apparatus 914 is installed and functioning, the signal processor is in the on mode approximately 2.8% of the time, the stop mode nearly 97% of the time, and the wait mode for around 0.2% of the time. A low frequency clock frequency of 32.768 KHz is preferably applied to the signal processor during the stop mode allowing the signal processor to operate on about 50 microamps. When a timer, functioning in the stop mode, reaches a given value, the signal processor transitions to the on mode. During the on mode the clock frequency for the signal processor is approximately 4 MHz, requiring an operational current of about 4 milliamps for the signal processor. The wait mode requires around 1 milliamp of current, and is used for special purposes, such as providing power for operation of the control logic for the latching solenoid drivers during a transition between the on mode and the stop mode. Where the detection signal is an emitter pulse that is preferably sent 4 times per second with a pulse width of around 59 microseconds, the power requirement for the emitter 960 of the automatic dispensing apparatus 914 is significantly reduced. Conventional dispensing devices send pulses around 8 times per second with a pulse width of over 200 microseconds. In addition, modifications to the latching solenoid valve circuits have provided an additional reduction in energy requirements.

The battery saving methodology described above allows an embodiment of the remotely managed automatic dispensing apparatus to operate on four (4) AA batteries, where each battery is capable of supplying around 2500 mAhours. Conventional dispensing devices typically require four (4) C batteries, where each battery is capable of supplying around 7100 mAhours. The reduction, of nearly 65%, in power requirements and the associated benefits of reduced cost and size represents a significant improvement over conventional dispensing devices.

In the preferred embodiment, the present invention normally operates in the detection mode, to provide the function of dispensing water. A method or procedure is provided in accordance with the present invention to transfer from the detection mode to the communication or data mode. Since the PDA communication protocol is preferably based on the IRDA specifications, it is preferable to send a known sequence to the sensor module 958 from the portable communication device 970 for at least 300 milliseconds since the operational mode for the control module 926 typically occurs for a brief amount of time every 250 milliseconds. When the control module detects the known sequence a detection mode to communication mode transition is initiated as described more detail above.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. For example, the invention as described is not dependent upon specific hardware configurations, nor is it pivotal to employ a specific programming language to implement the invention as described. Additionally, the reflective filtering techniques described in the co-pending U.S. Patent Application filed, Oct. 23, 2001, entitled, "System and Method for Filtering Reflected Infrared," and assigned Attorney Docket No. 00-0895.15, which is hereby incorporated by reference herein, may form a part of the present invention. Therefore, the above mentioned description is to be considered exemplary, rather than limiting, and the true scope of the invention is that defined in the following claims

What is claimed is:

1. A wireless data exchange system comprising:
an electronically operated fluid dispensing device comprising:
   a transmitter;
   a first receiver;
   a second receiver; and
   a control module configured to communicate with said transmitter, said first receiver, and said second receiver, said control module being configured to provide a primary mode of operation in which the single electrically operated fluid dispensing system is operable and a secondary mode of operation in which the single electrically operated fluid dispensing system is not operable and including control logic configured to selectively change the mode of operation of the single electronically operated fluid dispensing device, wherein said primary mode of operation comprises a sensing mode and said secondary mode of operation comprises a communication mode, said first receiver being configured to operate in said sensing mode and said second receiver being configured to operate in said communication mode; and
a communication device adapted to be held in the hand of a user and configured to cooperate with said transmitter and said second receiver to receive data wirelessly from said control logic regarding the operation of the single electrically operated fluid dispensing device and to impart instructions wirelessly to said control logic to change the mode of operation of the electronically operated fluid dispensing device upon receipt of a command from a user which changes said mode of operation of said control module from said primary mode of operation to said secondary mode of operation.

2. A wireless data exchange system as defined in claim 1, wherein said transmitter comprises an active infrared emitter configured to selectively emit sensing signals capable of being received by said first receiver and communication signals capable of being received by said communication device.

3. A wireless data exchange system as defined in claim 2, wherein said second receiver comprises an infrared detector capable of detecting a communication signal and said first receiver comprises an infrared detector capable of detecting a sensing signal.

4. A wireless data exchange system as defined in claim 1, wherein said communication device includes a communication receiver and a microprocessor, and wherein said communication receiver and said microprocessor cooperate to receive signals from the single electronically operated fluid dispensing device, identify the single electronically operated fluid dispensing device and determine the operating status of the single electronically operated fluid dispensing device.

5. A wireless data exchange system as defined in claim 4, wherein said communication device further includes an emitter that communicates with said microprocessor to transmit signals to the single electronically operated fluid dispensing device in response to signals received from the single electronically operated fluid dispensing device, the transmitted signals including instructions that change the operating parameters of the single electronically operated fluid dispensing device.

6. A wireless data exchange system for use in an electrically operated fluid dispensing system, said wireless data exchange system comprising:
    a transmitter which is associated with a single electrically operated fluid dispensing system;
    first and second receivers which are associated with the single electrically operated fluid dispensing system;
    a control module which is associated with the single electrically operated fluid dispensing system and which is operatively connected to communicate with said transmitter and said first and second receivers, said control module being configured to provide a primary mode of operation in which the single electrically operated fluid dispensing system is operable and a secondary mode of operation in which the single electrically operated fluid dispensing system is not operable, said control module including control logic configured to selectively change the mode of operation of the single electronically operated fluid dispensing device, wherein said primary mode of operation comprises a sensing mode and said secondary mode of operation comprises a communication mode, said first receiver being configured to operate in said sensing mode and said second receiver being configured to operate in said communication mode; and
    a communication device adapted to be held in the hand of a user and configured to cooperate with said transmitter and said second receiver, said communication device communicating with said control module to cause said control module to switch from said primary mode of operation to said secondary mode of operation, wherein said communications device receives data wirelessly from said control logic regarding the operation of the single electrically operated fluid dispensing device and imparts instructions wirelessly to said control logic to change the mode of operation of the single electronically operated fluid dispensing device as commanded by a user when said control module is in said secondary mode of operation.

7. A wireless data exchange system as defined in claim 6, wherein said transmitter comprises:
    an active infrared emitter configured to selectively emit sensing signals capable of being received by said first receiver and communication signals capable of being received by said communication device.

8. A wireless data exchange system as defined in claim 7, wherein said second receiver comprises:
    an infrared detector capable of detecting a communication signal; and wherein said first receiver comprises:
    an infrared detector capable of detecting a sensing signal.

9. A wireless data exchange system as defined in claim 6, wherein said communication device comprises:
    a communication receiver; and
    a microprocessor, wherein said communication receiver and said microprocessor cooperate to receive signals from the single electronically operated fluid dispensing device, identify the single electronically operated fluid dispensing device and determine the operating status of the single electronically operated fluid dispensing device.

10. A wireless data exchange system as defined in claim 9, wherein said communication device further comprises:
    an emitter that communicates with said microprocessor to transmit signals to the single electronically operated fluid dispensing device in response to signals received from the single electronically operated fluid dispensing device, the transmitted signals including instructions that change the operating parameters of the single electronically operated fluid dispensing device.

11. A wireless data exchange system as defined in claim 6, additionally comprising:
    a timer which begins timing a fixed period whenever said control module switches from said primary mode of operation to said secondary mode of operation, said timer causing said control module to switch from said secondary mode of operation to said primary mode of operation when said timer reaches the end of said fixed period.

12. A wireless data exchange system as defined in claim 11, wherein said control module is adapted to cause fluid to flow from the single electrically operated fluid dispensing device in response to an object in sufficiently close proximity to said first receiver reflecting a signal from said transmitter to said first receiver.

13. A wireless data exchange system as defined in claim 12, wherein said communication device is adapted to allow the period of time that fluid will flow from the single electrically operated fluid dispensing device following detection of an object in proximity to said first receiver.

14. A wireless data exchange system as defined in claim 6, additionally comprising:
    a computer connected to the Internet, wherein said communication device is adapted for connection to said computer to provide operational information regarding the single electronically operated fluid dispensing device which operational information is transmitted on the Internet; and
    a server also connected to the Internet, said server receiving said operational information and storing it in a database.

15. A wireless data exchange system as defined in claim 6, additionally comprising:
    a second transmitter which is associated with a second single electrically operated fluid dispensing system;
    third and fourth receivers which are associated with the second single electrically operated fluid dispensing system; and
    a second control module which is associated with the second single electrically operated fluid dispensing system and which is operatively connected to communicate with said second transmitter and said third and fourth receivers, said second control module being configured to provide a primary mode of operation in which the second single electrically operated fluid dispensing system is operable and a secondary mode of operation in which the second single electrically operated fluid dispensing system is not operable, said second control module including second control logic configured to selectively change the mode of operation of the second single electronically operated fluid dispensing device, wherein said primary mode of operation comprises a sensing mode and said secondary mode of operation comprises a communication mode, said third receiver being configured to operate in said sensing mode and said fourth receiver being configured to operate in said communication mode; wherein said communication device can communicate with said second control module to cause said second control module to switch from said primary mode of operation to said secondary mode of operation, wherein said communications device receives data wirelessly from said second control logic regarding the operation of the second single electrically operated fluid dispensing device and imparts instructions wirelessly to said second control logic to change the mode of operation of the second single electronically operated fluid dispensing device as commanded by a user when said second control module is in said secondary mode of operation.

* * * * *